(12) United States Patent
Ugawa et al.

(10) Patent No.: US 8,364,597 B2
(45) Date of Patent: Jan. 29, 2013

(54) RECORDING DEVICE, SERVER DEVICE, RECORDING METHOD, RECORDING MEDIUM WITH COMPUTER PROGRAM RECORDED THEREIN AND INTEGRATED CIRCUIT

(75) Inventors: Sanzo Ugawa, Osaka (JP); Masaya Yamamoto, Osaka (JP); Shunji Harada, Osaka (JP); Toshihisa Nakano, Osaka (JP)

(73) Assignee: Panasonic Corporations, Osaka (JP)

( * ) Notice: Subject to any disclaimer, the term of this patent is extended or adjusted under 35 U.S.C. 154(b) by 737 days.

(21) Appl. No.: 12/377,003

(22) PCT Filed: Feb. 7, 2008

(86) PCT No.: PCT/JP2008/000172
§ 371 (c)(1),
(2), (4) Date: Mar. 12, 2009

(87) PCT Pub. No.: WO2008/096543
PCT Pub. Date: Aug. 14, 2008

(65) Prior Publication Data
US 2010/0281263 A1    Nov. 4, 2010

Related U.S. Application Data

(60) Provisional application No. 60/899,867, filed on Feb. 7, 2007.

(51) Int. Cl.
*G06F 21/00* (2006.01)
(52) U.S. Cl. ............... 705/57; 705/58; 705/59; 705/51; 705/911; 705/912; 380/201; 380/202
(58) Field of Classification Search ............ 705/57
See application file for complete search history.

(56) References Cited

U.S. PATENT DOCUMENTS

| 5,646,999 | A  | 7/1997 | Saito |
| 7,353,541 | B1 | 4/2008 | Ishibashi et al. |

(Continued)

FOREIGN PATENT DOCUMENTS

| EP | 1498799 A2 * | 1/2005 |
| JP | 2001-75930 | 3/2001 |

(Continued)

OTHER PUBLICATIONS

International Search Report issued Apr. 22, 2008 in the International (PCT) Application of with the present application is the U.S. National Stage.

(Continued)

*Primary Examiner* — Jacob C. Coppola
(74) *Attorney, Agent, or Firm* — Wenderoth Lind & Ponack, L.L.P.

(57) ABSTRACT

A recording device records one or more subcontents constituting one content recorded on a first recording medium, onto a second recording medium, wherein the first recording medium has further recorded thereon digest values of the subcontents, and a medium signature generated based on the digest values of the subcontents. The recording device includes a subcontent acquisition unit that selects and acquires one or more subcontents permitted to be copied; an excluded digest value acquisition unit that acquires excluded digest values from the first recording medium, wherein the excluded digest values are digest values of nonselected subcontents; a signature acquisition unit that acquires the medium signature from the first recording medium; and a write unit that writes, onto the second recording medium, (i) the one or more selected subcontents, (ii) the excluded digest values and (iii) the medium signature.

4 Claims, 26 Drawing Sheets

U.S. PATENT DOCUMENTS

| | | | |
|---|---|---|---|
| 2004/0151324 A1* | 8/2004 | Furukawa et al. | 380/281 |
| 2005/0015600 A1 | 1/2005 | Miyazaki et al. | |
| 2005/0084244 A1* | 4/2005 | Murabayashi | 386/95 |
| 2007/0078777 A1* | 4/2007 | Demartini et al. | 705/59 |
| 2007/0086345 A1* | 4/2007 | Yashima et al. | 370/236 |
| 2008/0134340 A1* | 6/2008 | Ueda et al. | 726/26 |
| 2008/0250100 A1* | 10/2008 | Hatanaka et al. | 709/203 |
| 2010/0054698 A1* | 3/2010 | Isozaki et al. | 386/94 |
| 2010/0281263 A1* | 11/2010 | Ugawa et al. | 713/176 |

FOREIGN PATENT DOCUMENTS

| | | |
|---|---|---|
| JP | 2003-108796 | 4/2003 |
| JP | 2004-72792 | 3/2004 |
| JP | 2005-51734 | 2/2005 |
| WO | 2005/096119 | 10/2005 |

OTHER PUBLICATIONS

"Advanced Access Content System (AACS) Pre-recorded Video Book," Revision 0.91, Feb. 17, 2006.

* cited by examiner

FIG.8

| | |
|---|---|
| CONTENT ID OF RELATED CONTENT | 0x234... |
| CONTENT ID | 0x123... |
| CLIP ID 1 | 0x102 |
| FILE NAME 1 | CLIP 1 |
| CLIP ID 2 | 0x105 |
| FILE NAME 2 | CLIP 2 |
| ... | ... |
| CLIP ID N | 0x155 |
| FILE NAME N | CLIP N |

| CONTENT ID | 0x123... |
|---|---|
| CLIP ID 1 | 0x112 |
| FILE NAME 1 | CLIP 1 |
| CLIP ID 2 | 0x115 |
| FILE NAME 2 | CLIP 2 |
| ... | ... |
| CLIP ID N | 0x145 |
| FILE NAME N | CLIP N |

311

RECORDING DEVICE, SERVER DEVICE, RECORDING METHOD, RECORDING MEDIUM WITH COMPUTER PROGRAM RECORDED THEREIN AND INTEGRATED CIRCUIT

This application claims benefit to the provisional U.S. application 60/899,867, filed Feb. 7, 2007.

BACKGROUND OF THE INVENTION

1. Technical Field

The present invention relates to a technique for copying a content recorded on a first recording medium, onto a second recording medium, and in particular to a technique for selecting and copying a part of the content.

2. Background Art

Commercial contents such as movies and music are attached with digital signatures to prove the validity of the contents. Playback devices verify the digital signatures when playing the contents, and perform a process for playing the contents after the legitimacy of the contents is proved.

In a case where the content is recorded onto a Blu-ray Disc (which is a registered trademark, and is abbreviated as BD hereinafter BD-ROM), a digital signature is generated based on the digest values of all the data pieces (hereinafter referred to as "clip") that are obtained by dividing the content into data pieces each having a certain size, and calculating the digest values of the respective data pieces. The generated digital signature obtained in the above-described manner is recorded on the BD-ROM with the content, and provided to a user. Here, the BD-ROM has recorded thereon a digest value table, in addition to the content and the digital signature. The digest value table stores the digest values of the respective clips that constitute the content.

Then, when playing the content, the playback device performs a signature verification process in the following manner.

The Playback Device (1) arbitrarily selects a predetermined number of clips from among the clips constituting the content, and calculates the digest values of the selected clips, (2) acquire, from the digest value table, digest values of clips that are not selected, and (3) performs signature verification with use of (i) the digest values calculated from the selected clips, (ii) the digest values acquired from the digest value table, (iii) the digital signature recorded on the BD-ROM, and (iv) a key used for the signature verification that has been stored in the playback device in advance.

Since the playback device arbitrarily selects clips in the process (1) described above, the digest value table is required to store the digest values of all the clips, so as to accommodate whichever digest value is selected.

Also, users cannot copy the commercial contents, since the commercial contents are protected from unauthorized copying, with use of encryption techniques.

However, there has been considered a service for permitting the legal copying of the commercial contents on the condition that a billing process or the like is performed.

In the case of considering the service for permitting legal copying of the commercial contents, when the content on the BD-ROM is recorded onto a recording medium (which is sometimes referred to as "BD-R/RE" hereinafter) such as BD-R (BD-Recordable), and BD-RE (BD-Rewritable), it is preferable that clips can be recorded such that only clips including user's favorite scenes are selected and recorded, in addition to a case where the whole content recorded on the BD-ROM is copied.

Patent Document 1: Japanese Patent Application Publication No. 2001-75930;

Patent Document 2: Japanese Patent Application Publication No. 2004-72792; and

Non-Patent Document 1: Advanced Access Content System (AACS) Pre-recorded Video Book Revision 0.91 Feb. 17, 2006.

SUMMARY OF THE INVENTION

It is difficult to use the structure of conventional signature verification when copying, onto the BD-RE, only the clips that are arbitrarily selected by the user instead of all the clips recorded on the BD-ROM, as described above.

This is because of the following reasons. As described above, the digest values of all the clips recorded on the BD-RE and the digital signature are required for the signature verification at the time of playback. However, since it is impossible to predict which clip the user will select, a server device or the like needs to store, for example, digital signatures for all combinations of clips the user may select, which are generated in advance by an authorized organization.

In view of the above-described problem, the object of the present invention is therefore to provide a structure that reduces the number of digital signatures that need to be prepared in advance, even when the clips arbitrarily selected by a user from among all the clips recorded on the BD-ROM are to be recorded onto a recording medium such as a BD-R/RE.

In order to achieve the above described object, the present invention provides a recording device for recording one or more of a plurality of subcontents recorded on a first recording medium, onto a second recording medium, the first recording medium having further recorded thereon digest values of the subcontents, and a medium signature generated based on the digest values of the subcontents permitted to be copied, the plurality of subcontents constituting one content, the recording device comprising: a subcontent acquisition unit operable to select one or more subcontents, from among one or more subcontents permitted to be copied in the plurality of subcontents recorded on the first recording medium, and acquire the selected one or more subcontents as one or more selected subcontents; an excluded digest value acquisition unit operable to acquire excluded digest values from the first recording medium, the excluded digest values being digest values of nonselected subcontents, that are subcontents permitted to be copied and are other than the one or more selected subcontents; a signature acquisition unit operable to acquire the medium signature from the first recording medium; and a write unit operable to write, onto the second recording medium, (i) the one or more selected subcontents, (ii) the excluded digest values of the nonselected subcontents, and (iii) the medium signature.

EFFECTS OF THE INVENTION

According to the above-described construction, the excluded digest values of the nonselected subcontents that are other than the one or more selected subcontents are acquired from the first recording medium, and the one or more selected subcontents, the excluded digest values, and the medium signature are recorded onto the second recording medium. This achieves an advantageous effect that whether the one or more selected subcontents have been tampered can be checked with only one medium signature, by using the excluded digest values and the one or more selected subcontents recorded on the second recording medium.

The following describes a case where a user arbitrarily selects one or more subcontents from the BD-ROM that has recorded thereon three contents, namely subcontents A, B, and C, and copies the one or more subcontents onto the BD-R.

There are seven possible combinations of subcontents that the user may select, which are (i) the subcontents A, B, and C, (ii) the subcontents A and B, (iii) the subcontents A and C, (iv) the subcontents B and C, (v) the subcontent A, (vi) the subcontent B, and (vii) the subcontent C.

Even in a case like the above, according to the present invention, it is not necessary to prepare seven digital signatures in advance, as long as a digital signature generated with use of the digest values of the respective subcontents A, B, and C that are recorded on the BD-ROM is recorded onto the BD-R.

When playing the BD-R, the legitimacy of the recorded subcontents can be verified by generating data for signature verification, with use of the digest values generated from the selected subcontents and the excluded digest values of the nonselected subcontents, and comparing the generated data for signature verification with the digital signature recorded on the BD-ROM.

Here, the recording device may further comprise: a selected digest value acquisition unit operable to acquire, from the first recording medium, a selected digest value that is a digest value of each of the one or more selected subcontents, wherein the write unit further writes, onto the second recording medium, the selected digest value of each of the one or more selected subcontents.

According to this construction, the one or more selected digest values of the one or more selected subcontents are further written on the second recording medium. This achieves an advantageous effect that whether the one or more selected subcontents have been tampered can be checked with only one medium signature, by using either the one or more selected digest values and the excluded digest values recorded on the second recording medium, or the one or more selected subcontents and the excluded digest values recorded on the second recording medium.

Here, the first recording medium may have further recorded thereon permission information indicating subcontents permitted to be copied, and the subcontent acquisition unit may select the one or more subcontents, with use of the permission information.

Here, the permission information may be a medium permission list including one or more permission identifiers, each of which identifies a respective one of the one or more subcontents permitted to be copied, and the subcontent acquisition unit may be operable to select the one or more subcontents, from among the one or more subcontents identified by the one or more permission identifiers included in the medium permission list.

This construction makes it possible to select the subcontents permitted to be copied.

Here, the subcontent acquisition unit may further include: a presentation unit operable to present, to a user, the one or more subcontents identified by the one or more permission identifiers included in the medium permission list; and a user selection unit operable to receive one or more subcontents specified by the user from among the one or more subcontents that have been presented, and select the one or more subcontents specified by the user as the one or more selected subcontents.

This construction makes it possible for the user to specify one or more subcontents among the subcontents permitted to be copied.

Here, the subcontent acquisition unit may be able to select the one or more subcontents, from among a plurality of subcontents constituting a related content that is related to the content and that is stored in a server device, the server device may have stored therein (i) the plurality of subcontents constituting the related content, (ii) digest values of the plurality of subcontents constituting the related content, (iii) a server signature generated based on the digest values of the plurality of subcontents constituting the content and the digest values of the plurality of subcontents constituting the related content, the recording device may further include: an excluded digest value reception unit operable to receive, from the server device, excluded digest values that are digest values of nonselected subcontents, that are subcontents permitted to be copied and are other than the one or more selected subcontents that have been selected from the server device, in a case where the one or more selected subcontents are selected from the server device; and a signature information reception unit operable to receive the server signature from the server device, in the case where the one or more selected subcontents are selected from the server device, and the write unit may write, onto the second recording medium, (i) the one or more selected subcontents that have been acquired, (ii) the excluded digest values acquired from the first recording medium, and (iii) the medium signature, in a case where the one or more selected subcontents are selected only from the first recording medium, and write, onto the second recording medium, (i) the one or more selected subcontents that have been acquired, (ii) the excluded digest values acquired from the first recording medium, (iii) the excluded digest values received from the server device, and (iv) the server signature, in a case where the one or more selected subcontents are selected from the first recording medium and the server device.

This construction achieves an advantageous effect that, when the one or more subcontents permitted to be copied are selected only from the first recording medium, whether the one or more selected subcontents have been tampered can be checked with only one medium signature acquired from the first recording medium, by using the one or more selected subcontents recorded on the second recording medium and the excluded digest values acquired from the first recording medium, and, when the one or more subcontents permitted to be copied are selected from both of the first recording medium and the server device, whether the one or more selected subcontents have been tampered can be checked with only one medium signature received from the server device, by using the one or more selected subcontents recorded on the second recording medium, the excluded digest values acquired from the first recording medium, and the excluded digest values received from the server device.

Here, the recording device may further comprise: a selected digest value acquisition unit operable to, in a case where the one or more selected subcontents are selected from the first recording medium, acquire, from the first recording medium, one or more selected digest values that are one or more digest values of the one or more selected subcontents that have been selected; and a selected digest value reception unit operable to, in the case where the one or more selected subcontents are selected from the server device, receive, from the server device, one or more selected digest values that are one or more digest values of the one or more selected subcontents that have been selected from the server device, wherein the write unit further writes, onto the second recording medium, (i) the one or more selected digest values of the one or more selected subcontents that have been selected from the first recording medium, and (ii) the one or more selected digest values of the one or more selected subcontents that have been selected from the server device.

This construction achieves an advantageous effect that, when the one or more selected subcontents are selected only from the first recording medium, whether the one or more selected subcontents have been tampered can be checked with only one medium signature acquired from the first recording medium, by using either (i) the one or more selected subcontents and the excluded digest values recorded on the second recording medium or (ii) the one or more selected digest values and the excluded digest values recorded on the second recording medium, and, when the one or more selected subcontents are selected from both of the first recording medium and the server device, whether the one or more selected subcontents have been tampered can be checked with only one server signature received from the server device, by using either (i) the one or more selected subcontents recorded on the second recording medium and the excluded digest values acquired from the first recording medium and the excluded digest values received from the server device or (ii) the one or more selected digest values acquired from the first recording medium, the one or more selected digest values received from the server device, which have both been recorded on the second recording medium, and the one or more selected subcontents, and the excluded digest values acquired from the first recording medium and the excluded digest values received from the server device.

Here, the subcontent acquisition unit may include: a reception unit operable to receive, from the server device, first permission information indicating the one or more subcontents permitted to be copied; and a selection acquisition unit operable to select the one or more subcontents, with use of the first permission information.

Here, the reception unit may receive a server permission list as the first permission information, the server permission list including one or more digest values of the one or more subcontents permitted to be copied, and the subcontent acquisition unit may further include: a content storage having stored therein the plurality of subcontents constituting the related content acquired from the server device; a calculation unit operable to calculate digest values of the plurality of subcontents stored in the content storage; and a comparison unit operable to compare the calculated digest values with the one or more digest values included in the server permission list that has been received, so as to determine whether there are any matching digest values therebetween, wherein the selection acquisition unit selects the one or more subcontents, from among one or more subcontents corresponding to any of the matching digest values.

This construction makes it possible for the user to select one or more subcontents from among the one or more subcontents that are permitted to be copied among the plurality of subcontents constituting the related content.

Here, the first recording medium may have further recorded thereon second permission information indicating the one or more subcontents that constitute the content recorded on the first recording medium and that are permitted to be copied, and the subcontent acquisition unit may include: a reception unit operable to receive, from the server device, first permission information indicating the one or more subcontents that constitute the related content stored in the server device and that are permitted to be copied; and a selection acquisition unit operable to select the one or more subcontents, with use of the first permission information and the second permission information.

Here, the first permission information may be a server permission list including one or more digest values of the one or more subcontents permitted to be copied, the second permission information may be a medium permission list including one or more permission identifiers each of which identifies a respective one of the one or more subcontents permitted to be copied, the subcontent acquisition unit may further include: a content storage having stored therein the plurality of subcontents constituting the related content acquired from the server device; a calculation unit operable to calculate digest values of the plurality of subcontents stored in the content storage; and a comparison unit operable to compare the calculated digest values with the one or more digest values included in the server permission list that has been received, so as to determine whether there are any matching digest values therebetween, and the selection acquisition unit may select the one or more subcontents from among (i) the one or more subcontents identified by the one or more permission identifiers included in the medium permission list, and (ii) one or more subcontents corresponding to any of matching digest values determined by the comparison unit.

This construction makes it possible to select the one or more subcontents permitted to be copied, from among the plurality of subcontents constituting the content and the plurality of subcontents constituting the related content.

Here, the subcontent acquisition unit may include: a content storage having stored therein the plurality of subcontents constituting the related content acquired from the server device; a first reception unit operable to receive a specification of one or more subcontents, the specification being given by a user from among the plurality of subcontents constituting the content recorded on the first recording medium, and the plurality of subcontents constituting the related content stored in the content storage; a transmission unit operable to transmit specification information indicating the specification of the one or more subcontents that has been received; a second reception unit operable to receive, from the server device, permission information indicating the one or more subcontents permitted to be copied, among the one or more subcontents indicated by the specification information that has been transmitted; and a selection acquisition unit operable to select the one or more subcontents, from among the one or more subcontents indicated by the permission information that has been received.

This construction makes it possible to select the one or more subcontents permitted to be copied, from among the plurality of subcontents constituting the content and the plurality of subcontents constituting the related content.

Here, the subcontent acquisition unit may include: a content storage having stored therein the plurality of subcontents constituting the related content acquired from the server device; a first reception unit operable to receive a specification of one or more subcontents, the specification being given by a user from among the plurality of subcontents constituting the content recorded on the first recording medium, and the plurality of subcontents constituting the related content stored in the content storage; a second reception unit operable to receive, from the server device, permission information indicating the one or more subcontents permitted to be copied; and a selection acquisition unit operable to select, from among the one or more subcontents that have been specified by the user, the one or more subcontents indicated by the permission information that has been received, and determine the selected one or more subcontents as the one or more selected subcontents.

This construction makes it possible to select the one or more subcontents permitted to be copied, from among the one or more subcontents selected by the user.

Here, the subcontent acquisition unit may further include a warning display unit operable to display a warning message indicating that copying is not permitted with respect to a subcontent other than the one or more subcontents indicated by the permission information among the one or more subcontents that have been specified by the user.

According to this construction, it is possible to let the user know that the user has selected a subcontent not permitted to be copied, by the warning message indicating that the subcontent not permitted to be copied is included in the one or more subcontents selected by the user.

Also, the present invention provides a recording device for recording a part of a plurality of subcontents constituting a first content recorded on a first recording medium, onto a second recording medium, and a plurality of subcontents constituting a second content stored in a server device, the second content being related to the first content, wherein the first recording medium has recorded thereon (i) the plurality of subcontents constituting the first content, and (ii) digest values of the subcontents constituting the first content, the server device has stored therein (i) the plurality of subcontents constituting the second content, (ii) digest values of the plurality of subcontents constituting the second content, and (iii) a server signature generated based on the digest values of the plurality of subcontents constituting the first content and the plurality of subcontents constituting the second content, the recording device includes: a subcontent acquisition unit operable to select one or more subcontents from among one or more subcontents permitted to be copied in each group of the subcontents recorded on the first recording medium and the subcontents stored in the server device, and acquire the selected one or more subcontents as one or more selected subcontents; an excluded digest value acquisition unit operable to acquire, from the first recording medium, excluded digest values that are digest values of nonselected subcontents, the nonselected subcontents being subcontents other than the one or more selected subcontents that are permitted to be copied and that have been selected from the first recording medium; an excluded digest value reception unit operable to receive, from the server device, excluded digest values that are digest values of nonselected subcontents, the nonselected subcontents being subcontents other than the one or more selected subcontents that are permitted to be copied and that have been selected from the server device; a signature reception unit operable to receive the server signature from the server device; and a write unit operable to write, onto the second recording medium, (i) the one or more selected subcontents that have been acquired, (ii) the excluded digest values acquired from the first recording medium, (iii) the excluded digest values received from the server device, and (iv) the server signature.

According to this construction, (i) the one or more selected subcontents that have been acquired, (ii) the excluded digest values acquired from the first recording medium, (iii) the excluded digest values received from the server device, and (iv) the server signature are written onto the second recording medium. This achieves an advantageous effect that whether the one or more selected subcontents have been tampered can be checked with only one server signature, by using the excluded digest values recorded on the second recording medium, which have been acquired from the first recording medium, the excluded digest values received from the server device, and the one or more selected subcontents.

Here, the recording device may further comprise: a selected digest value acquisition unit operable to acquire, from the first recording medium, one or more selected digest values that are one or more digest values of the one or more selected subcontents that have been selected from the first recording medium; a server selected digest value reception unit operable to receive, from the server device, one or more selected digest values that are one or more digest values of the one or more selected subcontents that have been selected from the server device, wherein the write unit further writes, onto the second recording medium, (i) the one or more selected digest values of the one or more selected subcontents that have been selected from the first recording medium, and (ii) the one or more selected digest values of the one or more selected subcontents that have been selected from the server device.

According to this construction, (i) the one or more selected digest values of the one or more selected subcontents acquired from the first recording medium and (ii) the one or more selected digest values of the one or more selected subcontents received from the server device are written onto the second recording medium. This achieves an advantageous effect that whether the one or more selected subcontents have been tampered can be checked with only one server signature, by using either (i) the one or more selected digest values selected from the first recording medium, the one or more selected digest values selected from the server device, the excluded digest values acquired from the first recording medium, and the excluded digest values received from the server device, which are all recorded on the second recording medium, or (ii) the one or more selected subcontents selected from the first recording medium, the one or more subcontents selected from the server device, the excluded digest values acquired from the first recording medium, and the excluded digest values received from the server device, which are all recorded on the second recording medium.

Here, the subcontent acquisition unit may further include: a reception unit operable to receive, from the server device, permission information indicating the one or more subcontents permitted to be copied; and a selection acquisition unit operable to select the one or more subcontents, with use of the permission information.

Here, the reception unit may receive a server permission list as the permission information, the server permission list including one or more digest values of the one or more subcontents permitted to be copied, and the subcontent acquisition unit may further include: a content storage having stored therein the plurality of subcontents constituting the second content acquired from the server device; a calculation unit operable to calculate digest values of the plurality of subcontents stored in the content storage; and a comparison unit operable to compare the calculated digest values with the one or more digest values included in the server permission list that has been received, so as to determine whether there are any matching digest values therebetween, wherein the selection acquisition unit selects the one or more subcontents from among one or more subcontents corresponding to any of the matching digest values.

This construction makes it possible to select one or more subcontents permitted to be copied, among the plurality of subcontents constituting the second content.

Here, the selection acquisition unit may further include: a presentation unit operable to present one or more subcontents corresponding to any of matching digest values determined by the comparison unit; and a user specification unit operable to receive one or more subcontents specified by the user from among the one or more subcontents that have been presented, and select the one or more subcontents specified by the user as the one or more selected subcontents.

This construction makes it possible for the user to specify one or more subcontents among the subcontents permitted to be copied.

Here, the first recording medium may have further recorded thereon second permission information indicating the one or more subcontents that constitute the content recorded on the first recording medium and that are permitted to be copied, and the subcontent acquisition unit may further include: a reception unit operable to receive, from the server device, first permission information indicating the one or more subcontents that constitute the related content stored in the server device and that are permitted to be copied; and a selection acquisition unit operable to select the one or more subcontents, with use of the first permission information and the second permission information.

Here, the first permission information may be a server permission list including one or more digest values of the one or more subcontents permitted to be copied, the second permission information may be a medium permission list including one or more permission identifiers each of which identifies a respective one of the one or more subcontents permitted to be copied, the subcontent acquisition unit may further include: a content storage having stored therein the plurality of subcontents constituting the related content acquired from the server device; a calculation unit operable to calculate digest values of the plurality of subcontents stored in the content storage; and a comparison unit operable to compare the calculated digest values with the one or more digest values included in the server permission list that has been received, so as to determine whether there are any matching digest values therebetween, and the selection acquisition unit may select the one or more subcontents from among (i) the one or more subcontents identified by the one or more permission identifiers included in the medium permission list, and (ii) one or more subcontents corresponding to any of matching digest values determined by the comparison unit.

This construction makes it possible to select the subcontents permitted to be copied, among the plurality of subcontents constituting the first content, and the plurality of subcontents constituting the second content.

Here, the selection acquisition unit may further include: a presentation unit operable to present (i) the one or more subcontents identified by the one or more permission identifiers included in the medium permission list, and (ii) the one or more subcontents corresponding to any of the matching digest values determined by the comparison unit; and a user specification unit operable to receive one or more subcontents specified by the user from among the one or more subcontents that have been presented, and select the one or more subcontents specified by the user as the one or more selected subcontents.

This construction makes it possible for the user to specify one or more subcontents among the subcontents permitted to be copied.

Also, the present invention provides a server device for supplying, to a recording device, a part of a plurality of subcontents constituting a content, the server device comprising: a reception unit operable to receive, from the recording device, a plurality of subcontent identifiers each of which is for identifying a respective one of the plurality of subcontents; a storage having stored therein one or more permission identifiers each of which is for identifying a respective one of one or more subcontents permitted to be copied, among the plurality of subcontents constituting the content; and a transmission unit operable to extract, from among the plurality of subcontent identifiers that have been received, a subcontent identifier identical to any of the one or more permission identifiers stored in the storage, and transmit the subcontent identifier that has been extracted to the recording device.

According to this construction, the recording device can be informed of the subcontents permitted to be copied, without the recording device judging whether the subcontents are permitted to be copied.

BRIEF DESCRIPTION OF THE DRAWING

FIG. 8 shows the data structure of a management file 221 of a related content 1 (220);

FIG. 11 shows the data structure of a management file 311 of a content 1 (310);

Figure 1:
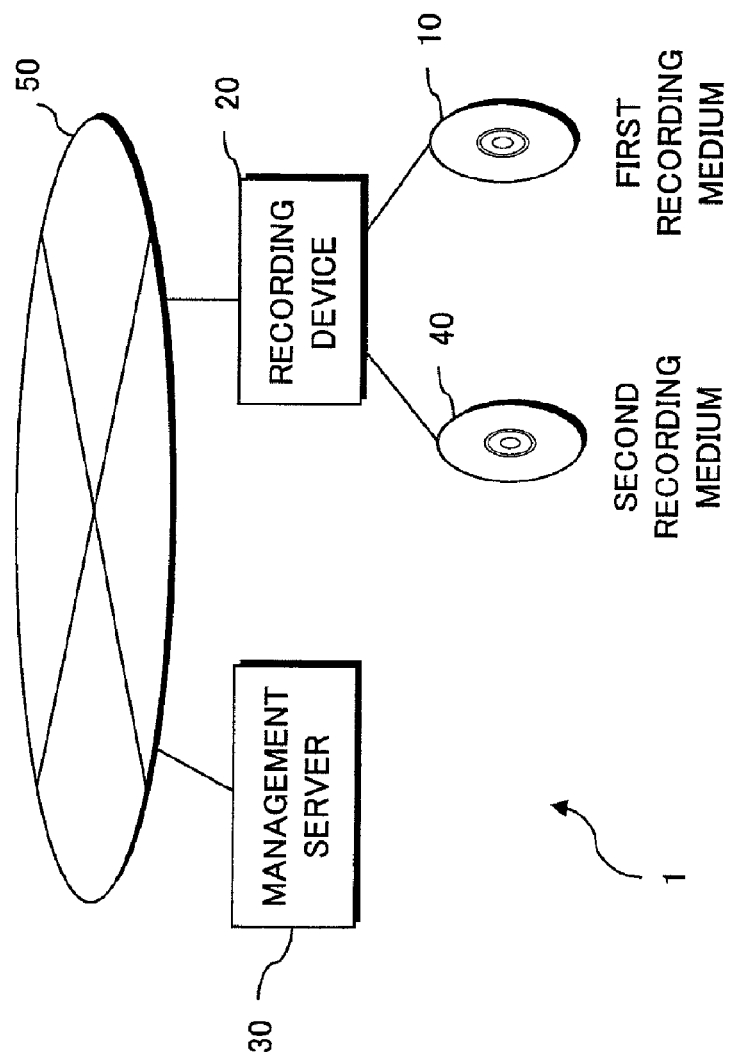
FIG. 1 shows the overall construction of a content copy processing system 1 of a first embodiment of the present invention.

DESCRIPTION OF CHARACTERS 1 content copy processing system
2a content copy processing system
2b content copy processing system
2c content copy processing system
2d content copy processing system
3 content copy processing system
4 content copy processing system
10 first recording medium
20 recording device
30 management server
40 second recording medium
50 communication channel
201 related content storage
202 clip selection unit
203 recording judgment unit
204 signature selection unit
205 clip recording unit
206 signature recording unit
207 copy permission information request unit
208 copy permission information reception unit
209 recording judgment unit
210 recording medium read unit
301 permission judgment unit
302 signature search unit
303 copy permission information transmission unit
304 signature generation unit
305 signature storage
306 content storage
307 copy request information reception unit
308 signature transmission judgment unit
400 BD-ROM
410 recording device
411 signature information request unit
412 downloaded content DB
413 digest value calculation unit
414 digest value comparison unit
415 MCMF analysis unit
416 signature information reception unit
417 selectable content display unit
418a selected content recording unit
418b key information recording unit
420 management server
421 storage
422 permission judgment unit
423 signature information search unit
424 signature information transmission unit
430 BD-R/RE
500 BD-ROM
510 recording device
511 signature information request unit
512 downloaded content DB
513 digest value calculation unit
514 digest value comparison unit
516 signature information reception unit
517 selectable content display unit
518a selected content recording unit
518b key information recording unit
520 management server
521 recording unit
522 permission judgment unit
523 signature information search unit
524 signature information transmission unit
530 BD-R/RE
600 BD-ROM
610 recording device
611 signature information request unit
612 downloaded content DB
613 digest value calculation unit
614 digest value comparison unit
615 MCMF analysis unit
616 signature information reception unit
617 selectable content display unit
618a selected content recording unit
618b key information recording unit
619 signature information selection unit
620 management server
630 BD-R/RE
700 BD-ROM
710 recording device
714 digest value comparison unit
719 signature information selection unit
720 management server
730 BD-R/RE
800 BD-ROM
810 recording device
811 signature information request unit
812 downloaded content DB
816 signature information reception unit
818b key information recording unit
819 signature information selection unit
820 management server
821 recording unit
822 permission judgment unit
824 signature information transmission unit
830 BD-R/RE
840 content selection unit
850 content recording check unit
860 warning display unit
870 selected clip recording judgment unit
880 signature information update judgment unit
900 BD-ROM
910 recording device
911 signature information request unit
912 downloaded content DB
916 signature information reception unit
918b key information recording unit
919 signature information selection unit
920 management server
921 recording unit
922 permission judgment unit
923 signature information search unit
924 signature information transmission unit
930 BD-R/RE
940 content selection unit
950 content recording check unit
960 warning display unit
970 selected clip recording judgment unit
980 signature information update judgment unit
1500 recording medium
1501 content copy processing system
1501a content copy processing system
1550 recording device
1550a recording device
1551 read unit
1552 signature acquisition unit
1553 subcontent acquisition unit 1553a presentation unit
1553b reception selection unit
1553c acquisition unit
1553d content reception unit
1553f digest value calculation unit
1553g permission list reception unit
1553h digest value comparison unit
1553x subcontent acquisition unit
1554 digest value acquisition unit
1554a first digest value acquisition unit
1554b second digest value acquisition unit
1555 write unit
1556 signature reception unit
1557 digest value reception unit
1557a first digest value reception unit
1557b second digest value reception unit
1570 recording medium
1570a recording medium
1580 server device
1581 transmission unit
1582 information recording unit
1553e downloaded content DB

DETAILED DESCRIPTION OF THE INVENTION

First Embodiment

The following describes a content copy processing system 1 according to a first embodiment of the present invention, with reference to the drawings.
<Construction>
1. System Construction FIG. 1 shows the overall construction of the content copy processing system 1 of the first embodiment of the present invention.

As shown in FIG. 1, the content copy processing system 1 includes a first recording medium 10, a recording device 20, a management server 30, and a second recording medium 40. The recording device 20 is connected to the management server 30 via a communication channel 50.

The first recording medium 10 is assumed to be a BD-ROM that has recorded thereon a commercial content and has been marketed to a user. However, it is not limited to such as long as the recording medium has recorded thereon a clip for playback. The data recorded on the first recording medium 10 is described below.

The second recording medium 40 is assumed to be a removable medium such as a BD-R or a BD-RE, or a hard disk drive. However, it is not limited to such as long as a content can be recorded on the recording medium.

The recording device 20 is assumed to be a BD recorder connectable to the communication channel 50. However, it is not limited to such as long as the device can (i) read information of the first recording medium 10, (ii) record the information on the second recording medium 40, and (iii) communicate with an external device. The internal construction of the recording device 20 is described below.

The management server 30 is assumed to be a computer acting as a server that is connectable to the communication channel 50, and that has an auxiliary storage device. However, it is not limited to such as long as the server can communicate with an external device, record information and calculate information.

The communication channel 50 is assumed to be the Internet. However, it is not limited to such as long as the communication of information is possible between the recording device 20 and the management server 30.

This concludes the explanation of the overall construction of the content copy processing system 1.
2. Data Structure of First Recording Medium 10

Figure 2:
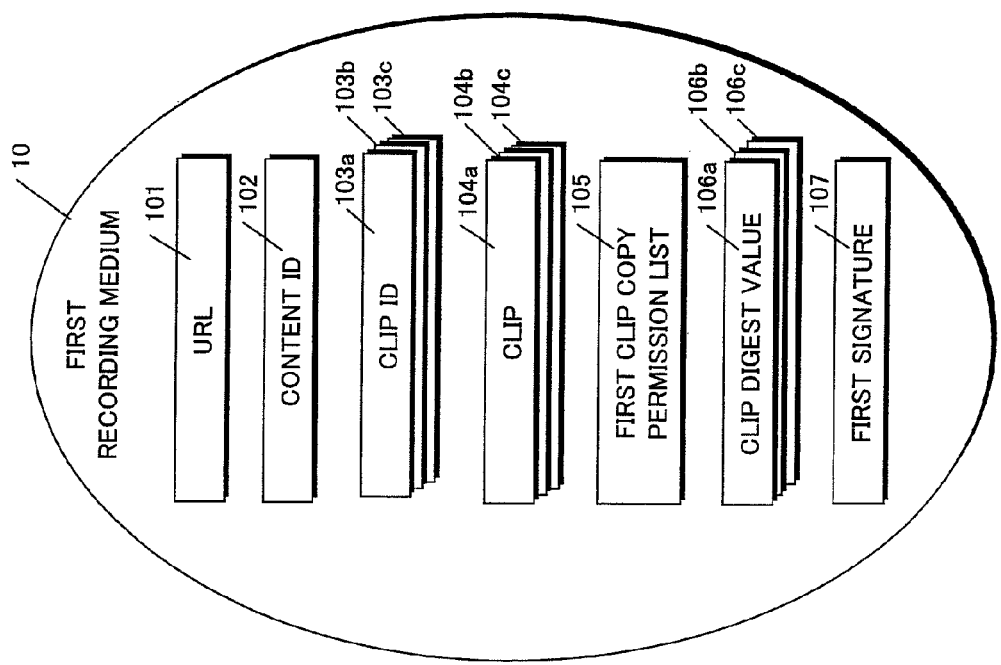
FIG. 2 shows data recorded on a first recording medium 10.

FIG. 2 shows data recorded on the first recording medium 10.

As shown in FIG. 2, the first recording medium 10 has recorded thereon a URL (Uniform Resource Locator) 101, a content ID 102, a plurality of clip IDs 103a, 103b, 103c . . . , a plurality of clips 104a, 104b, 104c . . . , a first clip copy permission list 105, a plurality of clip digest values 106a, 106b, 106c . . . , and a first signature 107.

The URL 101 is address information indicating the location of the management server 30 on a network.

The content ID 102 is an identifier for identifying a content recorded on the first recording medium 10. Note that, in the present embodiment, the content recorded on the first recording medium 10 may be referred to as "content 1" for the convenience of explanation.

Figure 3:
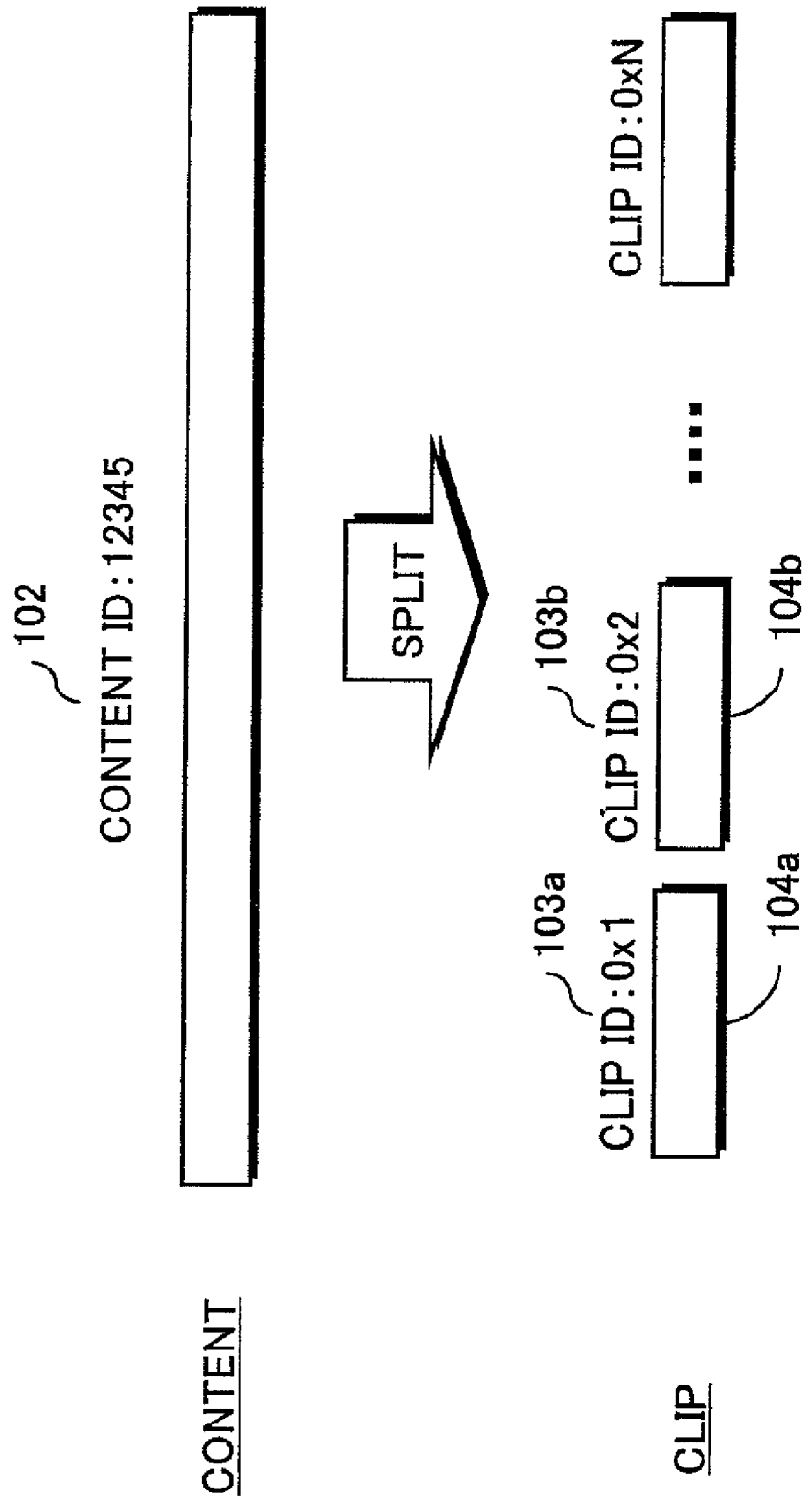
FIG. 3 is a diagram for explaining the relationship among a content, a clip, and a clip ID in the present embodiments.

The following describes the correspondence among a content, a content ID, a plurality of clips, and a plurality of clip IDs, with reference to FIG. 3.

As shown in FIG. 3, the content recorded on the first recording medium 10 has allocated thereto a content ID: 0x123 . . . (102) for identifying the content. Each of the clips (clips 104a, 104b, . . . ) is obtained by dividing the content by a certain length. The clip 104a has assigned thereto a clip ID: 0x1 (103a) for identifying the clip. The clip 104b has assigned thereto a clip ID: 0x2 (104b) for identifying the clip. In the same manner, each of the clips has assigned thereto a clip ID for identifying each clip.

Figure 4:
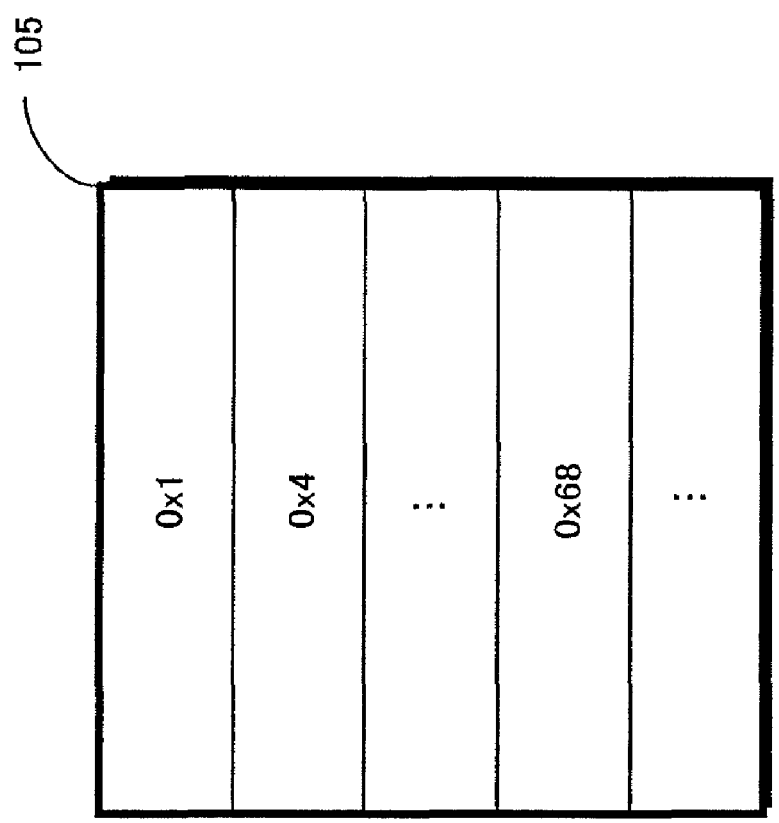
FIG. 4 shows the data structure of a first copy permission list 105 recorded on the first recording medium 10.

The first clip copy permission list 105 stores information indicating a clip permitted to be copied among all the clips recorded on the first recording medium 10. Specifically, the first copy permission list 105 stores the clip ID of the clip permitted to be copied, as shown in FIG. 4.

Here, the "clip permitted to be copied" refers to a clip permitted to be copied in a case where a user acquires a license after a billing process with the management server 30 is completed normally.

That is, in the present embodiment, it is assumed that the clips recorded on the first recording medium 10 include a clip not permitted to be copied even after the billing process has been performed normally.

The following describes the correspondence among the clips 104a, 104b, 104c . . . , the clip digest values 106a, 106b, 106c . . . , and the first signature 107.

Figure 5:
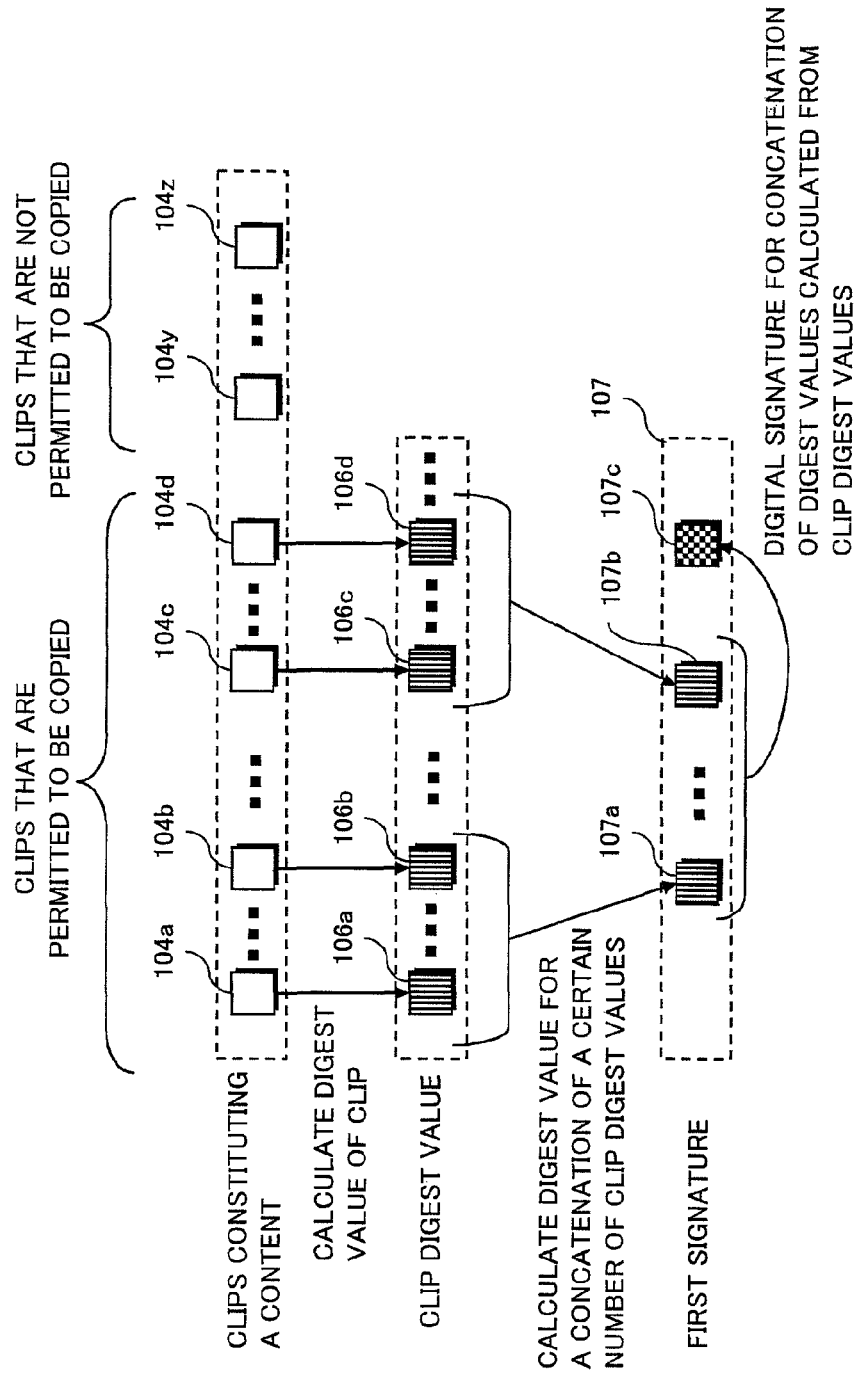
FIG. 5 is a diagram for explaining a generation method of a first signature recorded on the first recording medium 10.

As shown in FIG. 5, each of the clip digest values is obtained by calculating a digest value from each of the clips permitted to be copied, among all the clips recorded on the first recording medium 10. Specifically, the clip digest value 106a is calculated from the clip 104a. In the same manner, the clip digest values 106b, 106c, and 106d are calculated from the clips 104b, 104c, and 104d, respectively.

Subsequently, the calculated clip digest values are divided into blocks each containing a certain number of calculated clip digest values. Then, the calculated clip digest values are concatenated to each other by each block, and a digest value is calculated for each of the concatenated values. In FIG. 5, each of digest values 107a, . . . , 107b is calculated from the respective concatenated values. Then, a digital signature 107c is generated for a value obtained by concatenating the digest values 107a, . . . , 107b.

The first signature 107 is composed of the digest values 107a, . . . , 107b, and the digital signature 107c.

In other words, the first signature 107 is generated based on all the clips permitted to be copied, among the clips recorded on the first recording medium 10.

Note here that, in the present embodiment, a description is provided while assuming that the first recording medium 10 has recorded thereon one content, for the convenience of explanation. However, it is not limited to such, and the first recording medium 10 may have recorded thereon a plurality of contents.

This concludes the description of the data structure of the first recording medium 10.

3. Internal Construction of Recording Device 20

Figure 6:
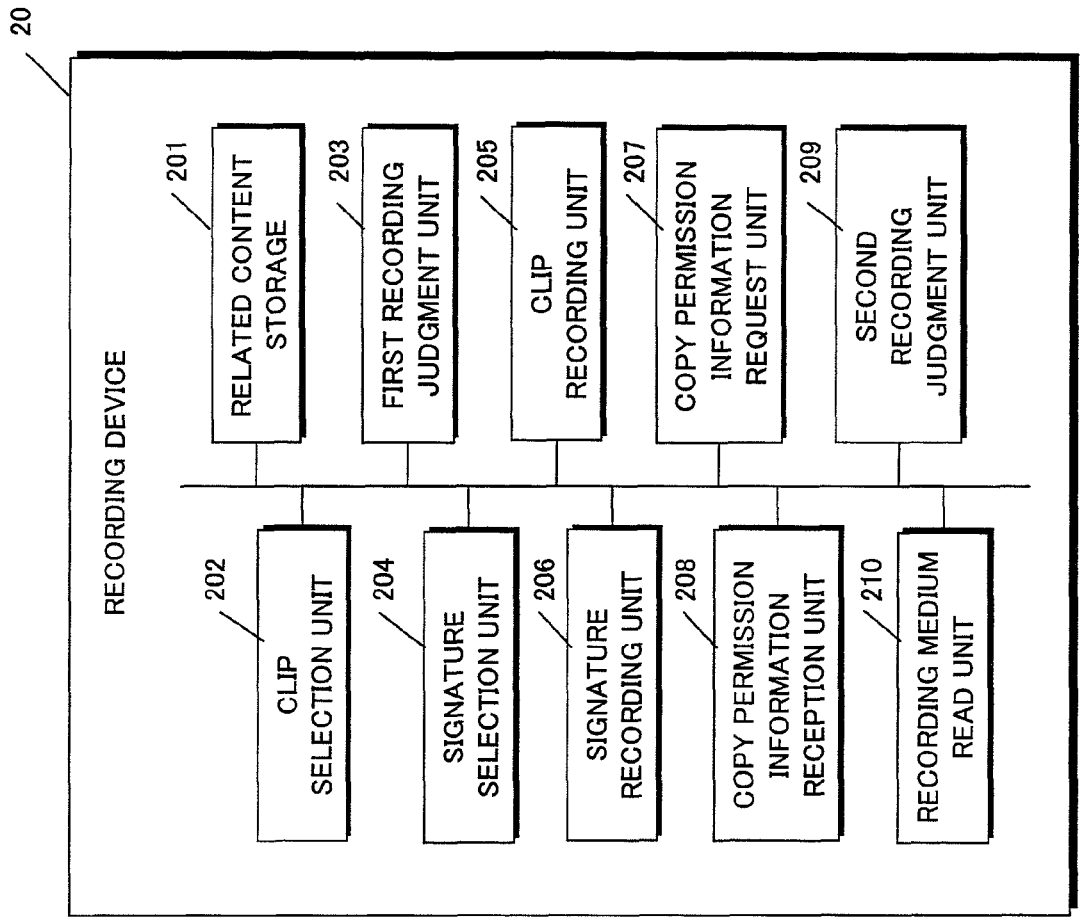
FIG. 6 is a functional block diagram showing the construction of a recording device 20 functionally.

FIG. 6 is a functional block diagram showing the construction of the recording device 20 functionally.

As shown in FIG. 6, the recording device 20 is composed of a related content storage 201, a clip selection unit 202, a first recording judgment unit 203, a signature selection unit 204, a clip recording unit 205, a signature recording unit 206, a copy permission information request unit 207, a copy permission information reception unit 208, a second recording judgment unit 209, and a recording medium read unit 210.

The recording device 20 is specifically a computer system including a microprocessor, ROM, RAM, hard disk unit and the like. One of the ROM, RAM, and the hard disk unit has recorded thereon a computer program. The recording device 20 achieves its functions by the microprocessor executing the computer program.

(1) Related Content Storage 201

The related content storage 201 has stored therein one or more related contents. Here, the "related content" refers to a content related to a certain content. For example, the related content may be bonus footage, subtitles, etc. related to a content that is recorded on a package medium for marketing.

Figure 7:
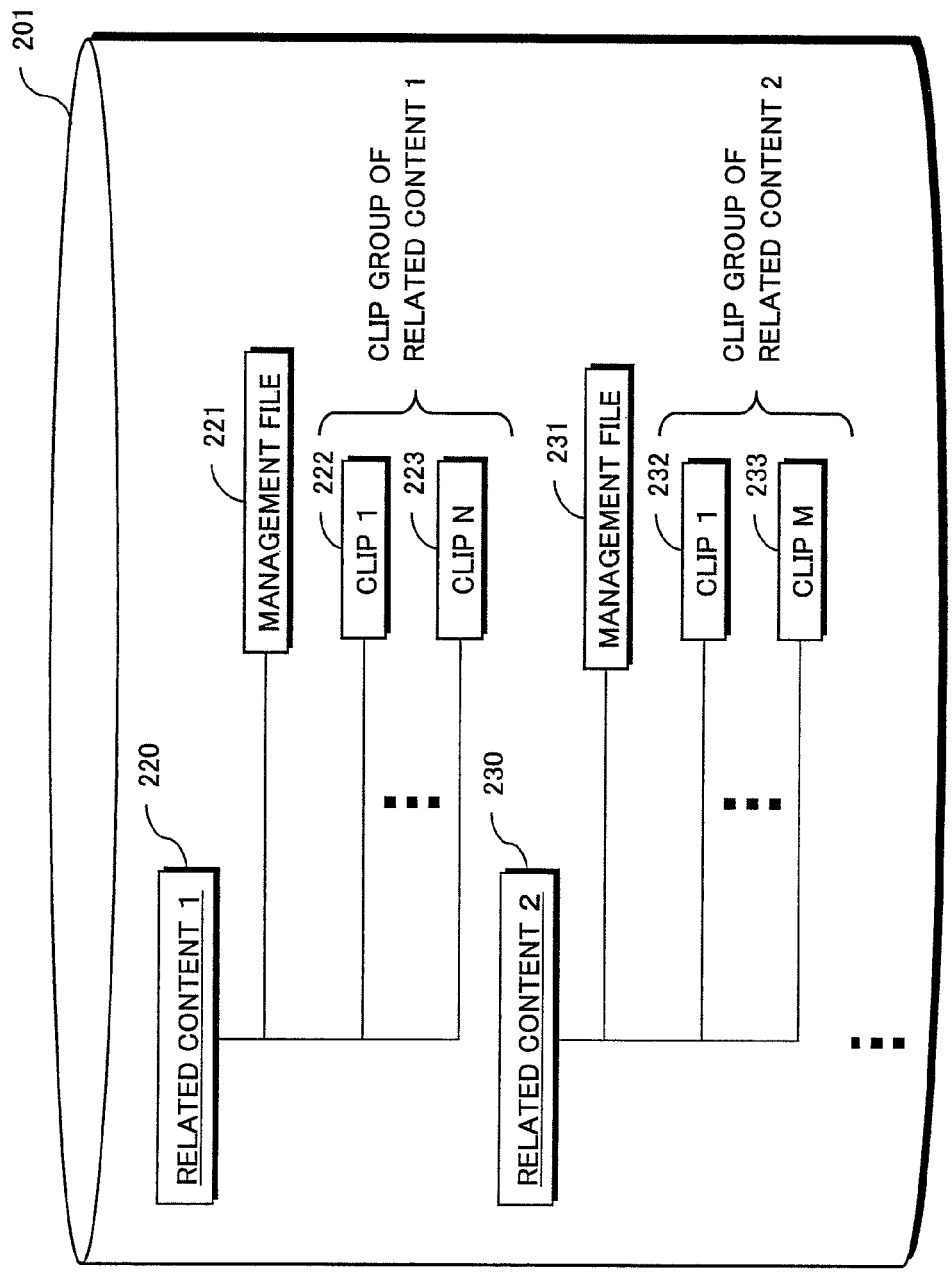
FIG. 7 shows the data structure of a related content stored in a related content storage 201.

FIG. 7 shows the data structure of a related content stored in the related content storage 201. As shown in FIG. 7, the related content storage 201 has stored therein a related content 1, a related content 2, . . . . It is assumed here that the "related content 1" is a content related to the "content 1", and the "related content 2" is a content related to the "content 2".

Each related content is composed of a management file and a clip group obtained by dividing a related content by a certain length.

Specifically, the related content 1 (220) is composed of a management file 221, and a clip 1 (222), . . . , a clip N (223), and the related content 2 (230) is composed of a management file 231, and a clip 1 (232), . . . , a clip M (233).

FIG. 8 shows the data structure of the management file 221.

As shown in FIG. 8, the management file 221 includes (i) a content ID "0x234 . . . " for identifying the related content 1, (ii) a content ID "0x123 . . . " for identifying the content 1 that is related to the related content 1, (iii) clip IDs, each of which identifies a corresponding one of a plurality of clips included in the related content, and (iv) file names that are in one-to-one correspondence with the clip IDs. Specifically, a clip ID 1 "0x102" is an identifier for identifying a file name 1 "clip 1", and a clip ID 2 "0x105" is an identifier for identifying a file name 2 "clip 2".

The data structure of the management file 231 is the same as that of the management file 221.

Note that the clip IDs of the related content are different from the clip IDs of the content.

Also, it is assumed that the related content stored in the related content storage 201 is obtained either by the recording device 20 downloading from the management server 30 via the communication channel 50 in advance, or by the recording device 20 reading from a third recording medium that has recorded thereon the related content.

Note that the related content storage 201 shown in FIG. 7 has stored therein a plurality of related contents. However, in the present embodiment, it is not necessary for the related content storage 201 to have stored therein the related content 2, since the first recording medium 10 has recorded thereon only the content 1. The related content storage 201 may have stored therein only the related content 1.

(2) Clip Selection Unit 202

The clip selection unit 202 selects one or more clips that are to be recorded onto the second recording medium 40, from among the clips recorded on the first recording medium 10 and the clips of the related content stored in the related content storage 201.

In order to select a clip of the related content that is related to the content recorded on the first recording medium 10, the clip selection unit 202 searches, from the related content storage 201, the management file including the content ID (0x123 . . . ) that is recorded on the first recording medium 10.

The clip selection unit 202 includes a display device and an input device. Specifically, the display device is a television, a display, or the like, and the input device is a mouse, a keyboard, a remote controller, or the like. The clip selection unit 202 let a user specify a clip via the display device, and receives the specification given by the user via the input device.

(3) First Recording Judgment Unit 203

The first recording judgment unit 203 receives content copy permission information from the copy permission information reception unit 208, and judges whether to continue a copy process, based on the received content copy permission information.

The content copy permission information is set to either "1" or "0". When the content copy permission information is set to "1", the first recording judgment unit 203 judges that the copy process is to be continued, and when the information is set to "0", the first recording judgment unit 203 judges that the copy process is to be stopped.

(4) Signature Selection Unit 204

The signature selection unit 204 selects whether to record, onto the second recording medium 40, the first signature recorded on the first recording medium 10 or the second signature acquired from the management server 30, based on a clip permitted to be recorded on the second recording medium 40.

(5) Clip Recording Unit 205

The clip recording unit 205 records, onto the second recording medium 40, a clip permitted by the second recording judgment unit 209 to be recorded onto the second recording medium 40.

(6) Signature Recording Unit 206

The signature recording unit 206 records, on the second recording medium 40, a signature selected by the signature selection unit 204 and a clip digest value corresponding to the signature.

That is, the signature recording unit 206 records, on the second recording medium 40, the first signature 107 and a clip digest value corresponding thereto, when recording the first signature 107, and records, on the second recording medium 40, the second signature and a clip digest value corresponding thereto, when recording the second signature.

(7) Copy Permission Information Request Unit 207

The copy permission information request unit 207 transmits, to the management server 30, information necessary for a copy permission process by the management server 30.

The information transmitted to the management server 30 is, for example, a content ID for specifying a content requested to be copied, credit card information for a billing process, and such.

(8) Copy Permission Information Reception Unit 208

The copy permission information reception unit 208 receives copy permission information from the management server 30.

The copy permission information includes the content copy permission information which is set to "1" or "0". "1" indicates that copying is permitted, and "0" indicates that copying is not permitted.

When the content copy permission information is "1", the copy permission information reception unit 208 receives, as the copy permission information, (i) the content copy permission information, (ii) the second signature, (iii) a plurality of clip digest values corresponding to the second signature, and (iv) a second clip copy permission list.

When the content copy permission information is "0", the copy permission information reception unit 208 receives copy permission information only including the content copy permission information.

The copy permission information reception unit 208 outputs the content copy permission information to the first recording judgment unit 203.

Note that, in a case where all the clips to be copied are recorded on the first recording medium 10, the copy permission information reception unit 208 may receive, as the copy permission information, only information indicating that "copying is permitted", even when the content copy permission information is indicating "1".

(9) Second Recording Judgment Unit 209

The second recording judgment unit 209 judges whether the clip selected by the clip selection unit 202 is permitted to be recorded on the second recording medium 40. Specifically, the second recording judgment unit 209 makes the above-described judgment, based on the second clip copy permission list acquired from the management server 30. A description of the second clip copy permission list is provided below.

(10) Recording Medium Read Unit 210

The recording medium read unit 210 reads information from the first recording medium 10, while the first recording medium 10 is inserted in the recording device 20.

This concludes the explanation of the internal construction of the recording device 20.

4. Internal Construction of Management Server 30

Figure 9:
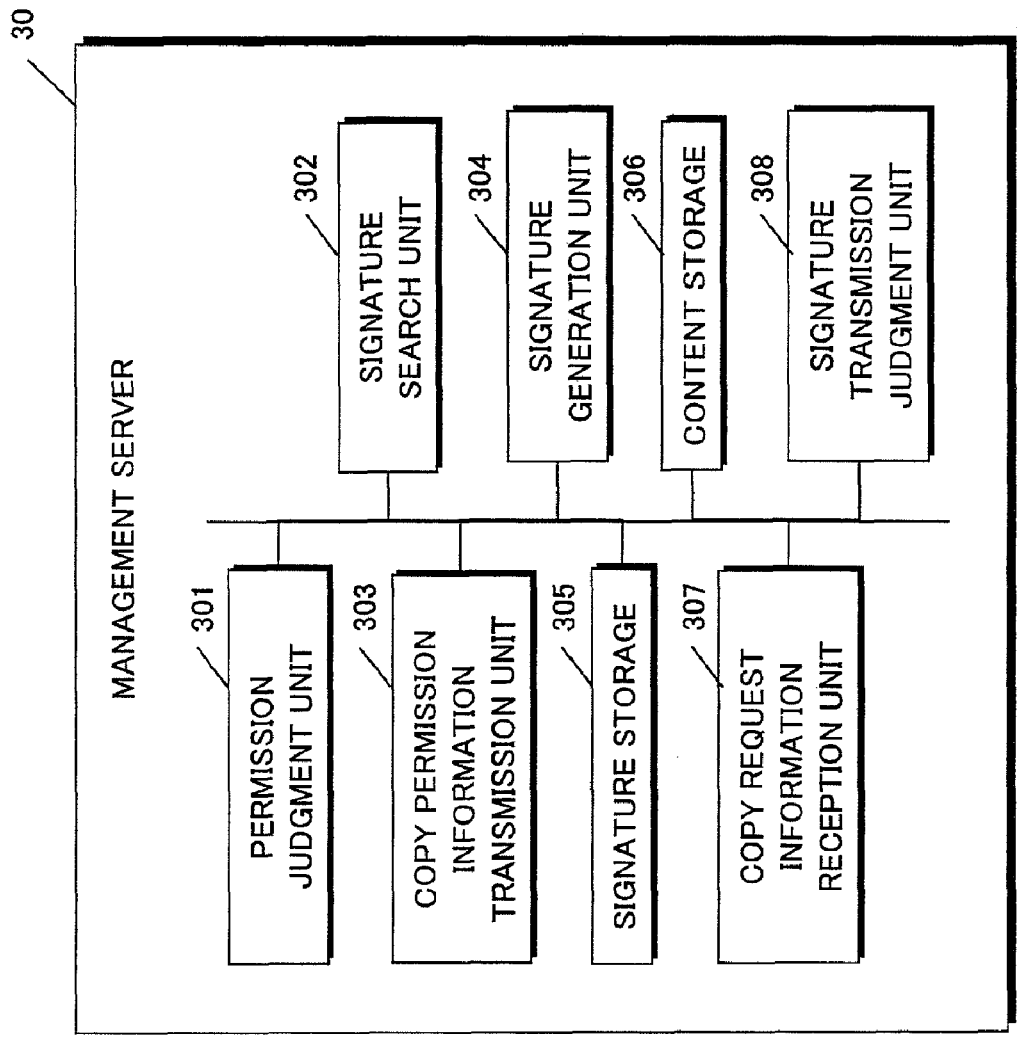
FIG. 9 is a functional block diagram showing the construction of a management server 30 functionally.

FIG. 9 is a functional block diagram showing the construction of the management server 30 functionally.

As shown in FIG. 9, the management server 30 is composed of a permission judgment unit 301, a signature search unit 302, a copy permission information transmission unit 303, a signature generation unit 304, a signature storage 305, a content storage 306, a copy request information reception unit 307, and a signature transmission judgment unit 308.

The management server 30 is specifically a computer system including a microprocessor, ROM, RAM, hard disk unit and the like. One of the ROM, RAM, and the hard disk unit has recorded thereon a computer program. The management server 30 achieves its functions by the microprocessor executing the computer program.

(1) Copy Request Information Reception Unit 307

The copy request information reception unit 307 receives copy request information from the recording device 20. The copy request information includes, for example, the content ID of a content requested to be copied, the credit card information of a user, etc.

The copy request information reception unit 307 outputs the received copy request information to the permission judgment unit 301.

(2) Permission Judgment Unit 301

The permission judgment unit 301 receives, from the copy request information reception unit 307, the copy request information received from the recording device 20, and performs a permission process for permission for copying a content requested by the recording device 20, based on the received copy request information.

Here, a specific example of the permission process performed by the permission judgment unit 301 is a billing process. The permission judgment unit 301 receives, from the copy request information reception unit 307, the content ID of the content requested to be copied, credit card information pertaining to a credit card of a user, etc., and performs the billing process with use of the credit card information.

The permission judgment unit 301 records the value "1", which indicates that copying is permitted, as the content copy permission information, when the billing process has been completed normally, and records the value "0", which indicates that copying is not permitted, as the content copy permission information, when the billing process has not been completed normally.

The permission judgment unit 301 outputs the content copy permission information, which has been set to either "1" or "0", to the copy permission information transmission unit 303 and the signature transmission judgment unit 308.

(3) Content Storage 306

The content storage 306 has stored therein the content and the related content.

Figure 10:
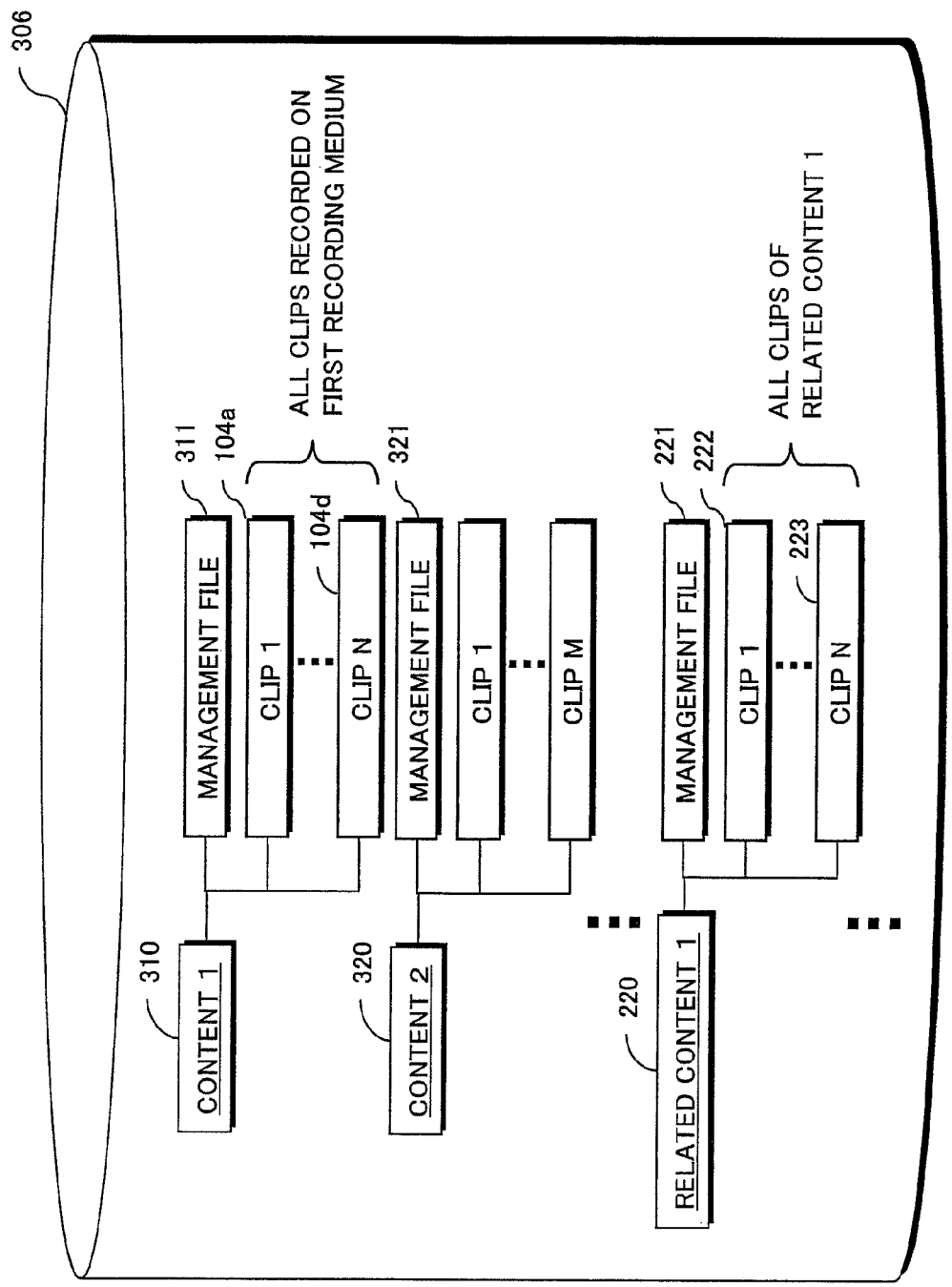
FIG. 10 shows the data structure of a content and a related content stored in a content storage 306.

FIG. 10 shows the structure of data stored in the content storage 306.

As shown in FIG. 10, each of the content and related content stored in the content storage 306 is composed of a management file and one or more clips.

FIG. 11 shows the data structure of a management file 311 for a content 1 (310) stored in the content storage 306.

As shown in FIG. 11, the management file 311 has recorded therein (i) the content ID "0x123 . . . " of the content 1, (ii) the clip ID of each of the clips included in the content 1, and (iii) a file name of each clip corresponding to the respective clip IDs.

The management files of contents other than the content 1 have the same data structure as that of the management file 311 shown in FIG. 11.

Note that it is acceptable as long as the content storage 306 has stored therein all the clips of the content recorded on the first recording medium 10, and all the clips of the related content acquirable by the recording device 20. In other words, since the first recording medium 10 has recorded thereon only the content 1 in the present embodiment, the content storage 306 only needs to have stored therein the content 1 (310) and the related content 1 (220), and does not necessarily need to have stored therein the content 2 (330), the related content 2 that is related to the content 2, and such.

(4) Signature Generation Unit 304

The signature generation unit 304 calculates the clip digest values and the second signature, for each of the content and the related content stored in the content storage 306.

Specifically, the signature generation unit 304 generates the second signature for each of the content IDs. In other words, the signature generation unit 304 generates a second signature 1 based on the content 1 and the related content 1, and a second signature 2 based on the content 2 and the related content 2.

Figure 12:
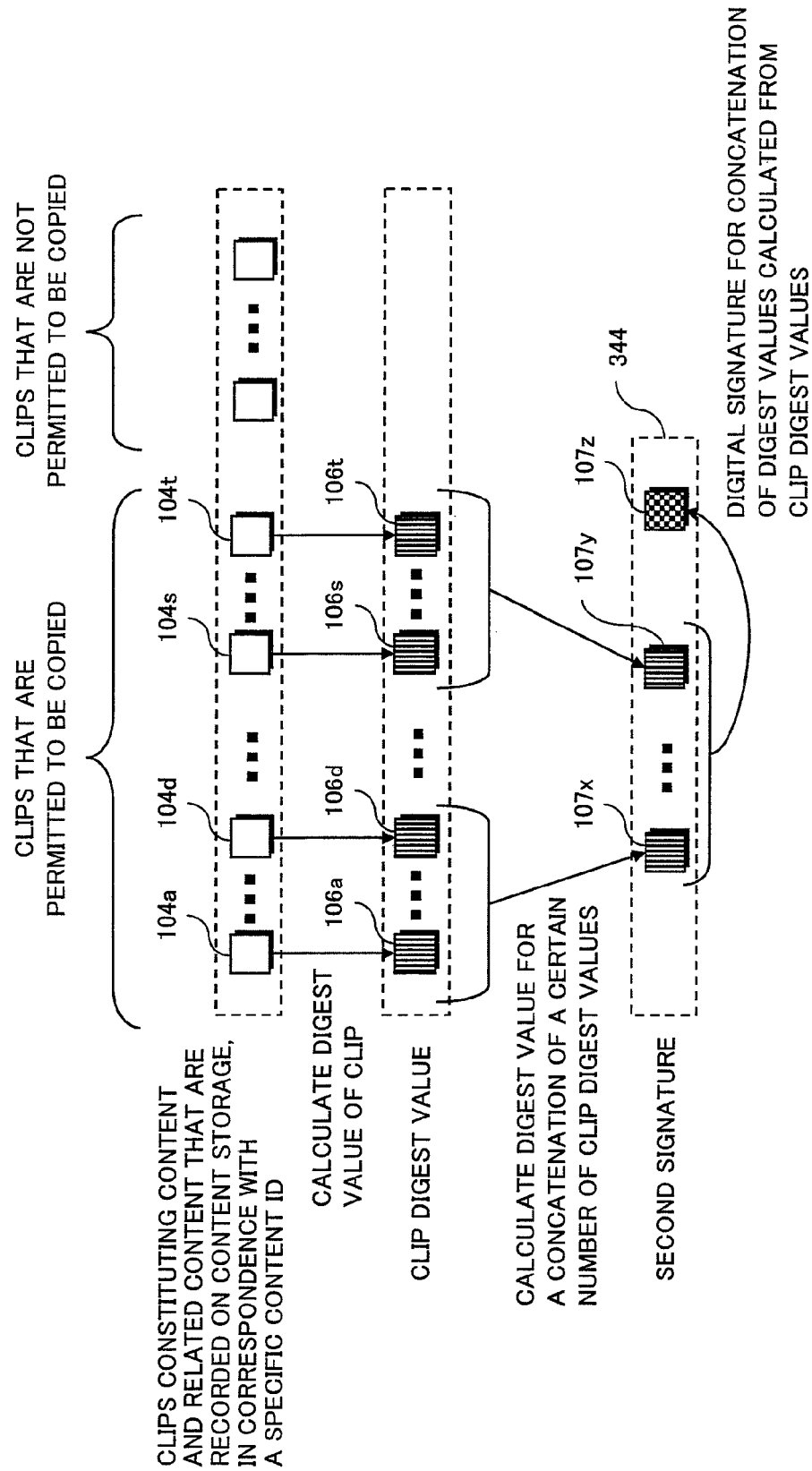
FIG. 12 is a diagram for explaining a generation method of a second signature generated by a signature generation unit 304 in the management server 30.

FIG. 12 is a diagram for explaining the correspondence among the content, the related content, the clip, the clip digest value, and the second signature. Here, a description is provided with use of the content 1 corresponding to the content ID "0x123" and the related content 1, as a specific example.

Each of the clip digest values is obtained by calculating a digest value from each of the clips permitted to be copied, among all the clips included in the content 1 and the related content 1. Specifically, the clip digest value 106a is calculated from the clip 104a. In the same manner, clip digest values 106d, ..., 106s, and 106t are calculated from clips 104d, ..., 104s, and 104t, respectively.

Subsequently, the calculated clip digest values are divided into blocks each containing a certain number of calculated clip digest values. Then, the calculated clip digest values are concatenated to each other by each block, and a digest value is calculated for each of the concatenated values. In FIG. 12, each of digest values 107x, ..., 107y is calculated from the respective concatenated values. Then, a digital signature 107z is generated for a value obtained by concatenating the digest values 107x, ..., 107y.

The second signature 1 (344) is composed of the digest values 107x, ..., 107y, and the digital signature 107z.

In other words, the second signature 1 (344) is generated based on all the clips permitted to be copied, among the clips of the content 1 recorded on the first recording medium 10, and the clips of the related content 1 related to the content 1.

(5) Signature Storage 305

Figure 13:
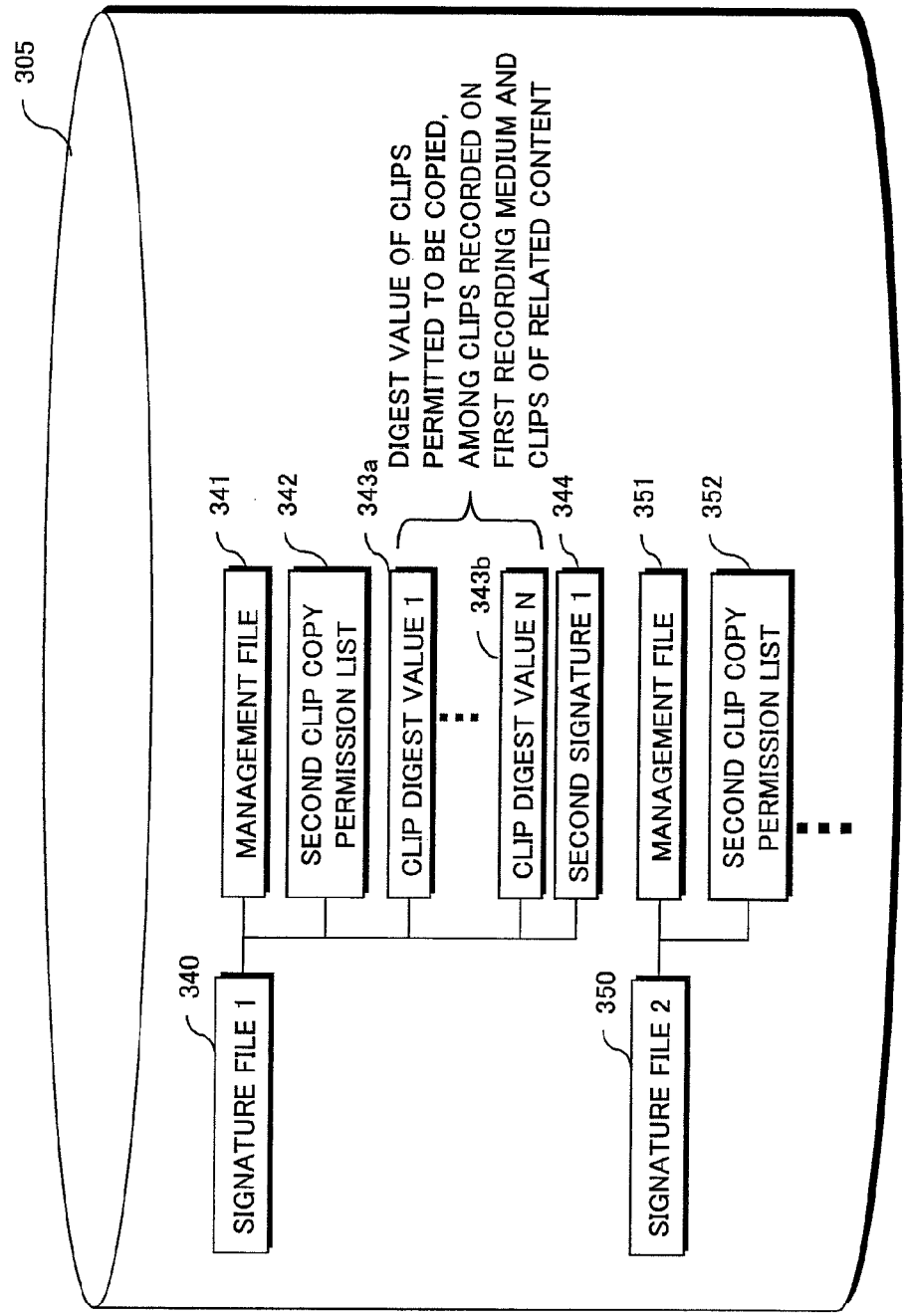
FIG. 13 shows the data structure of a signature file stored in a signature storage 305.

FIG. 13 shows the structure of data stored in the signature storage 305.

As shown in FIG. 13, the signature storage 305 has stored therein a plurality of signature files. Each of the signature files is composed of the management file, the second clip copy permission list, one or more clip digest values, and the second signature.

For example, the signature file 1 (340) is composed of a management file 341, a second clip copy permission list 342, the clip digest value 1 (106a), ..., the clip digest value N (106t), and the second signature 1 (344).

Figure 14:
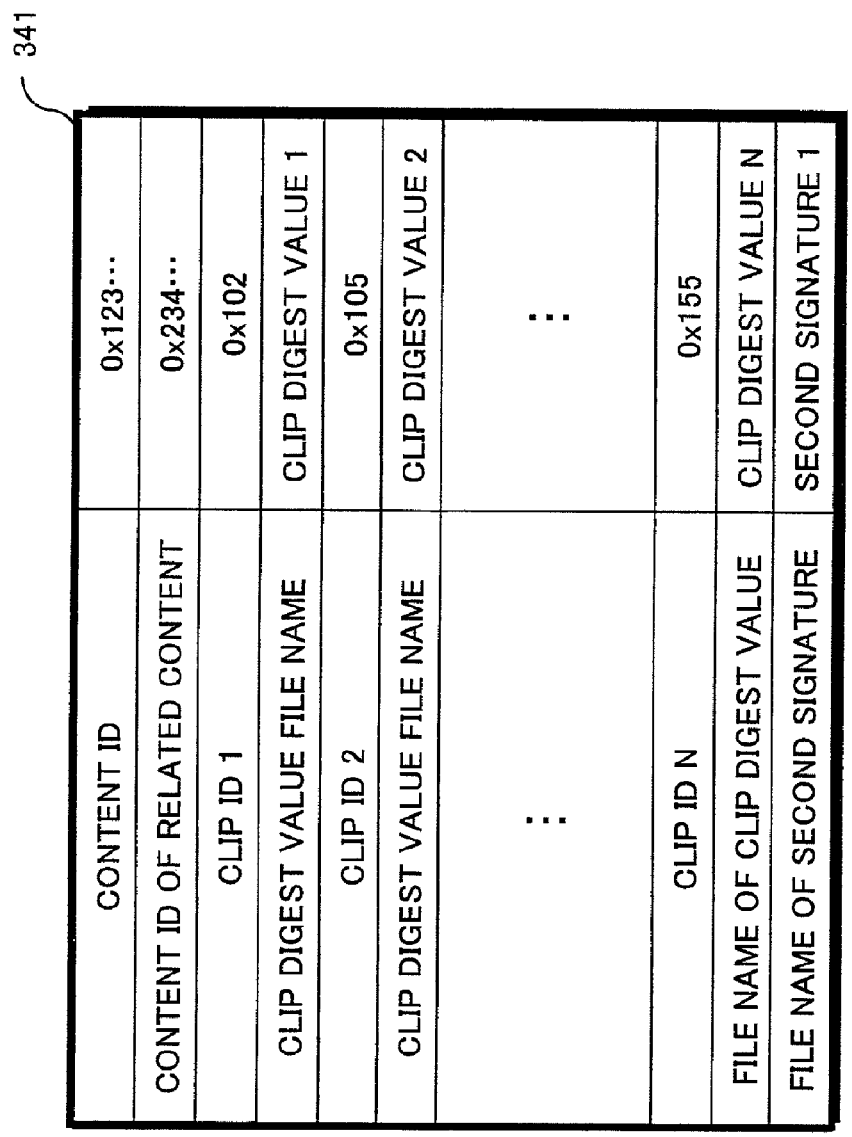
FIG. 14 shows the data structure of a management file 341 of a signature file 1 (340)

FIG. 14 shows the structure of data included in the management file 341.

As shown in FIG. 14, the management file 341 has recorded therein (i) the content ID "0x123 ..." of the content 1, (ii) the content ID "0x234" of the related content 1, (iii) the clip ID of each of the clips permitted to be copied, among the clips of the content 1 and related content 1, (iv) the file name of the clip digest value of each of the clips corresponding to the respective clip IDs, and (v) the filename of the second signature.

Also, the second clip copy permission list 342 stores information indicating a clip permitted to be copied among the clips of the content 1 and the related content 1. Specifically, the second copy permission list 342 stores the clip ID of the clip permitted to be copied, in the same manner as the first copy permission list 105 shown in FIG. 4.

(6) Signature Search Unit 302

Upon receipt of an instruction for a signature search process from the signature transmission judgment unit 308, the signature search unit 302 performs the following process.

First, the signature search unit 302 acquires the content ID that has been received by the copy request information reception unit 307 from the recording device 20.

Then, the signature search unit 302 reads, from the signature storage 305, (i) the second clip copy permission list corresponding to the acquired content ID, (ii) the second signature, and (iii) all the clip digest values corresponding to the second signature.

(7) Copy Permission Information Transmission Unit 303

Upon receipt of a result of the permission process (the content copy permission information that is set to either "1" or "0") from the permission judgment unit 301, the copy permission information transmission unit 303 transmits, to the recording device 20, the copy permission information corresponding to the result of the permission process that has been received.

Specifically, in a case where the content is permitted to be copied as the result of the permission process, the copy permission information transmission unit 303 transmits, to the recording device 20, the copy permission information composed of (i) the content copy permission information that is set to "1", and (ii) the second clip copy permission list, (iii) the second signature, and (iv) all the clip digest values corresponding to the second signature, that have been acquired by the signature search unit 302.

In a case where the content is not permitted to be copied as the result of the permission process, the copy permission information transmission unit 303 transmits, to the recording device 20, only the content copy permission information that is set to "0", as the copy permission information.

(8) Signature Transmission Judgment Unit 308

The signature transmission judgment unit 308 receives the content copy permission information from the permission judgment unit 301. Then, the signature transmission judgment unit 308 judges whether to perform the signature search process, based on the value of the content copy permission information.

In a case where the content copy permission information is "1", the signature transmission judgment unit 308 judges that the signature search process is to be performed. In a case where the content copy permission information is "0", the signature transmission judgment unit 308 judges that the signature search process is not to be performed. When judging that the signature search process is to be performed, the signature transmission judgment unit 308 outputs an instruction for performing the signature search process to the signature search unit 302.

This concludes an explanation of the internal construction of the management server 30.

<Operation>

The following describes the operation of the content copy processing system 1.

The process of the content copy processing system 1 includes an initial process and a main process.

Specifically, the initial process of the content copy processing system 1 is a generation process of the second signature performed by the management server 30. The management server 30 calculates the clip digest value of a clip permitted to be copied, and the second signature, based on all of the contents and the related contents stored in the content storage 306. Then, the management server 30 stores, in the signature storage 305, all the clip digest values and the second signatures that have been calculated.

Note that this initial process needs to be performed only once by the management server 30, at the time of activating the content copy processing system 1. However, in a case where clips for storing in the content storage 302 have been added, the second signature needs to be calculated again by calculating the clip digest values of the clips that have been added. Therefore, it is necessary to perform the initial process again.

The following describes the operation of the main process of the content copy processing system 1.

Figure 15:
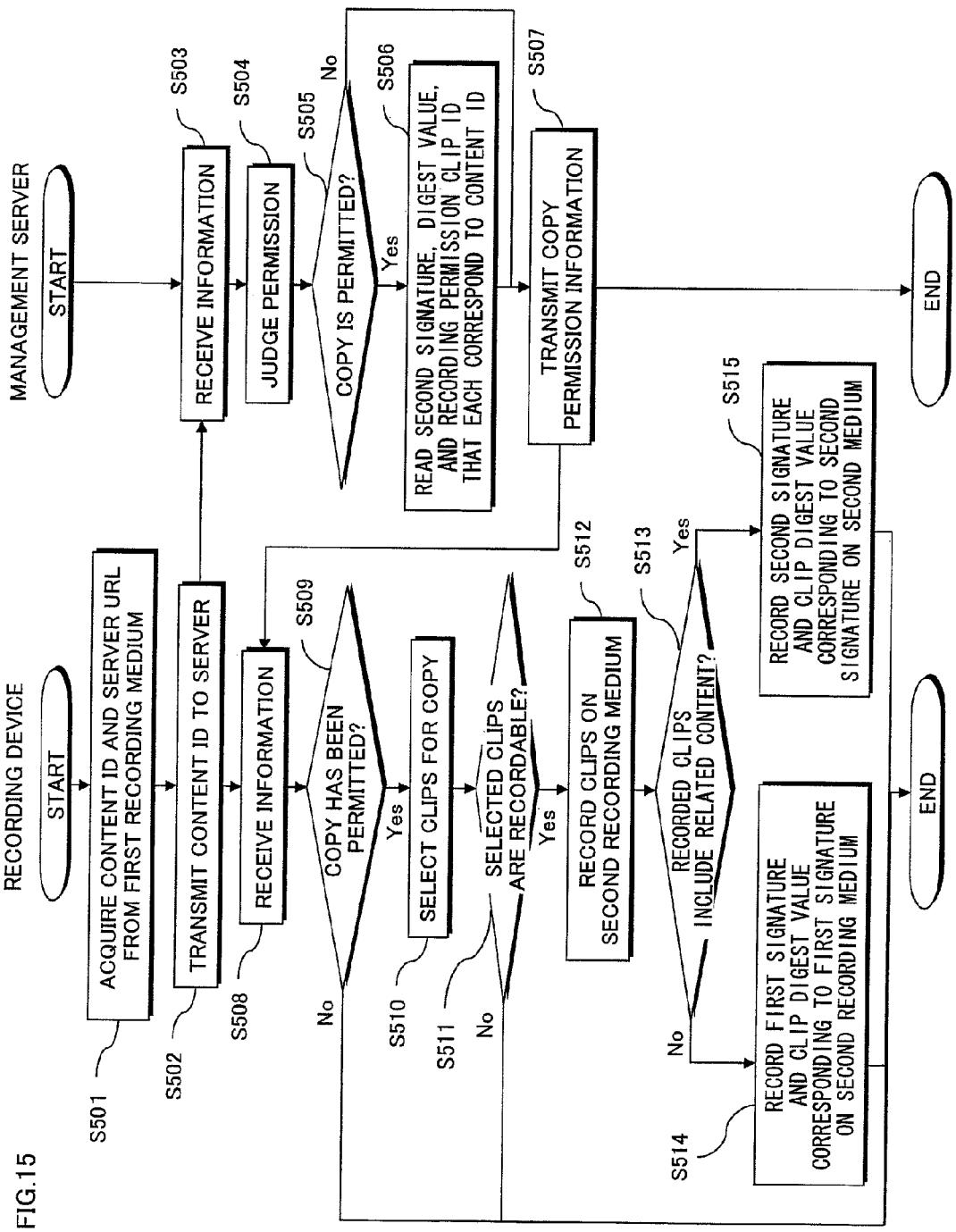
FIG. 15 is a flowchart showing an overall operation of the content copy processing system 1 according to the first embodiment.

FIG. 15 is a flowchart showing the operation of the main process.

The recording device 20 acquires, from the first recording medium 10, the content ID 102 and the URL 101 of the management server 30 (step S501).

Then, the recording device 20 transmits the content ID 102 to the address indicated by the URL 101 (step S502).

In step S502, the recording device 20 transmits, to the management server 30, information necessary for the permission process performed by the management server 30, together with the content ID 102. For example, if it is necessary to perform the billing process, the recording device 20 transmits credit card information pertaining to a credit card of a user.

The management server 30 receives the content ID 102 from the recording device 20 (step S503). In step S503, the management server 30 may receive the credit card information, etc. in addition to the content ID 102.

The management server 30 specifies the content 1 recorded on the first recording medium 10, based on the content ID 102.

Subsequently, the management server 30 judges whether to permit copying of the clips included in the content 1 and copying of the clips included in the related content 1, and records a result of the judgment as the content copy permission information (step S504).

Specifically, the management server 30 records "1" as the content copy permission information when permitting the copying (YES in step S505), and records "0" as the content copy permission information when not permitting the copying (NO in step S505).

In the case of recording "1" as the content copy permission information, the management server 30 reads, from the signature storage 305, the second clip copy permission list 342, all the clip digest values (106a, ..., 106t), and the second signature 1 (344) that each correspond to the content ID 102 (step S506). Then, the management server 30 includes, in the copy permission information, (i) the content copy permission information, (ii) the second clip copy permission list, (iii) all of the clip digest values, and (iv) the second signature 1.

In a case of recording "0" as the content copy permission information, the management server 30 includes only the content copy permission information in the copy permission information.

The management server 30 transmits the copy permission information to the recording device 20 (step S507).

The recording device 20 receives the copy permission information from the management server 30 (step S508). In a case where the content copy permission information indicates "1" (YES in step S509), the recording device 20 proceeds to step S510 and continues the copy process. In a case where the content copy permission information indicates "0" (NO in step S509), the recording device 20 ends the copy process.

Subsequently, the clip selection unit 202 in the recording device 20 receives a selection of clips desired to be copied, among the clips of the content 1 recorded on the first recording medium 10, and the clips of the related content 1 that is related to the content 1 (step S510). The clip selection unit 202 outputs the clip ID of each of the selected clips to the second recording judgment unit 209. Note that, in step S510, one or more clip IDs are selected.

Meanwhile, the copy permission information reception unit 208 in the recording device 20 extracts, from the copy permission information received from the management server 30, the second clip copy permission list 342, all the clip digest values (106a, ..., 106t), and the second signature 344.

The copy permission information reception unit 208 outputs the second clip copy permission list 342 to the second recording judgment unit 209, and outputs all the clip digest values (106a, ..., 106t) and the second signature 344 to the signature recording unit 206.

The second recording judgment unit 209 checks whether the one or more clip IDs received from the clip selection unit 202 are included in the second clip copy permission list 342 received from the copy permission information reception unit 208.

In a case where a clip ID not included in the second clip copy permission list 342 is included in the clip IDs received from the clip selection unit 202, the recording device 20 judges that the selected clips are not permitted to be copied (NO in step S511), and ends the copy process.

In a case where all the clip IDs received from the clip selection unit 202 are included in the second clip copy permission list 342, the recording device 20 judges that the selected clips are permitted to be copied (YES in step S511), and records the selected clips onto the second recording medium 40 (step S512).

Subsequently, the second recording judgment unit 209 outputs, to the signature selection unit 204, related content recording presence information.

Here, the related content record presence information indicates whether any of the clips of the related content 1 recorded on the related content storage 201 is included in the clips that have been recorded on the second recording medium 40 in step S512. The related content recording presence information is set to either "1" or "0". "1" indicates that one or more clips of the related content 1 are included in the clips recorded on the second recording medium 40, and "0" indicates that none of the clips of the related content 1 is included in the clips recorded on the second recording medium 40.

The signature selection unit 204 selects a signature and clip digest values that are to be recorded onto the second recording medium 40, based on the related content recording presence information received from the second recording judgment unit 209.

Specifically, in a case where the related content recording presence information is set to "0", the signature selection unit 204 judges that the recorded clips do not include any of the clips of the related content (NO in step S513), selects the first signature 107 and the clip digest values corresponding thereto, and outputs the first signature 107 and the corresponding clip digest values to the signature recording unit 206. The signature recording unit 206 records the first signature 107 and the corresponding clip digest values onto the second recording medium 40 (step S514).

In a case where the related content recording presence information is set to "1", the signature selection unit 204 judges that the recorded clips include one or more clips of the related content (YES in step S513), selects the second signature 344 and the clip digest values corresponding thereto, and outputs the second signature 344 and the corresponding clip digest values to the signature recording unit 206. The signature recording unit 206 records the second signature 344 and the corresponding clip digest values onto the second recording medium 40 (step S515).

Note that, in step S511, in a case where a clip ID not included in the second clip copy permission list 342 is included in the clip IDs received from the clip selection unit 202, the recording device 20 judges that the selected clips are not permitted to be copied, and ends the copy process. However, it is not limited to such, the recording device 20 may judge that only the clips included in the second clip copy permission list 342 are permitted to be copied, and proceed to the process of step S512.

Furthermore, in a case where a clip not permitted to be copied is included, the recording device 20 may issue a warning and ask a user whether to continue the process, thereby letting the user determine whether to continue the process.

This concludes the description of the operation of the content copy processing system 1.

Effect of the First Embodiment

According to the first embodiment, the clip digest values corresponding to the first signature 107 are digest values for all the clips permitted to be copied among the clips of the content 1 recorded on the first recording medium 10, and the clip digest values corresponding to the second signature 344 are digest values for all the clips permitted to be copied among the content 1 and the related content 1. Therefore, a signature for recording onto the second recording medium 40 may be selected from the first signature 107 and the second signature 344.

<Modification 1>

Figure 16:
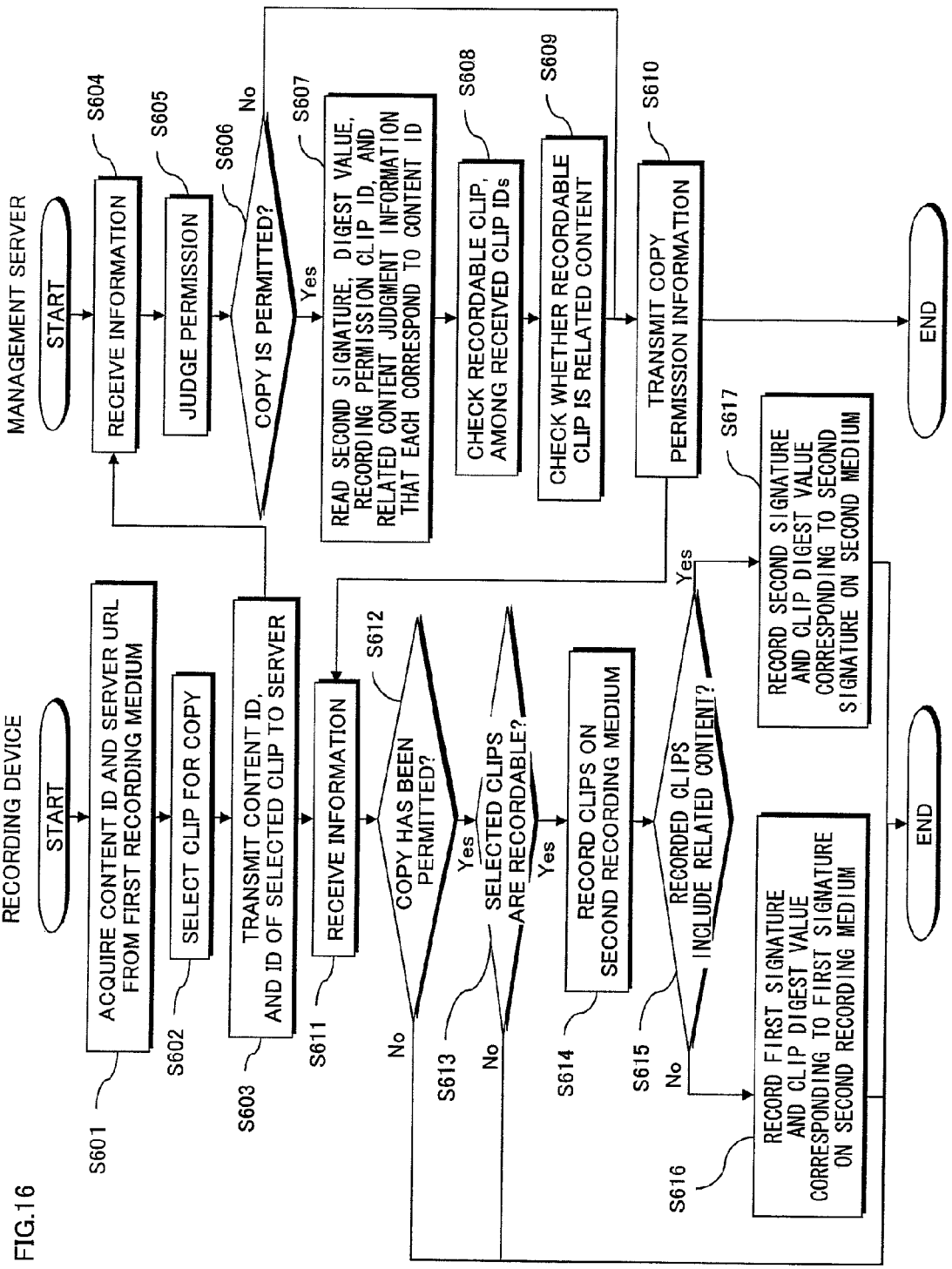
FIG. 16 is a flowchart showing an operation according to a modification 1 of the first embodiment.

In the first embodiment, the recording device 20 judges whether the selected clip is permitted to be copied onto the second recording medium 40. However, it is possible for the management server 30 to make this judgment instead of the recording device 20. The following describes a process performed when the management server 30 makes the judgment, with reference to FIG. 16.

The recording device 20 acquires, from the first recording medium 10, the content ID 102 and the URL 101 of the management server 30 (step S601).

Then, the recording device 20 selects a clip desired to be copied (step S602), and transmits the clip ID of the selected clip desired to be copied and the content ID 102 to the address indicated by the URL 101 (step S603).

Also, in a case where the billing process is required for the permission process performed by the management server 30, the recording device 20 also transmits credit card information in step S603.

Upon receipt of the content ID 101 and the clip ID from the recording device 20 (step S604), the management server 30 performs the permission process (step S605), and records a result of the permission process as the content copy permission information.

When the permission process has not been completed normally (NO in step S606), the management server 30 records "0" as the content copy permission information, and proceeds to step S610.

When the permission process has been completed normally (YES in step S606), the management server 30 records "1" as the content copy permission information. Then, the signature search unit 302 reads, from the signature storage 305, the second signature, the clip digest value, the second clip copy permission list, and the related content judgment information that each correspond to the content ID 102 received from the recording device 20 (step S607).

Subsequently, the management server 30 judges whether the clip ID received from the recording device 20 is included in the second clip copy permission list (step S608). In a case where the clip ID is included in the second clip copy permission list, the management server 30 checks whether the clip is a clip of the related content (step S609). This check is performed by searching whether the clip belongs to the content or the related content that are stored in the content storage 306.

In a case where one or more of the clips indicated by the clip IDs that are judged to be included in the second copy permission list belong to the related content, the management server 30 sets the related content judgment information to "1". In a case where all of the clips belong to the content, the management server 30 does not change the related content judgment information. Here, the initial value of the related content judgment information is assumed to be "0".

In other words, the related content judgment information indicates whether any of the clips of the related content is included in the clips permitted to be copied onto the second recording medium 40.

The management server 30 checks whether any of the clip IDs received from the recording device 20 is included in the second clip copy permission list. In a case where all of the clip IDs are included in the second clip copy permission list, the management server 30 sets selected content recording permission information to "1", which indicates that copying is permitted. In a case where one or more of the clip IDs are not included in the second clip copy permission list, the management server 30 sets the selected content recording permission information to "0", which indicates that copying is not permitted.

The management server 30 generates the copy permission information including (i) the content copy permission information, (ii) the clip IDs of clips permitted to be recorded, (iii) the related content judgment information, (iv) the selected content recording permission information, (v) the second signature, and (vi) the clip digest values corresponding to the second signature, and transmits the generated copy permission information to the recording device 20 (step S610).

The recording device 20 receives the copy permission information from the management server 30 (step S611).

The recording device 20 extracts the content copy permission information from the copy permission information, and judges whether copying is permitted. When the copying is not permitted, in other words, when the content copy permission information is set to "0" (NO in step S612), the recording device 20 ends the process. When the copying is permitted, in other words, the content copy permission information is set to "1" (YES in step S612), the recording device 20 extracts the selected content recording permission information from the copy permission information.

The recording device 20 judges whether all of the selected clips are permitted to be copied, based on the selected content recording permission information. When the copying is not permitted, in other words, when the selected content recording permission information is set to "0" (NO in step S613), the recording device 20 ends the process. When the copying is permitted, in other words, when the selected content recording permission information is set to "1" (YES in step S613), the recording device 20 records the selected clips onto the second recording medium 40 (step S614).

Next, the recording device 20 extracts the related content judgment information from the copy permission information, and checks whether any of the clips permitted to be recorded is a clip of the related content.

When none of the clips permitted to be recorded is a clip of the related content, in other words, when the related content judgment information is set to "0", the recording device 20 records, onto the second recording medium 40, the first signature recorded on the first recording medium 10 and the clip digest value corresponding to the first signature (step S616).

When any of the clips permitted to be recorded is a clip of the related content, in other words, when the related content judgment information is set to "1", the recording device 20 records, onto the second recording medium 40, the second signature received from the management server 30 and the clip digest values corresponding to the second signature (step S617).

Note that, in the present modification, the process of and after step S614 is performed only when all of the selected clips are permitted to be copied, and the process is ended if any of the selected clips is not permitted to be copied. However, it is not limited to such, and only the clips permitted to be copied may be recorded onto the recording medium 40.

Furthermore, in a case where any of the selected clips is not permitted to be copied, the recording device 20 may issue a warning and ask a user whether to continue the process, thereby letting the user determine whether to continue the process.

<Effect of the Modification 1>

According to the modification 1 described above, the recording device 20 does not need to perform the process for comparing the clip IDs, as seen in the first embodiment.

Furthermore, according to the modification 1, the clip ID of the clip permitted to be copied is transmitted from the management server 30. Therefore, it is advantageous in that the recording device 20 does not need to record the clip IDs of the selected clips.

<Modification 2>

Note that the clips to be copied onto the second recording medium 40 may be limited to the clips recorded on the first recording medium 10.

Figure 17:
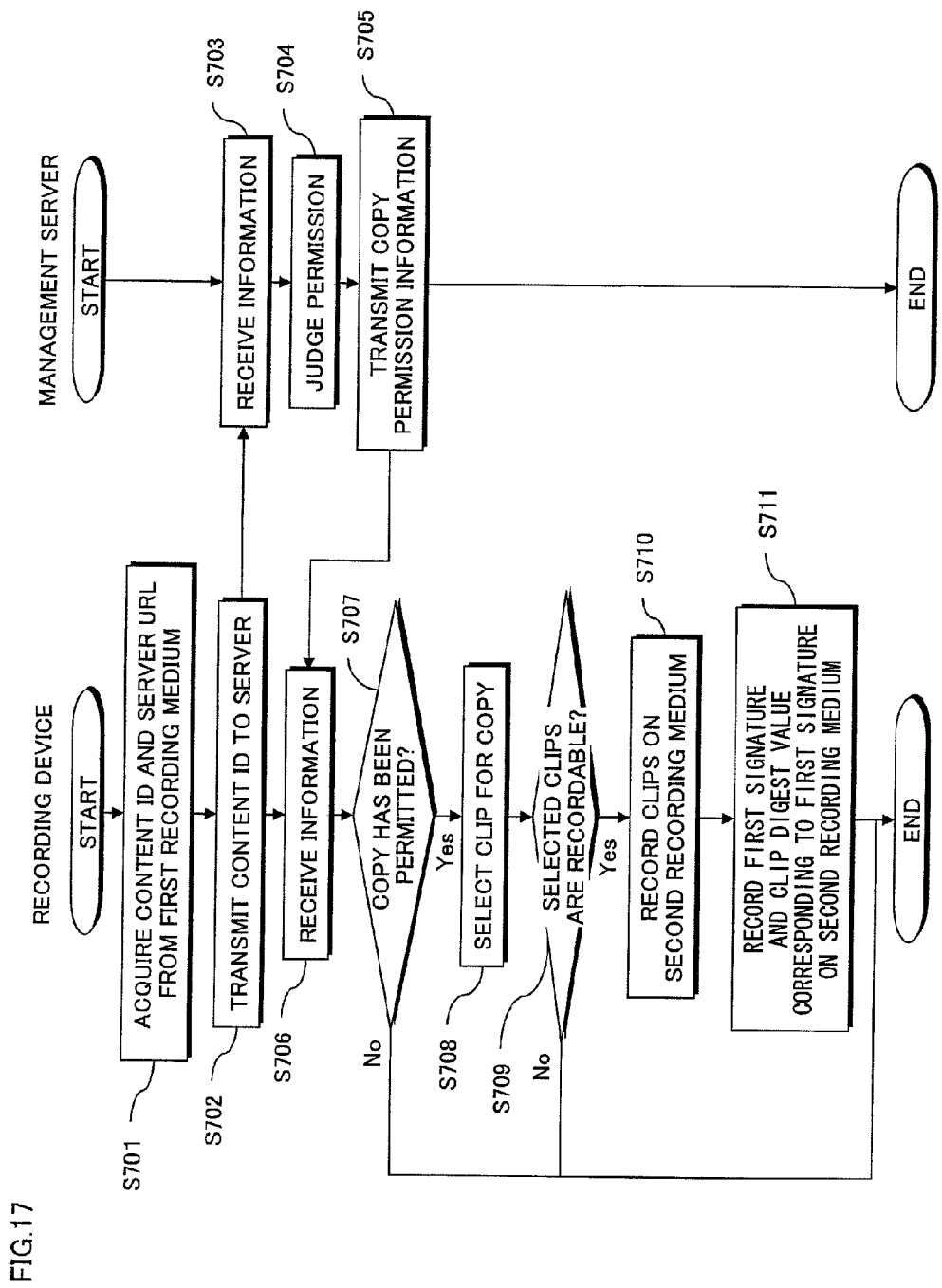
FIG. 17 is a flowchart showing an operation according to a modification 2 of the first embodiment.

The process performed in this case is described below as a modification 2, with reference to FIG. 17.

The recording device 20 acquires, from the first recording medium 10, the content ID 102 and the URL 101 of the management server 30 (step S701). Then, the recording device 20 transmits the content ID 102, credit card information of a user, etc. to the address indicated by the URL 101 (step S702).

The management server 30 receives the content ID 102, the credit card information, etc. from the recording device 20 (step S703), specifies the content recorded on the first recording medium 10, based on the content ID 102, and performs the permission process of the clips recorded on the first recording medium 10, with use of the credit card information (step S704).

Then, the management server 30 records a result of the permission process as the content copy permission information, and transmits the content copy permission information to the recording device 20 (step S705).

The recording device 20 receives the content copy permission information from the management server 30 (step S706).

When the content copy permission information indicates "0" (NO in step 707), the recording device 20 ends the copy process.

When the content copy permission information indicates "1" (YES in step 707), the recording device 20 continues the copy process.

The clip selection unit 202 in the recording device 20 selects a clip desired to be copied from among the clips recorded on the first recording medium 10 (step S708), and outputs the clip ID of the selected clip to the second recording judgment unit 209.

Upon receipt of the clip ID, the second recording judgment unit 209 checks whether the received clip ID is included in the first clip copy permission list 105 recorded on the first recording medium 10.

When the received clip ID is included in the first clip copy permission list 105 (YES in step S709), the second recording judgment unit 209 judges that the selected clip is permitted to be copied, and records the selected clip onto the second recording medium 40 (step S710).

When the received clip ID is not included in the first clip copy permission list 105 (NO in step S709), the second recording judgment unit 209 judges that the selected clip is not permitted to be copied, and ends the copy process.

Finally, the signature recording unit 206 reads, from the first recording medium 10, the first signature 107 and the clip digest values corresponding thereto, and records, on the second recording medium 40, the first signature 107 and the clip digest values that have been read (step S711).

Note that, in the modification 2, the process of and after step S710 is performed only when all of the selected clips are permitted to be copied, and the process is ended if any of the selected clips is not permitted to be copied. However, it is not limited to such, and only the clips permitted to be copied may be recorded onto the second recording medium 40.

Furthermore, in a case where a clip not permitted to be copied is included, the recording device 20 may issue a warning and ask a user whether to continue the process, thereby letting the user determine whether to continue the process.

<Effect of the Modification 2>

The modification 2 has an advantageous effect in which the recording device 20 does not need to perform the process of selecting and receiving the signatures, and the management server 30 does not need to perform the process of calculating, searching, and transmitting the signatures.

Second Embodiment

The following describes the second embodiment of the present invention.

Figure 18:
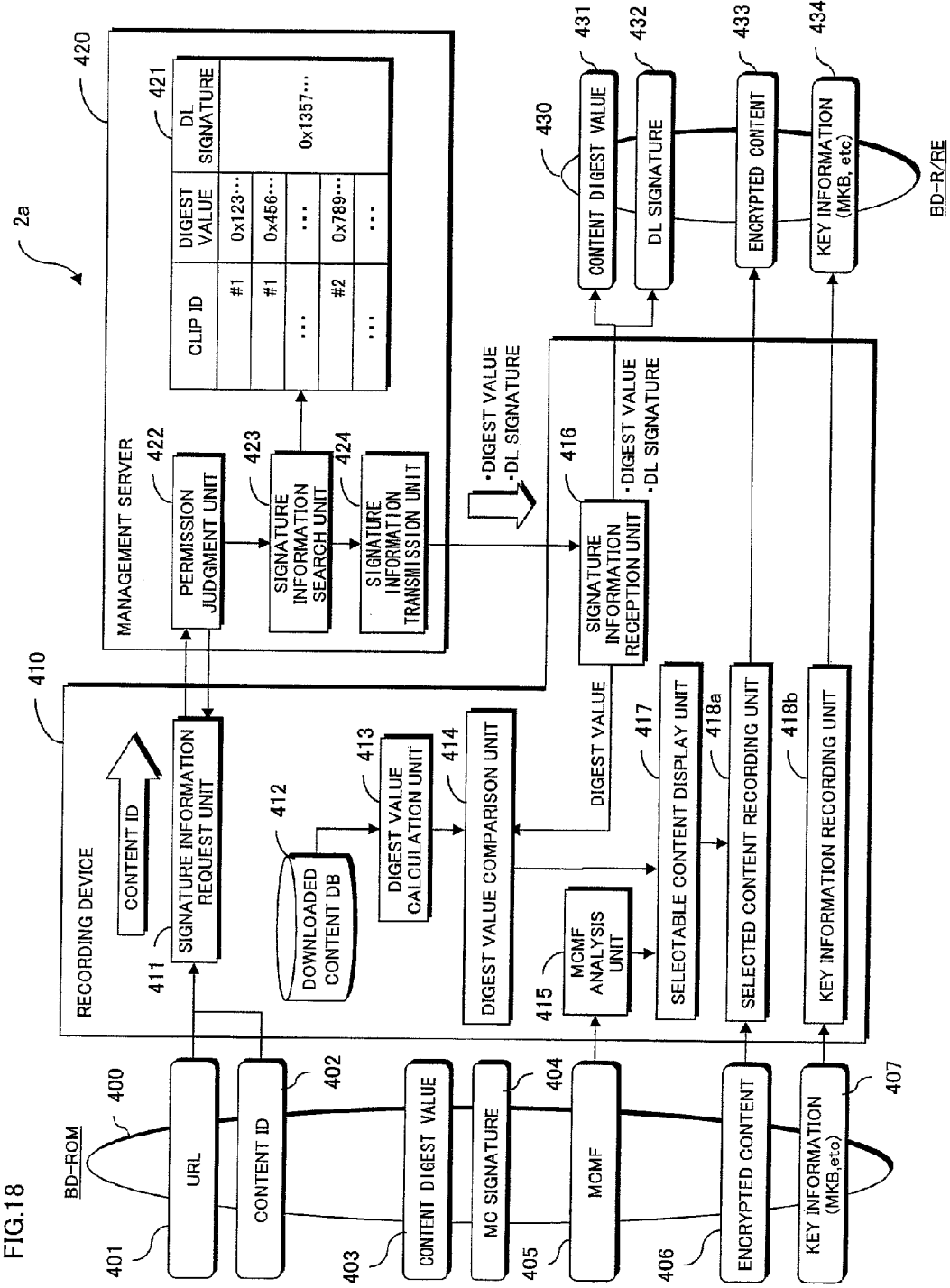
FIG. 18 shows the construction of a content copy processing system 2a according to a second embodiment of the present invention.

FIG. 18 shows the construction of a content copy processing system 2a according to the second embodiment.

As shown in FIG. 18, the content copy processing system 2a includes a BD-ROM 400, a recording device 410, a management server 420, and a BD-R/RE 430.

In the present embodiment, the recording device 410 records, onto the BD-R/RE 430, both the clips of an encrypted content recorded on the BD-ROM, and the clips of a related content downloaded from the management server 420.

The following describes the components of the content copy processing system 2a.

1. BD-ROM 400

The BD-ROM 400 is assumed to be a so-called "package medium" on which a content has been recorded by a content supplier and marketed to a user. The BD-ROM 400 is equivalent to the first recording medium 10 in the first embodiment.

The BD-ROM 400 has recorded thereon a URL 401, a content ID 402, a content digest value 403, an MC (Managed Copy) signature 404, an MCMF (Managed Copy Manifest File) 405, an encrypted content 406, and key information 407.

The URL 401 is address information indicating the location of the management server 420 on a network.

The encrypted content 406 is encrypted data generated by applying an encryption algorithm E to the content. The encryption algorithm E is, for example, DES (Data Encryption Standard).

The encrypted content 406 recorded on the BD-ROM 400 is composed of a plurality of clips obtained by dividing the encrypted content 406 by a certain length, in the same manner as the first embodiment (see FIG. 3). Each of the clips has allocated thereto a clip ID for identifying the clip.

The content ID 402 is an identifier for uniquely identifying the encrypted content 406.

The content digest value 403 is specifically a digest value group composed of a plurality of digest values that are each calculated from the respective clips included in the encrypted content 406. Note that each digest value has allocated thereto a clip ID for identifying a clip used for the calculation of the digest value.

The MC signature 404 is equivalent to the "first signature" in the first embodiment. In other words, the MC signature 404 is signature data generated based on the digest value of each clip permitted to be copied among the clips that constitute the encrypted content 406. The generation method of the MC signature 404 is described above, with use of FIG. 5.

The MCMF 405 is equivalent to the "first copy permission list" in the first embodiment. In other words, the MCMF 405 includes a clip ID for identifying a clip permitted to be copied, among the clips constituting the encrypted content 406.

The key information 407 is necessary for the decryption of the encrypted content 406. The key information 407 is, for example, MKB (Media Key Block), which is information including a key necessary for the decryption of the encrypted content. A description of the MKB is omitted here since the MKB is described in a non-patent document 1.

2. Recording Device 410

The recording device 410 is assumed to be a BD recorder, and copies, onto the BD-R/RE 430, a content recorded on the BD-ROM 400. Also, the recording device 410 is connectable to a network, and receives and transmits information to/from the management server 420 via the network.

As shown in FIG. 18, the recording device 410 is composed of a signature information request unit 411, a downloaded content DB 412, a digest value calculation unit 413, a digest value comparison unit 414, an MCMF analysis unit 415, a signature information reception unit 416, a selectable content display unit 417, a selected content recording unit 418a, and a key information recording unit 418b.

The recording device 410 is specifically a computer system including a microprocessor, ROM, RAM, hard disk unit, a network connection unit and the like.

(1) Signature Information Request Unit 411

The signature information request unit 411 acquires the URL 401 and the content ID 402 from the BD-ROM 400. Furthermore, the signature information request unit 411 acquires credit card information, etc. from a user.

The signature information request unit 411 transmits, to an address indicated by the URL 401 (to the management server 420, in the present embodiment), the content ID 402, the credit card information, etc. that have been acquired.

Then, the signature information request unit 411 acquires the content copy permission information from the management server 420. The content copy permission information is set to either "1" or "0", in the same manner as the first embodiment. "1" indicates that copying is permitted, and "0" indicates that copying is not permitted.

Upon acquisition of the content copy permission information that is set to "0", the recording device 410 cancels the rest of the content copy process. Upon acquisition of the content copy permission information that is set to "1", the recording device 410 continues the content copy process.

(2) Signature Information Reception Unit 416

When the permission process by the management server 420 has been completed normally, the signature information reception unit 416 receives, from the management server 420, digest values and a DL (Download) signature.

The digest values received by the signature information reception unit 416 from the management server 420 are digest values calculated from all the clips permitted to be copied among the clips included in a content recorded on the BD-ROM 400 and in a related content that is related to the content. The digest values are equivalent to the clip digest values (106a, ..., 106t) shown in FIG. 12, in the first embodiment. Note that each of the digest values received from the management server 420 has allocated thereto a clip ID for identifying a clip used for the calculation of the digest value.

The DL signature is equivalent to the second signature 344 in FIG. 12. In other words, the DL signature is signature data generated based on the digest values of all the clips permitted to be copied among the clips included in the content and the related content.

The signature information reception unit 416 outputs the received digest values to the digest value comparison unit 414. Furthermore, the signature information reception unit 416 writes, onto the BD-R/RE 430, the received digest values and the DL signature.

(3) Downloaded Content DB 412

The downloaded content DB 412 has stored therein a related content downloaded from the management server 420 in advance. The related content is related to the content recorded on the BD-ROM 400, as described in the first embodiment.

The related content is composed of a plurality of clips obtained by dividing the related content by a certain length, in the same manner as the content recorded on the BD-ROM 400. Each of the clips has allocated thereto a clip ID for identifying the clip.

(4) Digest Value Calculation Unit 413

The digest value calculation unit 413 reads, from the downloaded content DB 412, all the clips included in the related content that are stored in the downloaded content DB 412. Then, the digest value calculation unit 413 calculates digest values from the read clips respectively. The digest value calculation unit 413 associates each of the calculated digest values with the respective clip IDs, and outputs, to the digest value comparison unit 414, the calculated digest values and the clip IDs corresponding thereto.

(5) Digest Value Comparison Unit 414

The digest value comparison unit 414 acquires, from the signature information reception unit 416, the digest values transmitted from the management server 420. As described above, each of these digest values is calculated from the respective clips permitted to be copied, among clips included in the content and the related content, and does not include any digest values calculated from clips not permitted to be copied.

Also, the digest value comparison unit 414 acquires, from the digest value calculation unit 413, the digest values calculated from all the clips included in the related content that is stored in the downloaded content DB 412.

Then, the digest value comparison unit 414 compares the digest values acquired from the signature information reception unit 416, with the digest values acquired from the digest value calculation unit 413, and judges that a clip having matching digest values is permitted to be copied.

The digest value comparison unit 414 outputs, to the selectable content display unit 417, the clip ID of a clip judged to be permitted to be copied.

(6) MCMF Analysis Unit 415

The MCMF analysis unit 415 reads the MCMF 405 from the BD-ROM 400. As described above, the MCMF 405 has recorded therein the clip ID of a clip permitted to be copied, among clips constituting the encrypted content 406 recorded on the BD-ROM 400.

The MCMF analysis unit 415 extracts, from the MCMF 405, the clip ID of the clip permitted to be copied, and outputs the extracted clip ID to the selectable content display unit 417.

(7) Selectable Content Display Unit 417

The selectable content display unit 417 receives, from the digest value comparison unit 414, the clip ID of the clip permitted to be copied, among the clips included in the related content.

Furthermore, the selectable content display unit 417 receives, from the MCMF analysis unit 415, the clip ID of the clip permitted to be copied, among the clips included in the encrypted content 406.

The selectable content display unit 417 includes a display device such as a display, and displays all the received clip IDs on the display device.

Also, the selectable content display unit 417 includes an input device such as a remote controller, and receives, from a user, a selection of clip IDs of clips that are to be copied onto the BD-R/RE 430.

The selectable content display unit 417 outputs the selected clip IDs of the clips to the selected content recording unit 418a.

(8) Selected Content Recording Unit 418a

The selected content recording unit 418a receives the selected clip IDs of the clips from the selectable content display unit 417.

The selected content recording unit 418a reads clips identified by the received clip IDs, from the BD-ROM 400 and the downloaded content DB 412. Then, the selected content recording unit 418a writes the read clips onto the BD-R/RE 430.

(9) Key Information Recording Unit 418b

The key information recording unit 418b reads the key information 407 from the BD-ROM 400, and writes the read key information 407 onto the BD-R/RE 430.

3. Management Server 420

The management server 420 is a device that performs a permission process for copying a content.

As shown in FIG. 18, the management server 420 is composed of a storage 421, a permission judgment unit 422, a signature information search unit 423, and a signature information transmission unit 424.

The management server 420 is specifically a computer system including a microprocessor, ROM, RAM, hard disk unit, a network connection unit and the like.

(1) Storage 421

The storage 421 has stored therein clips constituting the encrypted content 406 recorded on the BD-ROM 400, and clips constituting a related content that is related to the encrypted content 406. Note that each clip of the related content has allocated thereto a clip ID, in the same manner as the encrypted content 406.

Then, the storage 421 has stored therein digest values that are each calculated from the respective clips.

Furthermore, the storage 421 has stored therein a DL signature generated based on the digest values of all the clips permitted to be copied, among the clips constituting the encrypted content 406 and the clips constituting the related content. Here, the DL signature is data equivalent to the "second signature" in the first embodiment, and the generation method thereof is shown in FIG. 12.

Although not shown in figures, the storage 421 has stored therein content IDs for identifying the encrypted content 406 and the related content, and is specifically the same as the first embodiment (see FIGS. 8 and 14).

In the present embodiment, all the related contents stored in the storage 421 are those related to the encrypted content 406. However, in a case where the BD-ROM 400 has recorded thereon an encrypted content other than the encrypted content 406, a related content that is related to the other encrypted content is assumed to be also stored in the storage 421. In this case, each of the related contents can be identified with use of the content IDs.

(2) Permission Judgment Unit 422

The permission judgment unit 422 receives the content ID 402, credit card information, etc. from the recording device 410.

The permission judgment unit 422 performs a permission process with use of the credit card information. The permission process is specifically a billing process, in the same manner as the first embodiment.

The permission judgment unit 422 generates the content copy permission information, based on a result of the permission process. When the permission process has been completed normally, the permission judgment unit 422 sets the content copy permission information to "1". When the permission process has not been completed normally, the permission judgment unit 422 sets the content copy permission information to "0".

The permission judgment unit 422 transmits, to the recording device 410, the content copy permission information that has been generated.

Also, the permission judgment unit 422 outputs the content ID 401 received from the recording device 410 to the signature information search unit 423, when the permission process has been completed normally.

(3) Signature Information Search Unit 423

Upon receipt of the content ID 401 from the permission judgment unit 422, the signature information search unit 423 reads, from the storage 421, the DL signature corresponding to the content ID 401 and the digest values of all the clips permitted to be copied.

The signature information search unit 423 outputs, to the signature information transmission unit 424, the DL signature and the digest values that have been read.

(4) Signature Information Transmission Unit 424

Upon receipt of the DL signature and the digest values from the signature information search unit 423, the signature information transmission unit 424 transmits, to the recording device 410, the DL signature and the digest values that have been received.

4. BD-R/RE 430

The BD-R/RE 430 is a recording medium, on which various pieces of data are recorded by the recording device 410.

As shown in FIG. 18, the BD-R/RE 430 has recorded thereon a content digest value 431, a DL signature 432, an encrypted content 433, and key information 434.

The content digest value 431 is data that the signature information reception unit 416 of the recording device 410 has acquired from the management server 420. The content digest value 431 is a digest value group composed of a plurality of digest values of all the clips permitted to be copied, among the clips of the encrypted content 406 and the clips of the related content.

The DL signature 432 is data that the signature information reception unit 416 of the recording device 410 has acquired from the management server 420. The DL signature 432 is, as described above, signature data generated based on the clip digest values of all the clips permitted to be copied, among the encrypted content 406 and the related content.

The encrypted content 433 includes all the clips selected by a user via the selectable content display unit 417 of the recording device 410.

In the present embodiment, the clips selected from the BD-ROM 400 are encrypted, and the clips acquired from the management server 420 (clips stored in the downloaded content DB 412) are not encrypted.

However, in the present embodiment, when writing the clips stored in the downloaded content DB 412 onto the BD-R/RE 430, the recording device 410 may encrypt the clips before writing the clips onto the BD-R/RE 430. In this case, the recording device 410 may encrypt the clips with use of, for example, information unique to the BD-R/RE 430.

Furthermore, the clips acquired from the management server 420 may be already encrypted, and the recording device 410 may acquire, from the management server 420, the encrypted clips and a decryption key for decrypting the encrypted clips, and store the encrypted clips and the decryption key in the downloaded content DB 412.

5. Signature Verification Process

Figure 24:
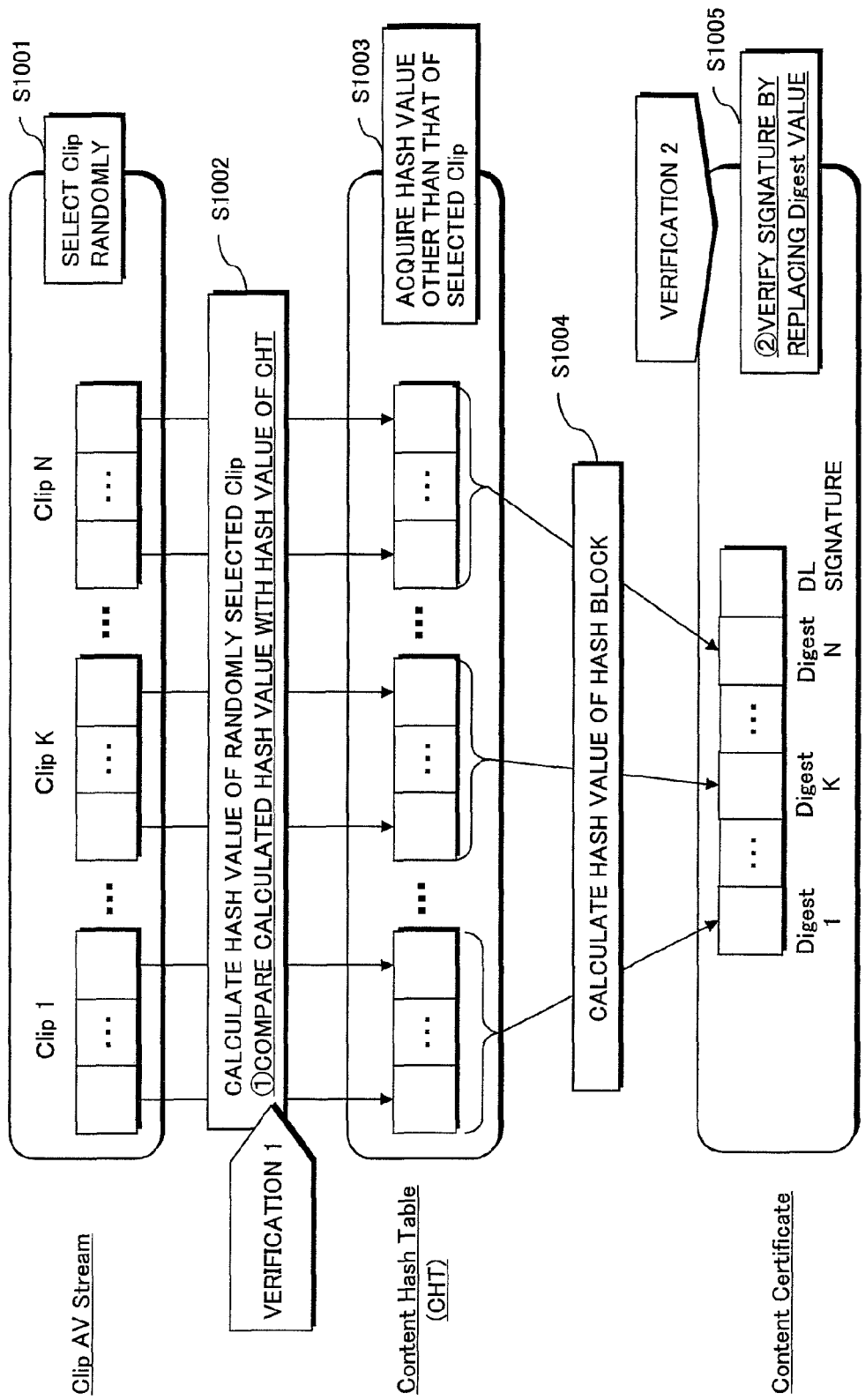
FIG. 24 is a diagram for explaining the operation of a signature verification process.

The following describes a signature verification process performed at the time of the playback of the BD-R/RE 430, with reference to FIG. 24.

The BD-R/RE 430 has recorded thereon a clip selected by a user (equivalent to the encrypted content 433 in FIG. 18, and a Clip AV Stream in FIG. 24), the digest value of each clip permitted to be copied (equivalent to the content digest value 431 in FIG. 18, and Content Hash Table in FIG. 24), the DL signature 432, and the key information 434.

First, a playback device that performs the signature verification process randomly selects a predetermined number of clips from the BD-R/RE 430 (step S1001). Then, the playback device calculates a digest value (hash value) for each of the selected clips.

Then, the playback device judges whether the calculated digest values are correct, by comparing each of the calculated digest values with a corresponding one of the digest values included in the content digest value 431 recorded on the BD-R/RE 430 (step S1002). The playback device continues the process if the calculated digest values are correct.

Subsequently, the playback device acquires the digest values corresponding to all the clips other than the clips selected in step S1001, among the clips recorded on the BD-R/RE 430, by reading the digest values from the content digest value 431 recorded on the BD-R/RE 430 (step S1003).

Then, the playback device divides data composed of the digest values calculated in step S1001 and the digest values acquired in step S1003 into data pieces each having a predetermined size, and set each of the data pieces as a hash block.

Subsequently, the playback device calculates the hash value of each hash block (step S1004). Hash values that have been calculated are shown in FIG. 24 as Digest 1, Digest 2, . . . , Digest N.

Finally, the playback device calculates a digital signature based on the Digest 1, Digest 2, . . . , Digest N, and verifies whether the calculated digital signature matches with the DL signature 432 recorded on the BD-R/RE 430 (step S1005).

The DL signature 432 recorded on the BD-R/RE 430 is generated based on the digest values of the clips permitted to be copied (selectable for a user).

Therefore, although there are many possible combinations of clips selectable by a user, the signature verification process can be performed with use of one DL signature, no matter which combination of clips the user copies onto the BD-R/RE 430.

Note that the above describes the signature verification process of the digital signature generated with use of a secret key cryptosystem. However, it is possible to use a digital signature generated with use of a public key cryptosystem.

In the signature verification process with use of the digital signature of the public key cryptosystem, the legitimacy of the signature is verified by checking whether the data for the signature verification and the DL signature 432 prerecorded on the BD-R/RE 430 satisfy a predetermined relationship mathematically. Techniques pertaining to the digital signature generated with use of the public key cryptosystem is well-known, and thus a detailed description thereof is omitted here.

<Modification 1>

The following describes a content copy processing system 2b according to a modification 1 of the second embodiment.

Figure 19:
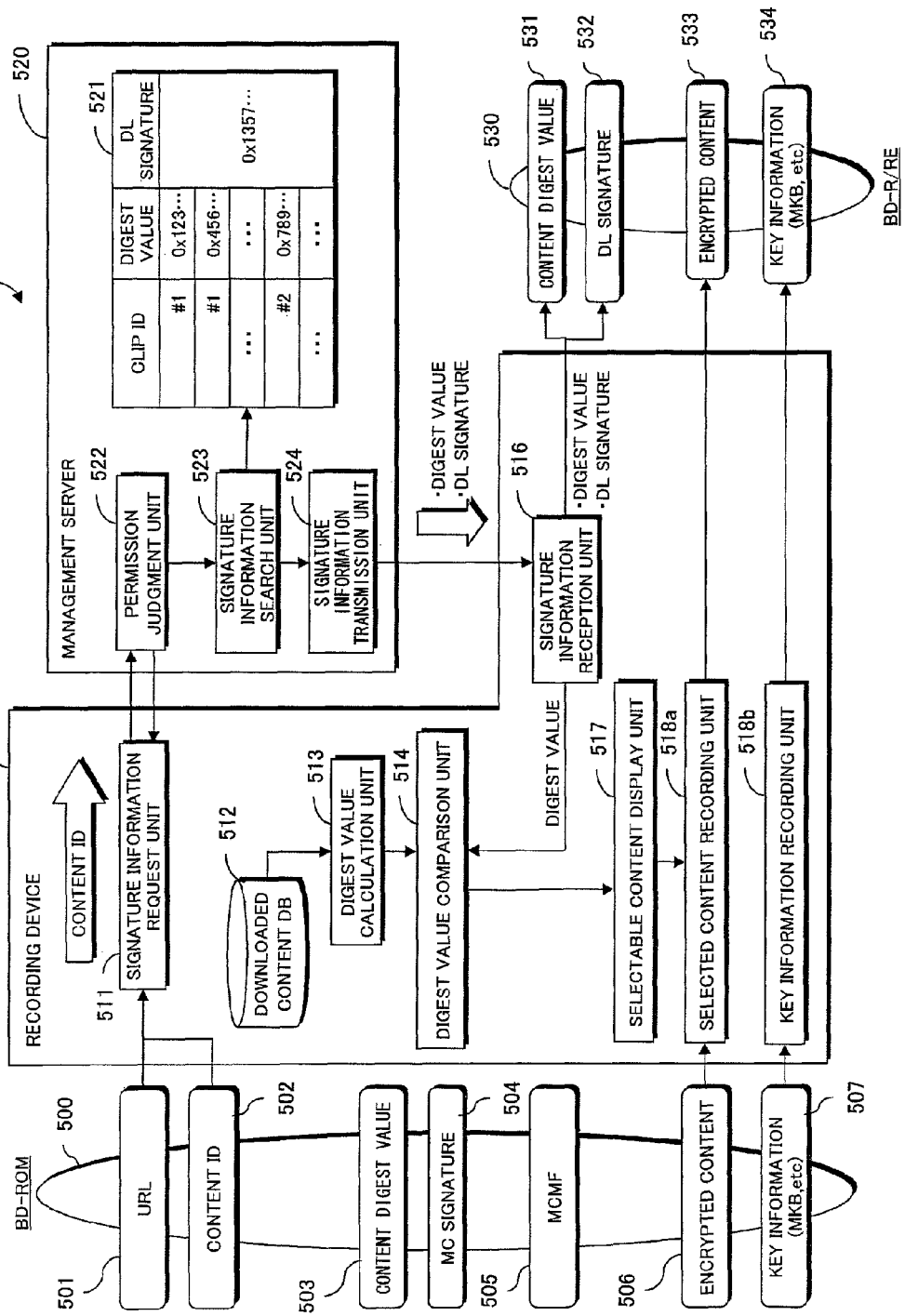
FIG. 19 shows the construction of a content copy processing system 2b according to a modification 1 of the second embodiment.

FIG. 19 shows the construction of the content copy processing system 2b.

As shown in FIG. 19, the content copy processing system 2b is composed of a BD-ROM 500, a recording device 510, a management server 520, and a BD-R/RE 530.

Note that in the content copy processing system 2b according to the modification 1, the recording device 510 records, onto the BD-R/RE 530, the clips of an encrypted content recorded on the BD-ROM 500 and the clips of a related content downloaded from the management server 520, in the same manner as content copy processing system 2a.

1. BD-ROM 500

The BD-ROM 500 is assumed to be a so-called "package medium" on which a content has been recorded by a content supplier and marketed to a user, in the same manner as the BD-ROM 400.

The BD-ROM 500 has recorded thereon a URL 501, a content ID 502, a content digest value 503, an MC signature 504, an MCMF 505, an encrypted content 506, and key information 507.

A description of data pieces recorded on the BD-ROM 500 is omitted here, since the data pieces are the same as those recorded on the BD-ROM 400.

2. Recording Device 510

The recording device 510 is composed of a signature information request unit 511, a downloaded content DB 512, a digest value calculation unit 513, a digest value comparison unit 514, a signature information reception unit 516, a selectable content display unit 517, a selectable content recording unit 518a, and a key information recording unit 518b.

The recording device 510 is specifically a computer system including a microprocessor, ROM, RAM, hard disk unit, a network connection unit and the like.

Compared to the recording device 410 shown in FIG. 18, the recording device 510 shown in FIG. 19 does not include the MCMF analysis unit. The following mainly describes this difference.

In the content copy processing system 2a described above, judgment of whether the clips of a content recorded on the BD-ROM 400 are permitted to be copied is performed with use of the MCMF 405, which is read by the MCMF analysis unit 415 from the BD-ROM 400. Also, judgment of whether the clips of a related content stored on the downloaded content DB 412 is performed by the digest value comparison unit 414 comparing (i) the digest values calculated from the clips of the related content stored in the downloaded content DB 412 with (ii) the digest values of clips permitted to be copied that are acquired from the management server 420.

The recording device 510, however, judges whether a clip is permitted to be copied in the following manner, without the MCMF 505.

The digest value comparison unit 514 of the recording device 510 acquires, from the digest value calculation unit 513, the digest values of all the clips of a related content stored on the downloaded content DB 512.

Also, the digest value comparison unit 514 reads the content digest value 503 from the BD-ROM 500. The content digest value 503 is composed of a plurality of digest values that are each calculated from the respective clips included in the encrypted content 506, in the same manner as the content digest value 403 described above. Note that each digest value has allocated thereto a clip ID for identifying a clip used for the calculation of the digest value.

Then, the digest value comparison unit 514 compares (i) the digest values acquired from the signature information reception unit 516 with (ii) the digest values acquired from the digest value calculation unit 513 and the digest values included in the content digest value 503 read from the BD-ROM 500, and judges that a clip having matching digest values is permitted to be copied. The digest value comparison unit 514 outputs, to the selectable content display unit 517, the clip ID of a clip judged to be permitted to be copied.

As described above, the recording device 510 is characterized in that the recording device 510 uses the digest values acquired from the management server 520, when judging whether a clip is permitted to be copied, regardless of whether the clip is a clip of a content stored in the BD-ROM 500 or a clip of a related content stored in the downloaded content DB 512.

Therefore, in the modification 1, the BD-ROM 500 does not necessarily need to have recorded thereon the MCMF 505.

3. Management Server 520

The management server 520 is a device that performs a permission process for copying a content. As shown in FIG. 19, the management server 520 is composed of a storage 521, a permission judgment unit 522, a signature information search unit 523, and a signature information transmission unit 524.

The management server 520 is specifically a computer system including a microprocessor, ROM, RAM, hard disk unit, a network connection unit and the like.

The components of the management server 520 have the same functions as the components of the management server 420 shown in FIG. 18, and therefore a description thereof is omitted.

4. BD-R/RE 530

The BD-R/RE 530 is a recording medium, on which various pieces of data are recorded by the recording device 510.

As shown in FIG. 19, the BD-R/RE 530 has recorded thereon a content digest value 531, a DL signature 532, an encrypted content 533, and key information 534.

The pieces of data recorded on the BD-R/RE 530 is the same as those recorded on the BD-R/RE 430, and therefore a description thereof is omitted.

<Modification 2>

The following describes a content copy processing system 2c according to a modification 2 of the second embodiment.

Figure 20:
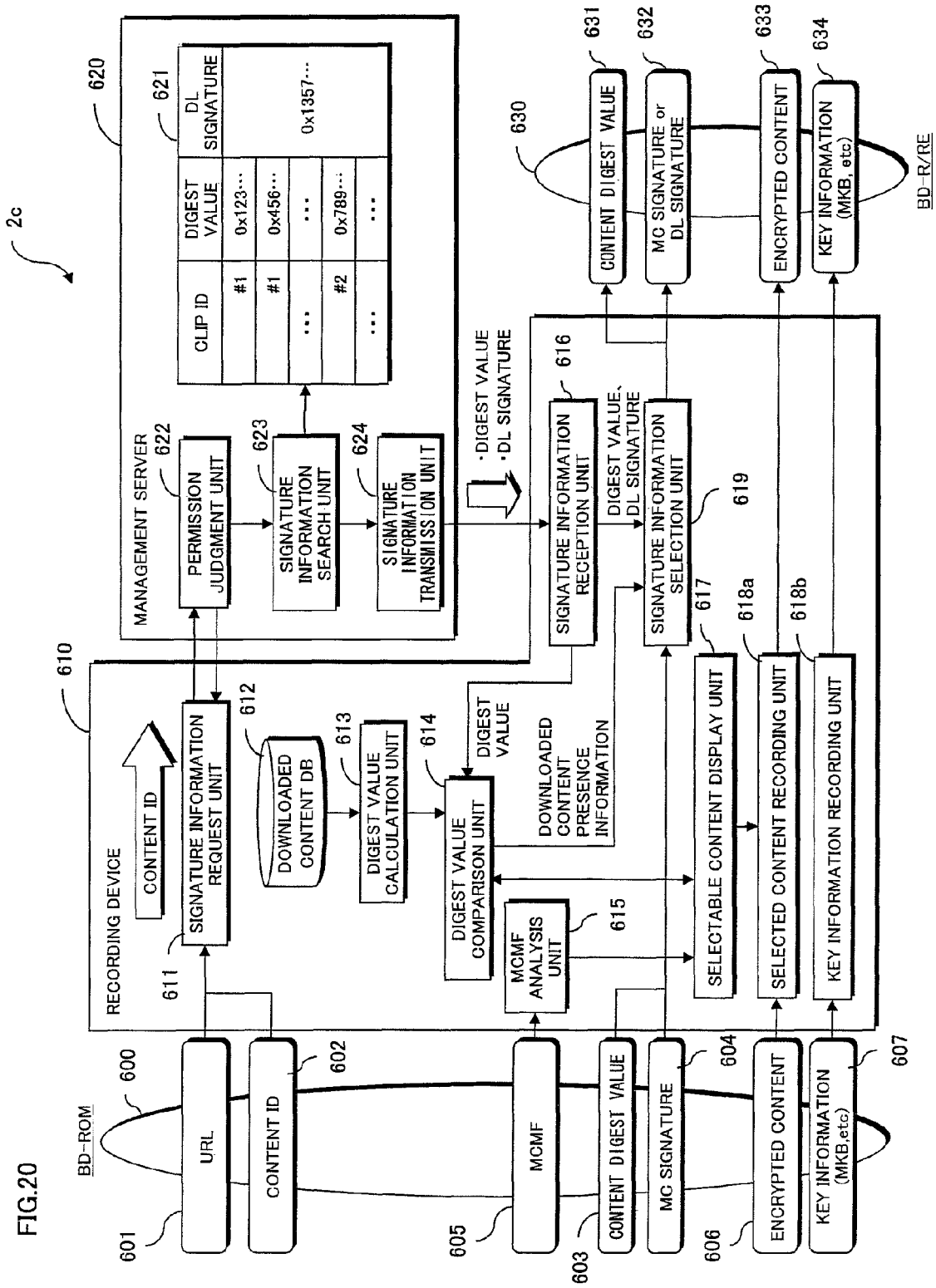
FIG. 20 shows the construction of a content copy processing system 2c according to a modification 2 of the second embodiment.

FIG. 20 shows the construction of the content copy processing system 2c.

As shown in FIG. 20, the content copy processing system 2c is composed of a BD-ROM 600, a recording device 610, a management server 620, and a BD-R/RE 630.

In the content copy processing system 2a according to the second embodiment, the recording device 410 records, onto the BD-R/RE 430, the clips of an encrypted content recorded on the BD-ROM 400 and the clips of a related content downloaded from the management server 420.

However, in the content copy processing system 2c according to the modification 2, the recording device 610 records, on the BD-R/RE 630, either (i) both of the clips of an encrypted content recorded on the BD-ROM 600 and the clips of a related content downloaded from the management server 620 or (ii) only the clips of the encrypted content recorded on the BD-ROM 600.

1. BD-ROM 600

The BD-ROM 600 is assumed to be a so-called "package medium" on which a content has been stored by a content supplier and marketed to a user, in the same manner as the BD-ROM 400.

The BD-ROM 600 has recorded thereon a URL 601, a content ID 602, a content digest value 603, an MC signature 604, an MCMF 605, an encrypted content 606, and key information 607.

A description of data pieces recorded on the BD-ROM 600 is omitted here, since the data pieces are the same as those recorded on the BD-ROM 400.

2. Recording Device 610

The recording device 610 is composed of a signature information request unit 611, a downloaded content DB 612, a digest value calculation unit 613, a digest value comparison unit 614, an MCMF analysis unit 615, a signature information reception unit 616, a selectable content display unit 617, a selectable content recording unit 618a, and a key information recording unit 618b, and a signature information selection unit 619.

The recording device 610 is specifically a computer system including a microprocessor, ROM, RAM, hard disk unit, a network connection unit and the like.

Compared to the recording device 410 shown in FIG. 18, the recording device 610 includes the signature information selection unit 619. Also, the digest value comparison unit 614 and the selectable content display unit 617 have other functions in addition to the functions of the digest value comparison unit 414, and the selectable content display unit 417, respectively.

Therefore, the following mainly describes the digest value comparison unit 614, the selectable content display unit 617, and the signature information selection unit 619, and a description of other components having the same functions as the recording device 410 is omitted.

Upon receipt of a selection of clips desired to be copied from a user, the selectable content display unit 617 outputs the clip IDs of the selected clips to the selected content recording unit 618a and the digest value comparison unit 614.

The digest value comparison unit 614 acquires digest values from the signature information reception unit 616, in the same manner as the digest value comparison unit 414 according to the second embodiment. Here, the digest values acquired from the signature information reception unit 616 are digest values that have been transmitted from the management server 620, and that have been calculated from clips permitted to be copied among the clips included in the content and the related content. The digest values acquired from the signature information reception unit 616 do not include any digest values calculated from clips not permitted to be copied.

Also, the digest value comparison unit 614 acquires digest values from the digest value calculation unit 613. The digest values acquired from the digest value calculation unit 613 are digest values calculated from all the clips included in the related content stored in the downloaded content DB 612.

Then, the digest value comparison unit 614 compares the digest values acquired from the signature information reception unit 616 with the digest values acquired from the digest value calculation unit 613, and judges that a clip having matching digest values is permitted to be copied.

The digest value comparison unit 614 outputs, to the selectable content display unit 617, the clip ID of a clip judged to be permitted to be copied.

In addition to the function described above, the digest value comparison unit 614 judges whether a clip that has been selected is included in the related content, upon receipt of the clip ID of the selected clip from the selectable content display unit 617.

Specifically, the digest value comparison unit 614 judges whether the clip ID of the selected clip matches any of the clip IDs received from the digest calculation unit 613. Note here that the digest value comparison unit 614 is assumed to have acquired, from the digest value calculation unit 613, clip IDs corresponding to all the clips included in the related content stored in the downloaded content DB 612.

The digest value comparison unit 614 judges whether each of the selected clips matches any of the clip IDs received from the digest value calculation unit 613.

The digest comparison unit 614 has stored therein downloaded content presence information in advance. For example, the initial value of the downloaded content presence information is assumed to be set to "0".

When judging that none of the selected clips is not a clip of the related content (in other words, all the selected clips are the clips of the encrypted content 606 recorded on the BD-ROM 600), the digest value comparison unit 614 outputs the downloaded content presence information that has been set to "0" to the signature information selection unit 619, without changing the value of the downloaded content presence information.

When any of the selected clips is a clip of the related content, the digest value comparison unit 614 sets the value of the downloaded content presence information to "1", and outputs the downloaded content presence information that has been set to "1", to the signature information selection unit 619.

The signature information selection unit 619 receives, from the signature information reception unit 616, a DL signature and digest values corresponding to the DL signature.

Also, the signature information selection unit 619 receives the downloaded content presence information from the digest value comparison unit 614.

As described above, the downloaded content presence information is set to either "0" or "1". "0" indicates that none of the clips of the related content is to be recorded on the BD-R/RE 630, and "1" indicates that one or more clips of the related content are to be recorded on the BD-R/RE 630.

When the downloaded content presence information is set to "0", the signature information selection unit 619 judges that an MC signature is to be recorded onto the BD-R/RE 630. When the downloaded content presence information is set to "1", the signature information selection unit 619 judges that the DL signature is to be recorded onto the BD-R/RE 630.

When judging that the DL signature is to be recorded, the signature information selection unit 619 records, onto the BD-R/RE 630, the DL signature received from the signature information reception unit 616 and the corresponding digest values.

When judging that the MC signature is to be recorded, the signature information selection unit 619 reads, from the BD-ROM 600, the MC signature 604 and the content digest value 603, and records, onto the BD-R/RE 630, the MC signature 604 and the content digest value 603 that have been read.

Note that, when judging that the MC signature is to be recorded, the signature information selection unit 619 may delete the DL signature and the corresponding digest values received from the signature information reception unit 616.

4. BD-R/RE 630

The BD-R/RE 630 is a recording medium, on which various pieces of data are recorded by the recording device 610.

As shown in FIG. 20, the BD-R/RE 630 has recorded thereon a content digest value 631, an MC signature or a DL signature 632, an encrypted content 633, and key information 634.

In the BD-R/RE 430 according to the second embodiment and in the BD-R/RE 530 according to the modification 1, a signature to be recorded is limited to the DL signature. However, in the BD-R/RE 630, the signature to be recorded thereon is either an MC signature or a DL signature, depending on a clip to be recorded.

A detailed description of each piece of data recorded on the BD-R/RE 630 is omitted here, since it is described above.

As described above, in the modification 2, when only the clips of the encrypted content 606 recorded on the BD-ROM 600 are to be recorded onto the BD-R/RE 630, the MC signature 604 is recorded onto the BD-R/RE 630. Also, when any of the clips of the related content recorded on the downloaded content DB 612 is to be recorded onto the BD-R/RE 630, the DL signature is recorded onto the BD-R/RE 630.

With the above described construction, the playback device performs the signature verification process correctly, when playing the clips recorded on the BD-R/RE 630.

The following describes the structure where the signature verification process is performed correctly, with a simple example.

Assume here that a user arbitrarily selects a clip from clips A, B, and C that are recorded on the BD-ROM, and copies the clip onto the BD-R.

In this case, the BD-R has recorded thereon a digital signature generated based on the digest values of the clips A, B, and C, and the digest values of the clips A, B and C.

For example, in a case where the user selects the clips A and B, and copies the clips A and B onto the BD-R, the playback device can calculate the digest value of the clip A from the copied clip A, and the digest value of the clip B from the copied clip B, during the signature verification process. As for the clip C that has not been copied, the playback device uses the digest value of the clip C that has been recorded on the BD-R. In this way, the playback device generates signature verification data with use of the digest values of the clips A, B and C, and compares the generated signature verification data with the digital signature recorded on the BD-R, thereby performing the signature verification process correctly.

In other words, the signature verification process is performed correctly no matter which clip is selected and recorded, as long as the BD-R has recorded thereon the digest values of all the clips selectable by the user and the digital signature generated from the digest values.

The same applies in a case where the user can select from not only the clips included in the BD-ROM but also the clips downloaded from the management server.

In this case, the maximum range of clips selectable by the user is all the clips recorded on the BD-ROM, and all the clips downloaded from the management server.

Therefore, the management server needs to have stored therein the digest values of all the clips selectable by the user and the digital signature generated from the digest values of the clips selectable by the user. Then, at the time of copying the clips, the management server supplies, to the recording device, the digest values of the clips and the digital signature generated from the digest values. In this way, the recording device can perform the signature verification process correctly when playing the BD-R on which the clips are copied, no matter which clips are selected by the user.

As described above, the modification 2 has an advantageous effect in that although there are numerous possible combinations of clips that can be selected by the user, the signature verification process is performed correctly by preparing two digital signatures in advance, namely the MC signature and the DL signature.

<Modification 3>

The following describes a content copy processing system 2d according to a modification 3 of the second embodiment.

Figure 21:
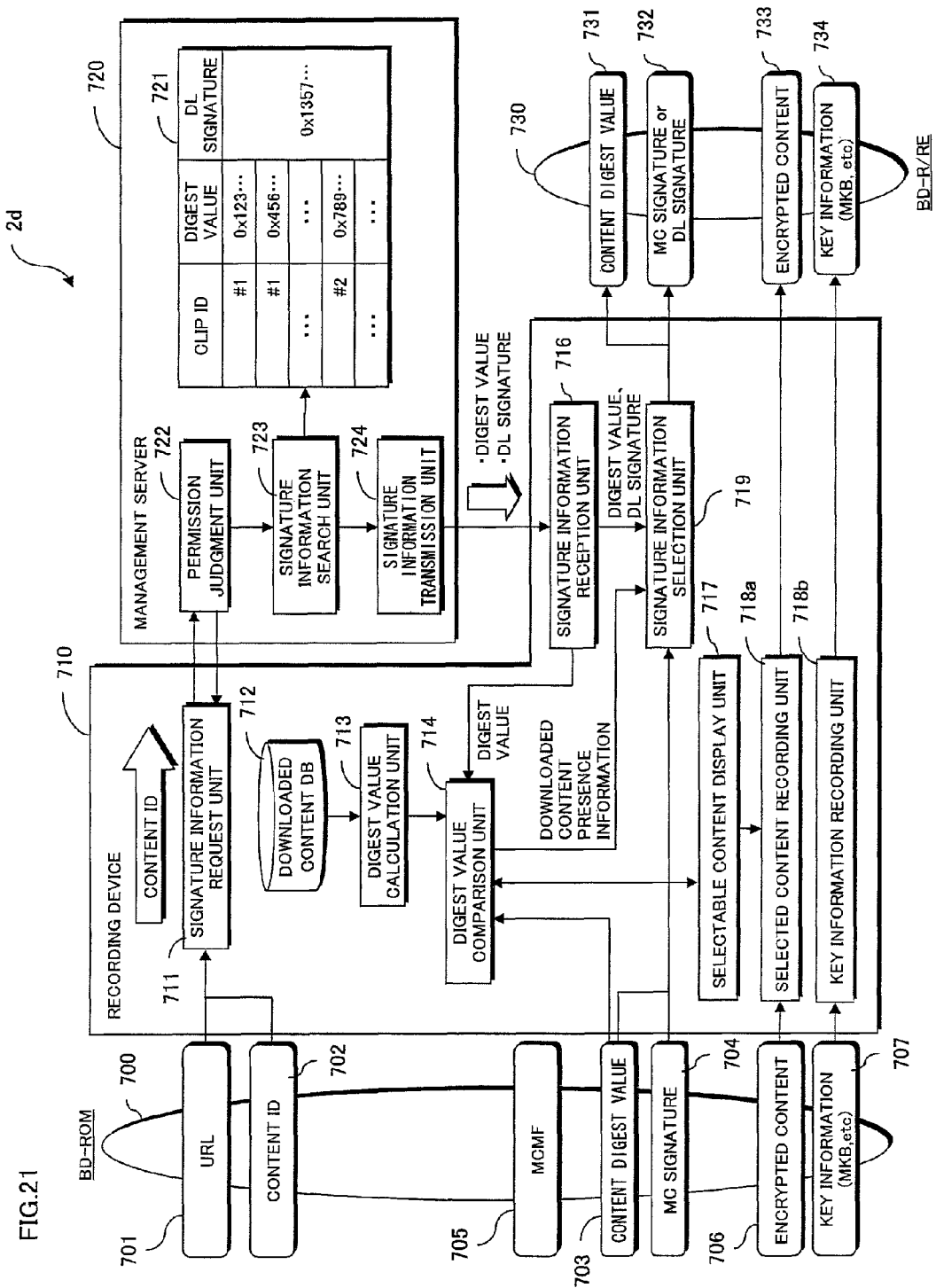
FIG. 21 shows the construction of a content copy processing system 2d according to a modification 3 of the second embodiment.

FIG. 21 shows the construction of the content copy processing system 2d.

As shown in FIG. 21, the content copy processing system 2d is composed of a BD-ROM 700, a recording device 710, a management server 720, and a BD-R/RE 730.

In the content copy processing system 2d, the recording device 710 records, on the BD-R/RE 730, either (i) both of the clips of an encrypted content recorded on the BD-ROM 700 and the clips of a related content downloaded from the management server 720 or (ii) only the clips of the encrypted content recorded on the BD-ROM 700, in the same manner as the content copy processing system 2c according to the modification 2. Therefore, the recording device 710 includes a signature information selection unit 719.

The signature information selection unit 719 has the same function as the signature information selection unit 619 described in the modification 2.

In other words, the signature information selection unit 719 selects either the MC signature or the DL signature for recording onto the BD-R/RE 730, and records, onto the BD-R/RE 730, the selected signature and the digest values corresponding thereto. At this time, the signature information selection unit 719 selects a signature, with use of downloaded content presence information acquired from a digest value comparison unit 714.

A description of the function of the digest value comparison unit 714 and the downloaded content presence information has already been described in the modification 2. Therefore, a description thereof is omitted.

Also, in contrast to the recording device 610 according to the modification 2, the recording device 710 of the content copy processing system 2d does not include an MCMF analysis unit. Therefore, the recording device 710 does not use an MCMF 705 to judge whether the clips of an encrypted content 706 is permitted to be copied. Instead, the recording device 710 makes a judgment by comparing digest values with use of the digest value comparison unit 714. The function of the digest value comparison unit 714 is the same as the digest value comparison unit 514 in the modification 1. Therefore, a description thereof is omitted.

Note that, in the modification 3, the BD-ROM 700 does not necessarily need to have recorded thereon the MCMF 705.

Third Embodiment

The following describes a third embodiment of the present invention.

Figure 22:
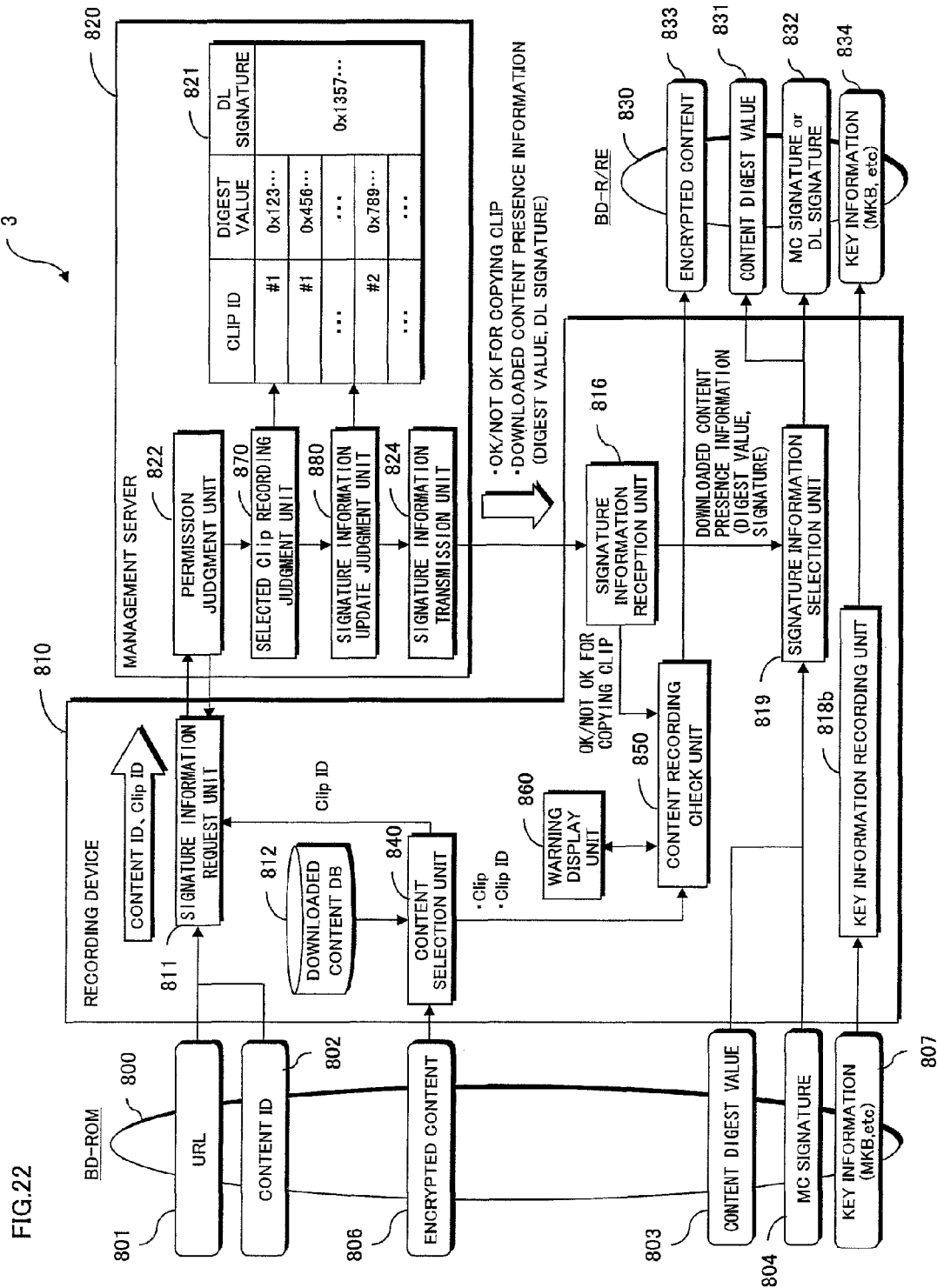
FIG. 22 shows the construction of a content copy processing system 3 according to a third embodiment of the present invention.

FIG. 22 shows the construction of a content copy processing system 3 according to the third embodiment.

As shown in FIG. 22, the content copy processing system 3 is composed of a BD-ROM 800, a recording device 810, a management server 820, and the BD-R/RE 830.

In the second embodiment, it is the recording device that judges whether a clip is permitted to be copied onto the BD-R/RE. In the third embodiment, it is the management server that judges whether a clip is permitted to be copied.

1. BD-ROM 800

The BD-ROM 800 is assumed to be a so-called "package medium" on which a content has been stored by a content supplier and marketed to a user, in the same manner as the BD-ROM 400 (see FIG. 18).

The BD-ROM 800 has recorded thereon a URL 801, a content ID 802, a content digest value 803, an MC signature 804, an encrypted content 806, and key information 807.

A description of data pieces recorded on the BD-ROM 800 is omitted here, since the data pieces are the same as those recorded on the BD-ROM 400.

2. Recording Device 810

As shown in FIG. 22, the recording device 810 is composed of a signature information request unit 811, a downloaded content DB 812, a signature information reception unit 816, a key information recording unit 818b, a signature information selection unit 819, a content selection unit 840, a content recording check unit 850, and a warning display unit 860.

The recording device 810 is specifically a computer system including a microprocessor, ROM, RAM, hard disk unit, a network connection unit and the like.

(1) Signature Information Request Unit 811

The signature information request unit 811 acquires, from the BD-ROM 800, the URL 801 and the content ID 802. Also, the signature information request unit 811 acquires the credit card information of a user, etc.

Here, unlike the second embodiment, the signature information request unit 811 further acquires the clip ID of a clip desired to be copied, from the content selection unit 840.

The signature information request unit 811 transmits, to the management server 820, the content ID, clip ID, the credit information, etc. that have been acquired.

The signature information request unit 811 acquires content copy permission information from the management server 820. When the content copy permission information is set to "0", the recording device 810 cancels the rest of the content copy process. When the content copy permission information is set to "1", the recording device 810 continues the content copy process.

(2) Signature Information Reception Unit 816

When the permission process by the management server 820 has been completed normally, the signature information reception unit 816 receives, from the management server 820, a DL signature, a digest value, downloaded content presence information, and clip copy permission information.

The clip copy permission information indicates whether or not a clip desired to be copied is permitted to be copied. Specifically, the clip copy permission information includes the clip ID of a clip desired to be copied, which has been transmitted from the recording device 810 to the management server 820, and a flag value indicating whether a clip corresponding to the clip ID is permitted to be copied.

When the flag value corresponding to the clip ID is set to "0", the clip identified by the clip ID is not permitted to be copied. When the flag value corresponding to the clip ID is set to "1", the clip identified by the clip ID is permitted to be copied.

Note that a description of the downloaded content presence information is provided in the modifications of the second embodiment (see FIGS. 20 and 21).

The signature information reception unit 816 outputs, to the signature information selection unit 819, the DL signature, the digest value, and the downloaded content presence information. Also, the signature information reception unit 816 outputs the clip copy permission information to the content recording check unit 850.

(3) Downloaded Content DB 812

The downloaded content DB 812 has stored therein a related content downloaded from the management server 820 in advance. The related content is a content related to a content recorded on the BD-ROM 800.

(4) Content Selection Unit 840

The content selection unit 840 includes a display device and an input device. Specifically, the display device is a television, display, or the like, and the input device is a mouse, keyboard, remote controller, or the like.

The content selection unit 840 acquires, from the BD-ROM 800, the clip IDs of clips included in the encrypted content 806. Also, the content selection unit 840 acquires, from the downloaded content DB 812, the clip IDs of clips included in the related content.

The content selection unit 840 displays the acquired clip IDs on the display device. While the clip IDs are displayed on the display device, a user uses the input device to select the clip IDs of clips that the user desires to copy.

The content selection unit 840 outputs the selected clip IDs to the signature information request unit 811 and the content recording check unit 850.

(5) Content Recording Check Unit 850

The content recording check unit 850 receives the clip copy permission information from the signature information reception unit 816, and receives the selected clip IDs from the content selection unit 840.

The content recording check unit 850 checks whether selected clips corresponding to the selected clip IDs are permitted to be copied, with use of the clip copy permission information.

Specifically, the content recording check unit 850 reads each of the flag values corresponding to the respective one of all clip IDs received from the content selection unit 840, by referring to the clip copy permission information.

The flag value "1" indicates that copying is permitted, and the flag value "0" indicates that copying is not permitted.

When all the selected clips are permitted to be copied, the content recording check unit 850 acquires the selected clips from the BD-ROM 800 and the downloaded content DB 812, via the content selection unit 840. Then, the content recording check unit 850 records the acquired clips onto the BD-R/RE 830.

When any of the selected clips is not permitted to be copied, the content recording check unit 850 outputs, to the warning display unit 860, the clip ID of the clip not permitted to be copied.

Upon receipt of a notification, from the warning display unit 860, that the copy process is to be continued, the content recording check unit 850 acquires only the clips permitted to be copied from the BD-ROM 800 and the downloaded content DB 812 via the content selection unit 840, and records the acquired clips onto the BD-R/RE 830.

(6) Warning Display Unit 860

The warning display unit 860 includes a display device such as a television or a display. Upon receipt of the clip ID of the clip not permitted to be copied from the content recording check unit 850, the warning display unit 860 displays the received clip ID on the display device. At this time, the warning display unit 860 displays a message on the display device for a user. The message is, for example, "A clip not permitted to be copied is included in your selection. Do you wish to continue the copying process?", or the like.

Furthermore, the warning display unit 860 includes an input device such as a mouse, a keyboard, or a remote controller, and receives, from the user, a selection of the user between continuation of the copying process and cancellation of the copying process.

When "Cancellation of the copying process" has been selected, the recording device 810 cancels the rest of the copying process. When "Continuation of the copying process" has been selected, the warning display unit 860 notifies the content recording check unit 850 that the copying process is to be continued.

(7) Signature Information Selection Unit 819

The signature information selection unit 819 has the same function as the signature information selection unit 619 in the modification 2 of the second embodiment. Therefore, a description thereof is omitted.

(8) Key Information Recording Unit 818*b*

The key information recording unit 818*b* has the same function as the key information recording unit 418*b* described in the second embodiment. Therefore, a description thereof is omitted.

3. Management Server 820

The management server 820 is a device that performs a permission process for copying a content.

As shown in FIG. 22, the management server 820 is composed of a storage 821, a selected clip recording judgment unit 870, a signature information update judgment unit 880, and a signature information transmission unit 824.

The management server 820 is specifically a computer system including a microprocessor, ROM, RAM, hard disk unit, a network connection unit and the like.

(1) Storage 821

The storage 821 has stored therein clips constituting the encrypted content 806 recorded on the BD-ROM 800, and clips constituting a related content that is related to the encrypted content 806, in the same manner as the storage 421 described in the second embodiment.

Also, the storage 821 has stored therein digest values that are each calculated from the respective clips.

Furthermore, the storage 821 has stored therein a DL signature generated based on the digest values of all the clips permitted to be copied, among the clips constituting the encrypted content 806 and the clips constituting the related content.

Although not shown in figures, the storage 821 has stored therein a copy permission list indicating the clip IDs of all the clips permitted to be copied, among the clips constituting the encrypted content 806, and the clips constituting the related content. This copy permission list is equivalent to the second clip copy permission list described in the first embodiment.

(2) Permission Judgment Unit 822

The permission judgment unit 822 receives, from the recording device 810, the content ID 802, the clip IDs of the selected clips, credit information, etc.

The permission judgment unit 822 performs a permission process with use of the credit card information. The permission process is specifically a billing process, in the same manner as the first embodiment.

The permission judgment unit 822 generates the content copy permission information, based on a result of the permission process. Then, the permission judgment unit 822 transmits the generated content copy permission information to the recording device 810.

Also, when the permission process has been completed normally, the permission judgment unit 822 outputs the content ID and the clip IDs to the selected clip recording judgment unit 870.

(3) Selected Clip Recording Judgment Unit 870

The selected clip recording judgment unit 870 judges whether a clip is permitted to be copied, with use of the content ID and the clip IDs received from the permission judgment unit 822.

Note that, in the present embodiment, the content ID is not absolutely necessary, since only the encrypted content and the related content that correspond to the one content ID 802 are handled here. However, in a case where a plurality of contents are handled, it is necessary to use content IDs to identify the encrypted content and the related content.

The selected clip recording judgment unit 870 judges whether a clip corresponding to a clip ID that has been received is permitted to be copied, by referring to a copy permission list stored in the storage 821.

Specifically, the selected clip recording judgment unit 870 judges that the clip is permitted to be copied when the clip ID is written on the copy permission list, and judges that the clip is not permitted to be copied when the clip ID is not written on the copy permission list.

Then, the selected clip recording judgment unit 870 generates the clip copy permission information. The clip copy permission information includes the clip ID of a clip desired to be copied, and the flag value indicating whether the clip is permitted to be copied, as described above. The selected clip recording judgment unit 870 outputs the generated clip copy permission information to the signature information update judgment unit 880.

(4) Signature Information Update Judgment Unit 880

The signature information update judgment unit 880 has stored therein downloaded content presence information in advance. For example, the initial value of the downloaded content presence information is assumed to be set to "0".

The signature information update judgment unit 880 performs the following process, upon receipt of the clip copy permission information, from the selected clip recording judgment unit 870.

The signature information update judgment unit 880 judges whether a clip judged to be permitted to be copied is included in the encrypted content 806 or in the related content.

When judging that all the clips judged to be permitted to be copied are not the clips of the related content (in other words, the clips are those of the encrypted content 806 recorded on the BD-ROM 800), the signature information update judgment unit 880 does not change the value of the downloaded content presence information. Then, the signature information update judgment unit 880 outputs, to the signature information transmission unit 824, the downloaded content presence information that has been set to "0", and the clip copy permission information received from the selected clip recording judgment unit 870.

When judging that any of the clips judged to be permitted to be copied is a clip of the related content, the signature information update judgment unit 880 changes the value of the downloaded content presence information to "1". Then, the signature information update judgment unit 880 reads, from the storage 821, the DL signature and the digest values. The signature information update judgment unit 880 outputs, to the signature information transmission unit 824, the DL signature, the digest values, the downloaded content presence information that has been set to "1", and the clip copy permission information received from the selected clip recording judgment unit 870.

(5) Signature Information Transmission Unit 824

The signature information transmission unit 824 transmits, to the recording device 810, the information received from the signature information update judgment unit 880.

4. BD-R/RE 830

The BD-R/RE 830 is a recording medium, on which various pieces of data are recorded by the recording device 810.

As shown in FIG. 22, the BD-R/RE 830 has recorded thereon a content digest value 831, an MC signature or a DL signature 832, an encrypted content 833, and key information 834.

A detailed description of each piece of data is provided above. Therefore, a description thereof is omitted here.

Fourth Embodiment

The following describes a fourth embodiment of the present invention.

Figure 23:
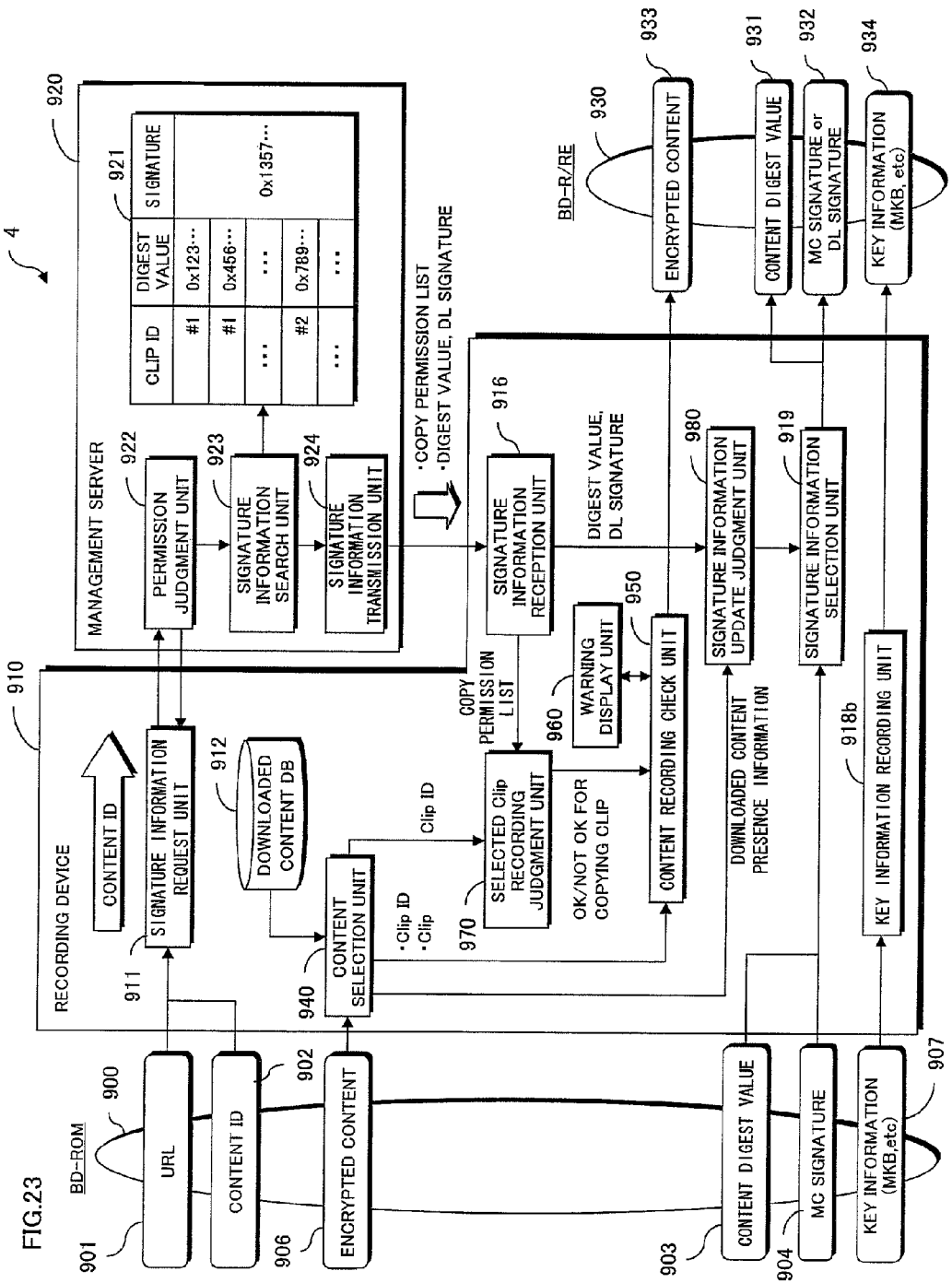
FIG. 23 shows the construction of a content copy processing system 4 according to a fourth embodiment of the present invention.

FIG. 23 shows the construction of a content copy processing system 4 according to the fourth embodiment.

As shown in FIG. 23, the content copy processing system 4 includes a BD-ROM 900, a recording device 910, a management server 920, and a BD-R/RE 930.

The fourth embodiment is different from other embodiments described above, and characterized in that, after a user selects a clip that he/she desires to copy, the selected clip is judged whether the clip is permitted to be copied.

1. BD-ROM 900

The BD-ROM 900 is assumed to be a so-called "package medium" on which a content has been stored by a content supplier and marketed to a user.

The BD-ROM 900 has recorded thereon a URL 901, a content ID 902, a content digest value 903, an MC signature 904, an encrypted content 906, and key information 907.

A description of data pieces recorded on the BD-ROM 900 is omitted here, since the data pieces are the same as those recorded on the BD-ROMs in the other embodiments.

2. Recording Device 910

As shown in FIG. 23, the recording device 910 is composed of a signature information request unit 911, a downloaded content DB 912, a signature information reception unit 916, a key information recording unit 918b, a signature information selection unit 919, a content selection unit 940, a content recording check unit 950, a warning display unit 960, a selected clip recording judgment unit 970, and a signature information update judgment unit 980.

The recording device 910 is specifically a computer system including a microprocessor, ROM, RAM, hard disk unit, a network connection unit and the like.

(1) Signature Information Request Unit 911

The signature information request unit 911 acquires the URL 901 and the content ID 902 from the BD-ROM 900. Furthermore, the signature information request unit 911 acquires credit card information, etc. from a user.

The signature information request unit 911 transmits, to the management server 920, the content ID, the credit card information, etc. that have been acquired.

Also, the signature information request unit 911 acquires the content copy permission information from the management server 920. When the content copy permission information is set to "0", the recording device 910 cancels the rest of the content copy process. When the content copy permission information is set to "1", the recording device 910 continues the content copy process.

(2) Signature Information Reception Unit 916

When the permission process by the management server 920 has been completed normally, the signature information reception unit 916 receives, from the management server 920, a DL signature, digest values, and a copy permission list. The copy permission list has written thereon clip IDs of all clips permitted to be copied, among the clips of the encrypted content 906 and the clips of a related content, as described in the third embodiment. This copy permission list is equivalent to the second clip copy permission list in the first embodiment.

The signature information reception unit 916 outputs the DL signature and the digest values to the signature information update judgment unit 980, and outputs the copy permission list to the selected clip recording judgment unit 970.

(3) Downloaded Content DB 912

The downloaded content DB 912 has stored therein a related content downloaded from the management server 920 in advance. The related content is related to the content recorded on the BD-ROM 900.

(4) Content Selection Unit 940

The content selection unit 940 includes a display device and an input device.

Specifically, the display device is a television, display, or the like, and the input device is a mouse, keyboard, remote controller, or the like.

The content selection unit 940 acquires, from the BD-ROM 900, the clip IDs of clips included in the encrypted content 906. Also, the content selection unit 940 acquires, from the downloaded content DB 912, the clip IDs of clips included in the related content.

The content selection unit 940 displays the acquired clip IDs on the display device. While the clip IDs are displayed on the display device, a user uses the input device to select the clip ID of a clip that the user desires to copy. The content selection unit 940 outputs the selected clip ID to the content recording check unit 950, and the selection clip recording judgment unit 970.

The content selection unit 940 has stored therein the downloaded content presence information in advance. For example, the initial value of the downloaded content presence information is assumed to be set to "0".

The content selection unit 940 judges whether any of the selected clips is a clip of the related content, and sets the value of the downloaded content presence information, in accordance with a result of the judgment.

When judging that none of the selected clips are a clip of the related content, the content selection unit 940 does not change the value of the downloaded content presence information. When judging that any of the selected clips is a clip of the related content, the content selection unit 940 changes the value of the downloaded content presence information to "1".

Then, the content selection unit 940 outputs the downloaded content presence information to the signature information update judgment unit 980.

(5) Selected Clip Recording Judgment Unit 970

The selected clip recording judgment unit 970 receives the copy permission list from the signature information reception unit 916, and receives the clip ID of the selected clip from the content selection unit 940.

The selected clip recording judgment unit 970 judges whether the selected clip is permitted to be copied, by referring to the copy permission list.

Specifically, the selected clip recording judgment unit 970 judges that the clip is permitted to be copied when the clip ID of the clip is written on the copy permission list, and judges that the clip is not permitted to be copied when the clip ID of the clip is not written on the copy permission list.

Then, the selected clip recording judgment unit 970 generates the clip copy permission information. The clip copy permission information includes the clip ID of a clip desired to be copied, and a flag value indicating whether the clip is permitted to be copied, as described in the third embodiment. The selected clip recording judgment unit 970 outputs the generated clip copy permission information to the content recording check unit 950.

(6) Content Recording Check Unit 950

The content recording check unit 950 receives the clip copy permission information from the selected clip recording judgment unit 970, and receives the selected clip IDs from the content selection unit 940.

The content recording check unit 950 checks whether selected clips are permitted to be copied, with use of the clip copy permission information.

Specifically, the content recording check unit 950 reads flag values corresponding to all clip IDs received from the content selection unit 940, by referring to the clip copy permission information.

The flag value "1" indicates that copying is permitted, and the flag value "0" indicates that copying is not permitted.

When all the selected clips are permitted to be copied, the content recording check unit 950 acquires the selected clips from the BD-ROM 900 and the downloaded content DB 912, via the content selection unit 940. Then, the content recording check unit 950 records the acquired clips onto the BD-R/RE 930.

When any of the selected clips is a clip not permitted to be copied, the content recording check unit 950 outputs, to the warning display unit 960, the clip ID of the clip not permitted to be copied.

Upon receipt of a notification, from the warning display unit 960, that the copy process is to be continued, the content recording check unit 950 acquires only the clips permitted to be copied from the BD-ROM 900 and the downloaded content DB 912 via the content selection unit 940, and records the acquired clips onto the BD-R/RE 930.

(7) Warning Display Unit 960

The warning display unit 960 includes a display device such as a display. Upon receipt of the clip ID of the clip not permitted to be copied from the content recording check unit 950, the warning display unit 960 displays the received clip ID on the display device. At this time, the warning display unit 960 displays a message on the display device for a user. The message is, for example, "A clip not permitted to be copied is included in your selection. Do you wish to continue the copying process?", or the like.

Furthermore, the warning display unit 960 includes an input device such as a mouse, a keyboard, or a remote controller, and receives, from a user, a selection of the user between continuation of the copying process and cancellation of the copying process.

When "Cancellation of the copying process" has been selected, the recording device 910 cancels the rest of the copying process. When "Continuation of the copying process" has been selected, the warning display unit 960 notifies the content recording check unit 950 that the copying process is to be continued.

Note that the warning display unit 960 may display which clip is permitted to be copied and which clip is not permitted to be copied. For example, the warning display unit 960 may display a list or the like that notifies the user whether each of the selected clips is permitted to be copied.

(8) Signature Information Update Judgment Unit 980

The signature information update judgment unit 980 receives the downloaded content presence information from the content selection unit 940, and also receives the DL signature and the digest values from the signature information reception unit 916.

Upon receipt of the downloaded content presence information that has been set to "1", the signature information update judgment unit 980 outputs the DL signature and the digest values to the signature information selection unit 919.

Upon receipt of the downloaded content presence information that has been set to "0", the signature information update judgment unit 980 notifies the signature information selection unit 919 that the MC signature is to be recorded.

(9) Signature Information Selection Unit 919

Upon receipt of the DL signature and the digest values from the signature information update judgment unit 980, the signature information selection unit 919 records the received DL signature and the digest values onto the BD-R/RE 930.

Upon receipt of the notification, from the signature information update judgment unit 980, that the MC signature is to be recorded, the signature information selection unit 919 reads, from the BD-ROM 900, the MC signature 904 and the content digest value 903, and records, onto the BD-R/RE 930, the MC signature 904 and the content digest value 903 that have been read.

(10) Key Information Recording Unit 918*b*

The key information recording unit 918*b* has the same function as the key information recording unit 418*b* in the second embodiment. Therefore, a description thereof is omitted here.

3. Management Server 920

The management server 920 is a device that performs a permission process for copying a content.

As shown in FIG. 23, the management server 920 is composed of a storage 921, a permission judgment unit 922, a signature information search unit 923, and a signature information transmission unit 924.

The management server 920 is specifically a computer system including a microprocessor, ROM, RAM, hard disk unit, a network connection unit and the like.

The components of the management server 920 mostly have the same functions as those of the management server 420 in the second embodiment. The following mainly describes a difference between the management server 920 and the management server 420.

The storage 921 of the management server 920 has stored therein a copy permission list, which is not shown in figures. The copy permission list has written thereon the clip IDs of all clips permitted to be copied, among clips constituting the encrypted content 906, and clips constituting a related content that is related to the encrypted content 906.

When the permission process performed by the permission judgment unit 922 has been completed normally, the signature information search unit 923 receives a content ID from the permission judgment unit 922.

Upon receipt of the content ID from the permission judgment unit 922, the signature information search unit 923 reads, from the storage 921, a DL signature, the digest values of all the clips permitted to be copied, and the copy permission list.

The signature information search unit 923 outputs, to the signature information transmission unit 924, the DL signature, the digest values, and the copy permission list that have been read.

Upon receipt of the DL signature, the digest values, and the copy permission list from the signature information search unit 923, the signature information transmission unit 924 transmits, to the recording device 910, the DL signature, the digest values, and the copy permission list that have been received.

The components of the management server 920 other than the components described above have the same functions as those of the management server 420. Therefore, descriptions thereof are omitted here.

4. BD-R/RE 930

The BD-R/RE 930 is a recording medium, on which various pieces of data are recorded by the recording device 910.

As shown in FIG. 23, the BD-R/RE 930 has recorded thereon a content digest value 931, an MC signature or a DL signature 932, an encrypted content 933, and key information 934.

A detailed description of each of the pieces of data is provided above, and thus omitted.

<<Other Modifications>>

The present invention has been explained based on the above-mentioned embodiments. However, the present invention is of course not limited to the above-mentioned embodiments. For example, the following modifications are also included in the present invention.

Figure 25:
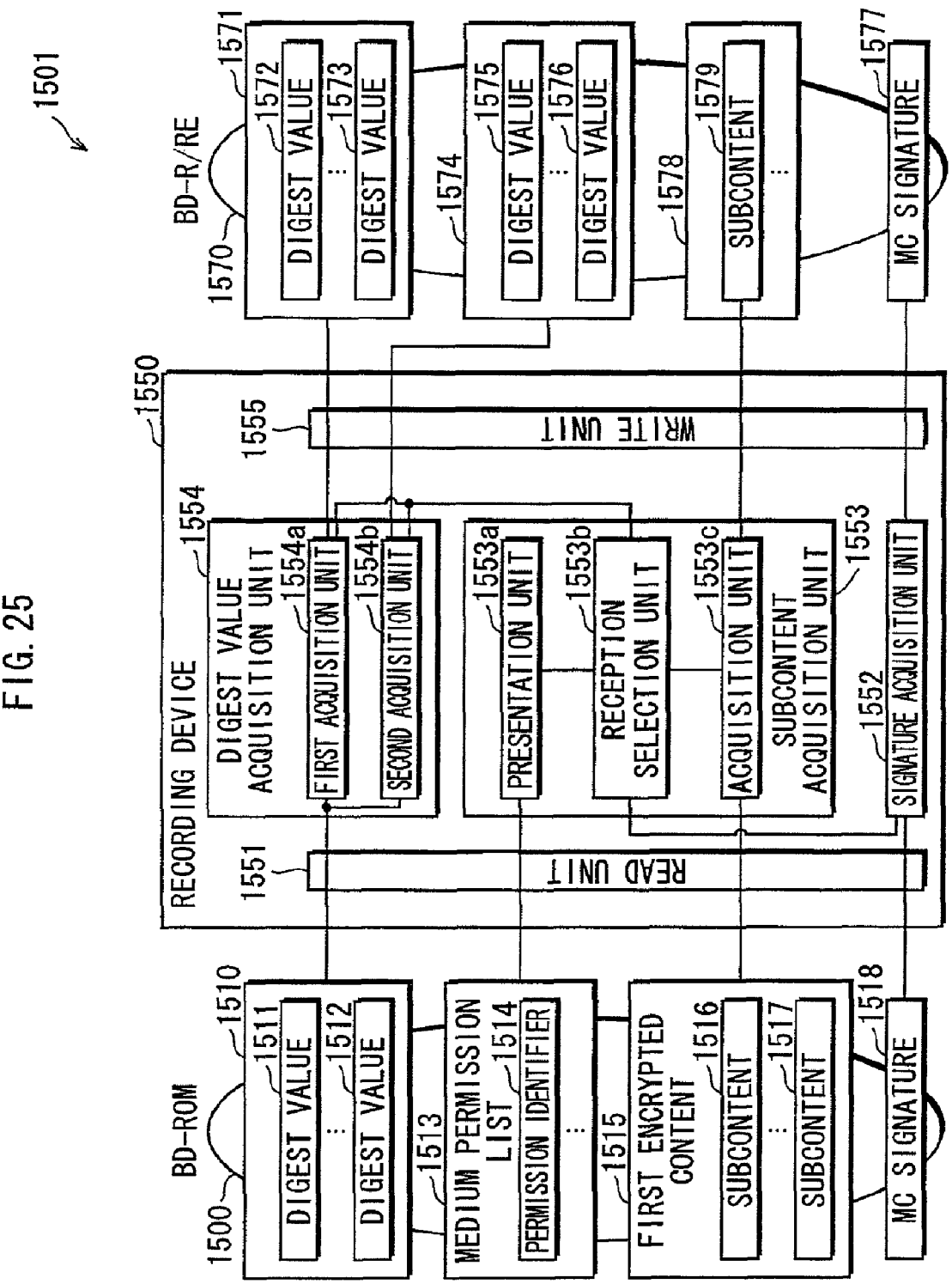
FIG. 25 shows the construction of a content copy processing system 1501 according to a modification of the present embodiments.

(1) The following describes a content copy processing system 1501 according to a modification of the above-mentioned embodiments, with reference to FIG. 25.

The content copy processing system 1501 includes a recording device 1550, as shown in FIG. 25.

The recording device 1550 writes, onto a second recording medium 1570, one or more of a plurality of subcontents 1516, . . . , 1517 that constitute a first encrypted content 1515 recorded on a first recording medium 1500. The first recording medium 1500 is, for example, a BD-ROM, and the second recording medium 1570 is, for example, a BD-R. Here, the second recording medium 1570 may be a BD-RE. Also, each of the subcontents is the same as the clip in the above-mentioned embodiments.

As shown in FIG. 25, the first recording medium 1500 has recorded thereon, in advance, (i) the plurality of subcontents 1516, . . . , 1517, (ii) a digest value set 1510 composed of the digest values 1511, . . . , 1512 of the subcontents, and a medium signature 1518 (also referred to as MC (Managed Copy) signature) generated based on all of the digest values 1511, . . . , 1512.

As shown in FIG. 25, the recording device 1550 is composed of a read unit 1551, a signature acquisition unit 1552, a subcontent acquisition unit 1553, a digest value acquisition unit 1554, and a write unit 1555. Also, the subcontent acquisition unit 1553 is composed of a presentation unit 1553*a*, a reception selection unit 1553*b*, and an acquisition unit 1553*c*. The digest value acquisition unit 1554 is composed of a first acquisition unit 1554*a* and a second acquisition unit 1554*b*.

The recording device 1550 is specifically a computer system including a microprocessor, ROM, RAM, hard disk unit, display unit, keyboard, mouse, etc. One of the RAM and the hard disk unit has recorded thereon a computer program. The recording device 1550 achieves its functions by the microprocessor operating in accordance with the computer program.

The subcontent acquisition unit 1553 selects and acquires one or more of subcontents from among the subcontents 1516, . . . , 1517 recorded on the first recording medium 1500.

The first acquisition unit 1554*a* acquires, from the first recording medium 1500 via the read unit 1551, one or more first digest values corresponding to the one or more subcontents selected by the subcontent acquisition unit 1553 (the first digest value being also referred to as "digest value generated from the selected subcontent", or "selected digest value").

The second acquisition unit 1554*b* acquires, from the first recording medium 1500 via the read unit 1551, second digest values corresponding to nonselected subcontents that are subcontents other than the one or more subcontents selected by the subcontent acquisition unit 1553 (each of the second digest values being also referred to as "digest value generated from the nonselected subcontent" or "excluded digest value").

When the one or more subcontents are selected by the subcontent acquisition unit 1553, the signature acquisition unit 1552 reads and acquires the medium signature 1518 from the first recording medium 1500 via the read unit 1551.

The write unit 1555 writes, onto the second recording medium 1570, the one or more subcontents selected by the subcontent acquisition unit 1553, the one or more digest values (selected digest values), and the second digest values (excluded digest values), and the medium signature.

In this way, the second recording medium 1570 has recorded thereon a first digest value set 1571 composed of the first digest values 1572, . . . , 1573 that are the selected digest values, a second digest value set 1574 composed of the second digest values 1575, . . . , 1576 that are the excluded digest values, a content 1578 composed of the selected subcontents 1579, . . . , and a medium signature 1577.

Note that the above explains that both of the one or more selected digest values and the excluded digest values are recorded on the second recording medium 1570. However, only the excluded digest values may be recorded on the second recording medium 1570. This means that the recording device 1550 may not include the first acquisition unit 1554a, the write unit 1555 may write, onto the second recording medium 1570, the one or more subcontents selected by the subcontent acquisition unit 1553, the second digest values (excluded digest values), and the medium signature, and the second recording medium 1570 may have recorded thereon the second digest value set 1574 composed of the second digest values 1575, . . . , 1576 that are the excluded digest values, the content 1578 composed of the selected subcontents 1579, . . . , and, the medium signature 1577.

In this case, the digest values of the subcontents 1579, . . . that have been recorded on the second recording medium 1570 may be generated when the playback device plays the subcontents 1579, . . . . Then, whether the subcontents 1579, . . . , have been tampered can be verified, with use of the medium signature 1577, all of the generated digest values, and the second digest values 1575, . . . , 1576 stored on the second recording medium 1570.

Also, as shown in FIG. 25, the first recording medium 1500 has recorded thereon a medium permission list 1513 that includes one or more permission identifiers 1514, . . . , each of which identifies a respective one of one or more subcontents permitted to be copied among the subcontents 1516, . . . , 1517.

The subcontent acquisition unit 1553 selects a selected subcontent from among subcontents identified by the permission identifiers 1514, . . . , among the subcontents 1516, . . . , 1517. Here, the permission identifiers 1514, . . . are included in the medium permission list 1513.

Also, as shown in FIG. 25, the presentation unit 1553a reads and acquires the medium permission list 1513 from the first recording medium 1500 via the read unit 1551, and presents, to a user, a subcontent identified by the permission identifier 1514 included in the medium permission list 1513 that has been acquired. Here, the presentation unit 1553a presents, for example, a title attached to the subcontent.

Upon receipt of one or more subcontents specified by the user from among the subcontents that have been presented by the presentation unit 1553a, the reception selection unit 1553b selects the one or more subcontents that have been received as one or more selected subcontents.

The acquisition unit 1553c reads and acquires, via the read unit 1551, the one or more subcontents selected by the reception selection unit 1553b from among the subcontents 1516, . . . , 1517 recorded on the first recording medium 1500, and outputs, to the write unit 1555, the one or more selected subcontents that have been acquired.

Figure 26:
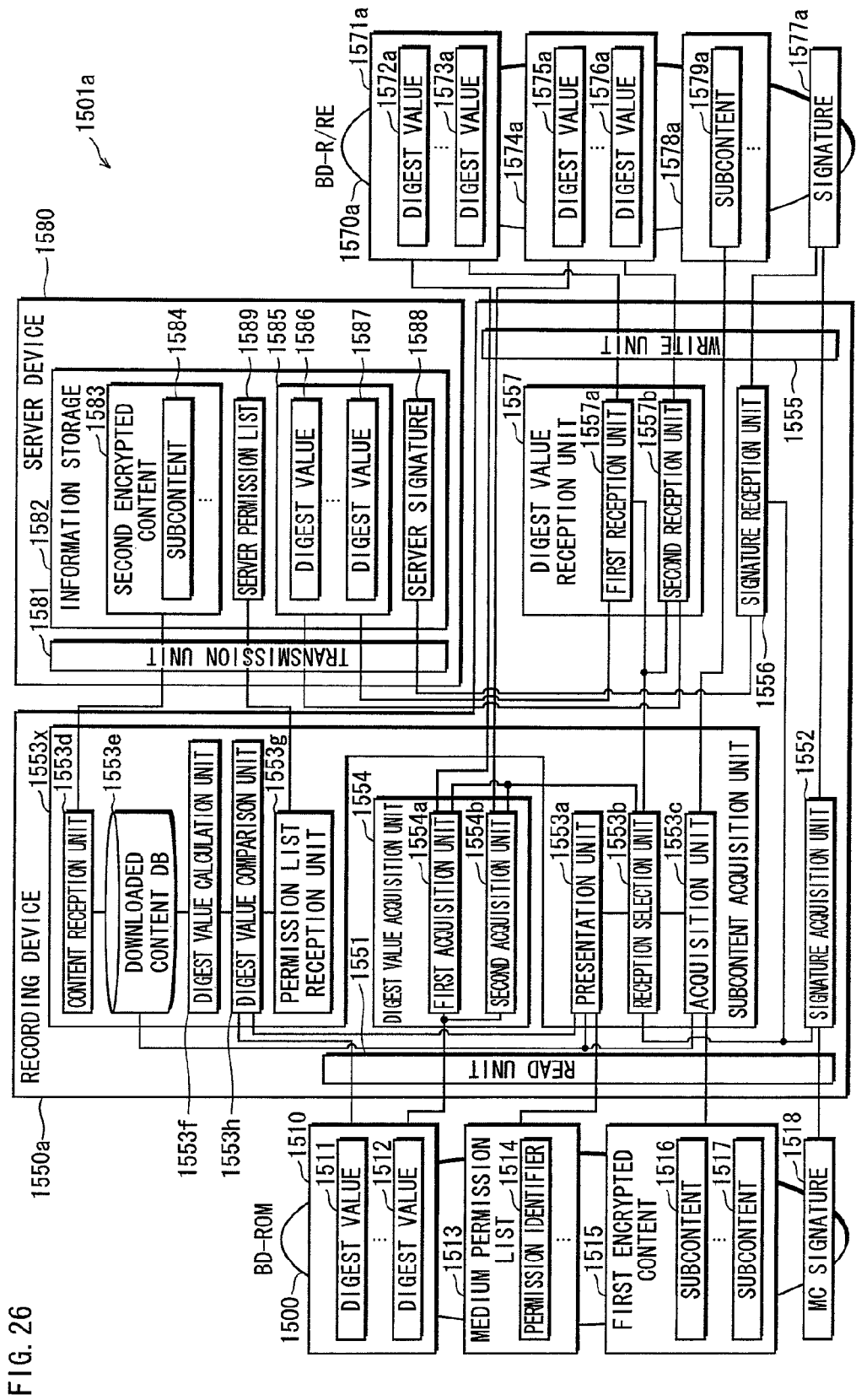
FIG. 26 shows a content copy processing system 1501a according to a modification of the present embodiments.

(2) The following describes a content copy processing system 1501a according to a modification of the present embodiments, with reference to FIG. 26.

As shown in FIG. 26, the content copy processing system 1501a includes a recording device 1550a and a server device 1580 that are mutually connected via a network such as the Internet.

The recording device 1550a writes, onto a second recording medium 1570a, the plurality of subcontents 1516, . . . , 1517 that constitute the first encrypted content 1515, and one or more subcontents among a plurality of subcontents 1584 that constitute a second encrypted content 1583. The first encrypted content 1515 has been recorded on the first recording medium 1500. The first recording medium 1500 is, for example, a BD-ROM, and the second recording medium 1570a is, for example, a BD-R. The second encrypted content 1583 is related to the first encrypted content 1515, and has been recorded in a server device 1580.

Here, the second recording medium 1570a may be a BD-RE. Also, the subcontents are the same as the clips in the above-mentioned embodiments. Also, the first encrypted content 1515 is, for example, the content of a certain movie, and the second encrypted content 1583 is, for example, the content including the bonus footage, subtitles, etc. of the movie.

The first recording medium 1500 is the same as the first recording medium 1500 shown in FIG. 25. Therefore, a description thereof is omitted here.

As shown in FIG. 26, the server device 1580 is composed of an information storage 1582, a transmission unit 1581, and other units.

The information storage 1582 has stored therein a plurality of subcontents 1584, . . . , constituting the second encrypted content 1583, a digest value set 1585 composed of digest values 1586, . . . , 1587, each of which is of the respective subcontents, a server signature 1588 generated based on both of (i) the digest values of the subcontents 1516, . . . , 1517 that constitute the first encrypted content and (ii) the digest values of the subcontents 1584, . . . that constitute the second encrypted content 1583, and a server permission list 1589. A description of the server permission list 1589 is provided below.

The transmission unit 1581 transmits, to the recording device 1550a via a network, the second encrypted content 1583, the digest value set 1585, the server signature 1588, and the server permission list 1589 that have been recorded in the information storage 1582.

The server device 1580 is specifically a computer system including a microprocessor, ROM, RAM, hard disk unit, display unit, keyboard, mouse, etc. One of the RAM and the hard disk unit has recorded thereon a computer program. The server device 1580 achieves its functions by the microprocessor operating in accordance with the computer program.

As shown in FIG. 26, the recording device 1550a is composed of the read unit 1551, the signature acquisition unit 1552, a subcontent acquisition unit 1553x, the digest value acquisition unit 1554, the write unit 1555, a signature reception unit 1556, and a digest value reception unit 1557. Also, the subcontent acquisition unit 1553x is composed of the presentation unit 1553a, the reception selection unit 1553b, the acquisition unit 1553c, a content reception unit 1553d, a downloaded content DB (database) 1553e, a digest value calculation unit 1553f, a permission list reception unit 1553g and a digest value comparison unit 1553h. The digest value acquisition unit 1554 is composed of the first acquisition unit 1554a and the second acquisition unit 1554b. The digest value reception unit 1557 is composed of a first reception unit 1557a and a second reception unit 1557b. The recording device 1550a is the same computer system as the server device 1580.

The subcontent acquisition unit 1553x selects and acquires one or more of subcontents from among the subcontents 1516, ..., 1517 recorded on the first recording medium 1500, and the subcontents 1584, ... recorded in the server device 1580. Also, when the one or more subcontents are selected only from the first recording medium 1500, the subcontent acquisition unit 1553x instructs the signature acquisition unit 1552 to acquire the medium signature 1518. When the one or more subcontents are selected at least from the server device 1580, the subcontent acquisition unit 1553x instructs the signature acquisition unit 1552 to acquire the server signature 1588 from the server device 1580. Note that in the present embodiment, it is assumed that the one or more subcontents are selected from the first recording medium 1500 without exception. Therefore, in this case, subcontents are selected from both of the first recording medium 1500 and the server device 1580.

The first acquisition unit 1554a reads and acquires, from the first recording medium 1500 via the read unit 1551, one or more first digest values corresponding to the one or more subcontents selected by the subcontent acquisition unit 1553 (each of the one or more first digest values being also referred to as "digest value generated from the selected subcontent", or "selected digest value").

The second acquisition unit 1554b reads and acquires, from the first recording medium 1500 via the read unit 1551, second digest values corresponding to nonselected subcontents that are subcontents other than the one or more subcontents selected by the subcontent acquisition unit 1553x (each of the second digest values being also referred to as "digest value generated from the nonselected subcontent" or "excluded digest value").

When the one or more subcontents are selected from the server device 1580 by the subcontent acquisition unit 1553x, the first reception unit 1557a receives and acquires, from the server device 1580, one or more first digest values of the one or more subcontents selected from the server device 1580 (each of the one or more first digest values being also referred to as "digest value generated from the selected subcontent", or "selected digest value").

When the one or more subcontents are selected from the server device 1580 by the subcontent acquisition unit 1553x, the second reception unit 1557b receives and acquires, from the server device 1580, second digest values of nonselected subcontents that are subcontents other than the one or more subcontents selected by the server device 1580 (each of the second digest values being also referred to as "digest value generated from the nonselected subcontent" or "excluded digest value").

When the one or more subcontents are selected at least from the server device 1580, the signature reception unit 1556 receives and acquires the server signature 1588 as a signature, as instructed by the reception selection unit 1553b. Then, the signature reception unit 1556 outputs, to the write unit 1555, the server signature 1558 that has been acquired.

When the one or more subcontents are selected by the subcontent acquisition unit 1553, from among the subcontents recorded on the first recording medium 1500, the signature acquisition unit 1552 reads and acquires, from the first recording medium 1500 via the read unit 1551, the medium signature 1518 as a signature, as instructed by the reception selection unit 1553b. Then, the signature acquisition unit 1552 outputs, to the write unit 1555, the medium signature 1518 that has been acquired.

The write unit 1555 writes, onto the second recording medium 1570a, the one or more subcontents selected by the subcontent acquisition unit 1553x, the one or more first digest values (selected digest values), the second digest values (excluded digest values), and the signature.

In this way, the following are recorded on the second recording medium 1570a: a first digest value set 1571a composed of first digest values 1572a, ..., 1573a that are the selected digest values, a second digest value set 1574a composed of second digest values 1575a, ..., 1576a that are the excluded digest values, a content 1578a composed of selected subcontents 1579a, ..., and a signature 1577a.

Note that the above explains that both of the one or more selected digest values and the excluded digest values are recorded on the second recording medium 1570a. However, only the excluded digest values may be recorded on the second recording medium 1570a. This means that the recording device 1550a may not include neither the first acquisition unit 1554a nor the first reception unit 1557a, the write unit 1555 may write, onto the second recording medium 1570a, the one or more subcontents selected by the subcontent acquisition unit 1553x, the second digest values (excluded digest values), and the signature, and the second recording medium 1570a may have recorded thereon the second digest value set 1574a composed of the second digest values 1575a, ..., 1576a that are the excluded digest values, the content 1578a composed of the selected subcontents 1579a, ..., and, the signature 1577a.

The content reception unit 1553d receives the second encrypted content 1583 from the server device 1580 via a network, and writes, onto the downloaded content DB 1553e, the second encrypted content that has been received.

The downloaded content DB 1553e has stored therein a plurality of subcontents that constitute the second encrypted content acquired from the server device 1580.

The digest value calculation unit 1553f calculates the digest values of the respective subcontents stored in the downloaded content DB 1553e, and outputs the calculated digest values to the digest value comparison unit 1553h.

The permission list reception unit 1553g receives, from the server device 1580 via the network, the server permission list 1589 that includes the digest value of each of the one or more subcontents permitted to be copied.

The digest value comparison unit 1553h compares the digest values calculated by the digest value calculation unit 1553f with the one or more digest values included in the server permission list 1589 received by the permission list reception unit 1553g.

The presentation unit 1553a reads and acquires the medium permission list 1513 from the first recording medium 1500 via the read unit 1551, and presents, to a user, the one or more subcontents identified by the one or more permission identifiers 1514 included in the medium permission list 1513 that has been acquired. Also, the presentation unit 1553a presents, to the user, subcontents each corresponding to digest values that are judged to be matching digest values by the digest value comparison unit 1553h. Here, the presentation unit 1553a presents, for example, titles attached to the subcontents.

Upon receipt of one or more subcontents specified by the user from among the subcontents that have been presented by the presentation unit 1553a, the reception selection unit 1553b selects the one or more subcontents that have been received as one or more selected subcontents.

The acquisition unit 1553c reads and acquires, from the downloaded content DB 1553e, via the read unit 1551, (i) the one or more subcontents selected by the reception selection unit 1553b from among the subcontents that are identified by the permission identifiers 1514, . . . , included in the medium permission list 1513, and (ii) the subcontents corresponding to the digest values judged to be the matching digest values by the digest value comparison unit 1553h. Then, the acquisition unit 1553c outputs the subcontents that have been acquired to the write unit 1555.

(3) The recording device 1550a may include a subcontent acquisition unit (not shown) instead of the subcontent acquisition unit 1553x. The subcontent acquisition unit includes a downloaded content DB, a first reception unit, a transmission unit, a second reception unit, and a selection acquisition unit.

The downloaded content DB has stored therein the plurality of subcontents constituting the second encrypted content 1583 acquired from the server device 1580.

The first reception unit receives a specification of one or more subcontents given by a user, among (i) the plurality of subcontents 1516, . . . constituting the first encrypted content 1515 recorded on the first recording medium 1500 and (ii) the plurality of subcontents constituting the second encrypted content recorded in the downloaded content DB.

The transmission unit transmits, to the server 1580 via the network, one or more subcontent identifiers for identifying the one or more subcontents received by the first reception unit as the specification by the user.

The second reception unit receives, from the server device 1580 via the network, one or more permission identifiers for identifying one or more subcontents permitted to be copied, among the one or more subcontent identifiers that have been transmitted.

The selection acquisition unit selects and acquires, as the one or more selected subcontents, one or more subcontents that are permitted to be copied and also identified by the one or more permission identifiers.

Also, the server device 1580 further includes a reception unit that receives, from the recording device 1550a, the one or more subcontent identifiers for identifying the one or more subcontents. Also, the information storage 1582 of the server device 1580 has further stored therein a permission identifier for identifying a subcontent permitted to be copied among the plurality of subcontents 1584, . . . that constitute the second encrypted content 1583. Also, the transmission unit 1581 extracts a subcontent identifier identical to the permission identifier stored in the information storage 1582 from among one or more subcontent identifiers received from the recording device 1550a, and transmits the extracted subcontent identifier to the recording device 1550a.

(4) The recording device 1550a may include a subcontent acquisition unit (not shown) instead of the subcontent acquisition unit 1553x. The subcontent acquisition unit includes a downloaded content DB, a first reception unit, a second reception unit, a selection acquisition unit, and a warning display unit.

The downloaded content DB has stored therein the plurality of subcontents 1584, . . . that constitute the second encrypted content 1583 acquired from the server device 1580.

The first reception unit receives a specification of one or more subcontents given by a user, among (i) the plurality of subcontents 1516, . . . , 1517 constituting the first encrypted content 1515 recorded on the first recording medium 1500 and (ii) the plurality of subcontents constituting the second encrypted content recorded in the downloaded content DB.

The second reception unit receives, from the server device 1580, a server permission list including one or more permission identifiers for identifying one or more subcontents permitted to be copied.

The selection acquisition unit selects and acquires, as the one or more selected subcontents, one or more subcontents identified by the one or more permission identifiers included in the server permission list that has been received, from among the one or more subcontents that have been specified by the user.

The warning display unit displays a warning message indicating that permission is not given to subcontents other than the subcontent identified by the permission identifier included in the server permission list, among the one or more subcontents that have been specified by the user.

(5) In the above-described embodiments and the modifications thereof, the one or more clips to be recorded on the second recording medium and the BD-R/RE are included in either (a) the content recorded on the first recording medium and the BD-ROM, or (b) both of the content recorded on the first recording medium and the BD-ROM, and the related content acquired from the management server.

However, the present invention is not limited to the above-described construction, and may have a construction in which only a clip included in the related content downloaded from the management server is recorded onto the second recording medium and the BD-R/RE.

When recording only the clip included in the related content, the recording device may record, onto the second recording medium, (i) one or more clips that have been selected, (ii) the second signature, and (iii) one or more clip digest values corresponding to the second signature, and may record, onto the BD-R/RE, (i) the one or more clips that have been selected, (ii) the DL signature, and (iii) digest values corresponding to the DL signature.

(6) In the above-described embodiments and the modification thereof, the clips recorded on the BD-ROM are judged whether the clips are permitted to be copied, with use of the MCMF (in other words, with use of the clip IDs), and the clips acquired from the management server are judged whether the clips are permitted to be copied, with use of the digest values of the clips. However, the judgment of whether the clips are permitted to be copied may be performed with use of a method other than the above-described method.

For example, the judgment of whether the clips are permitted to be copied may be performed with use of the clip IDs, regardless of whether the clips are those recorded on the BD-ROM or those acquired from the management server. In this case, the recording device may receive, from the management server, a copy permission list that has written thereon the clip ID of a clip permitted to be copied.

Also, the judgment of whether the clips are permitted to be copied may be performed with use of the digest values of the clips, regardless of whether the clips are those recorded on the BD-ROM or those acquired from the management server. In this case, the recording device may receive, from the management server, the digest values of clips permitted to be copied, and calculates the digest value of a clip specified by a user, regardless of whether the specified clip is recorded on the BD-ROM or is acquired from the management server. Then, the recording device judges whether the copy is permitted, by comparing the digest value of the specified clip with the digest value received from the management server so as to determine whether the digest value of the specified clip matches with the digest value received from the management server.

Also, as for the clips recorded on the BD-ROM, the judgment of whether copying is permitted may be performed with use of the digest values of the clips, and as for the clips acquired from the management server, the judgment of whether copying is permitted may be performed with use of the clip IDs of the clips.

It is also possible to use a method other than the method that uses the clip IDs, or the method that uses the digest values, for the judgment of whether copying is permitted.

(7) In the first embodiment described above, the first signature 107 recorded on the first recording medium 10 (the recording medium on which the clips for copying have been recorded) is generated only from the digest values of all the clips permitted to be copied, as shown in FIG. 5.

However, in the present invention, the first signature to be recorded onto the first recording medium 10 may be generated from the digest values of all the clips that include the clips permitted to be copied and the clips not permitted to be copied.

Then, in a case of recording, onto the second recording medium 40, only the clips selected from the first recording medium 10, and not recording the clips of the related content, the recording device 20 may record, onto the second recording medium 40, the digest values of all the clips, and the digital signature generated from the digest values of all the clips.

An ordinary play-only disc has recorded thereon the digest values of all the clips, and the digital signature generated from the digest values of all the clips. This digital signature is used for a signature verification process performed by a playback device at the time of playing the play-only disc.

Therefore, in the case of recording, onto the second recording medium 40, only the clips selected from the first recording medium 10, and not recording the clips of the related content, it is possible to directly copy the digital signature used for the ordinary play-only disc onto the second recording medium 40.

Furthermore, not only in the first embodiment, but also in other embodiments and the modifications, the digital signature (MC signature) to be recorded onto the recording medium (BD-ROM) on which clips for copying have been recorded may be generated from the digest values of all the clips including the clips permitted to be copied and the clips not permitted to be copied.

(8) In the above-described embodiment, the recording device acquires the DL signature and digest values corresponding to the DL signature from the management server, when recording the clips from the BD-ROM to the BD-R/RE.

However, in the present invention, the timing for the recording device to acquire the DL signature and the digest values corresponding to the DL signature is not limited to the timing at which the clips are recorded.

For example, the recording device may acquire the DL signature and the digest values corresponding to the DL signature from the management server, at the timing specified by a user.

In this case, the recording device may further includes (i) a reception unit for receiving a command of a user, the command indicating that the DL signature and the digest values corresponding to the DL signature are to be acquired, (ii) a storage for storing the DL signature and the digest values that are acquired from the management server, (iii) a judgment unit for judging whether the DL signature and the digest values are stored in the storage, when the clips are to be recorded from the BD-ROM to the BD-R/RE, and (iv) a presentation unit for presenting the user a result of the judgment, in addition to the function blocks described in the above embodiments.

The user may input, via the reception unit, the command for acquiring the DL signature and the digest values, when finding out that the DL signature and the digest values are not stored in the storage, by checking the result of the judgment presented by the presentation unit.

The recording device may further include a deletion unit for deleting the DL signature and the digest values stored in the storage, after recording, to the BD-R/RE, the DL signature and the digest values.

According to the above-described construction, the clips may be recorded from the BD-ROM to the BD-R/RE, at the timing convenient to the user.

(9) Note that the content copy permission system of the present invention may have a construction in which the clips are recorded from one BD-ROM to a plurality of BD-R/REs. In this case, it is possible to limit the number of times the clips are permitted to be copied.

For example, the recording device receives, from the user, the input of the number of times the user desires the clips to be copied, and transmits, to the management server, the desired number of times that has been received. Then, the management server performs a permission process for judging whether to permit the number of times the user desires the clips to be copied, and transmits, to the recording device, permission information including a result of the judgment.

The management server may set the permission information to either "1" or "0". For example, "1" indicates the number of times the user desires the clips to be copied is permitted, and "0" indicates the number of times the user desires the clips to be copied is not permitted. Also, the permission process performed by the management server may be a billing process, etc.

The recording device is assumed to have recorded therein a table in which the content IDs are stored in association with the number of times the clips are permitted to be copied. Then, upon receiving, from the management server, the permission information indicating the permission for the number of times the user desires the clips to be copied, the recording device records, in the table, the number of times the user desires the clips to be copied as the number of times copying is permitted, in association with the content IDs.

Also, the management server may transmit the number of times copying is permitted to the recording device, instead of the recording device transmitting the number of times copying is permitted to the management server.

The recording device may receive, from the management server, permission information including the content IDs and the number of times copying is permitted, and records, in the table, the content IDs and the number of times copying is permitted that have been received.

Also, in the above embodiments, the number of times copying is permitted may be transmitted to the recording device, together with the DL signature and the digest values, when the management server transmits, to the recording device, the DL signature and the digest values. In this case, the clips are permitted to be copied onto a plurality of BD-R/RE by default.

In order to realize the above-described structure in which limitation is imposed on the number of times copying is permitted, the recording device may further include (i) a storage for storing a table in which the content IDs are associated with the number of times copying is permitted, (ii) a judgment unit for judging whether copying is permitted by checking the table, (iii) a presentation unit for presenting a result of the judgment to a user, and (iv) an update unit for updating the number of times copying is permitted that is stored in the table, after the copying process, in addition to the function blocks described in the above embodiments. Here, the presentation unit may present "the number of times copying is permitted", instead of presenting "whether or not copying is permitted".

Furthermore, in order to realize the above-described structure, the signature information request unit and the signature information reception unit of the recording device in the above-described embodiments, and the permission judgment unit and the signature information transmission unit of the management server in the above-described embodiments may respectively have a function for receiving and transmitting the desired number of times the clips are copied, the number of times copying is permitted, etc., in addition to the functions described in the above embodiments.

Note that the modification (9) described here may be combined with the modification (8) described above.

(10) The present invention provides a recording device for recording one or more of a plurality of subcontents recorded on a first recording medium, onto a second recording medium, the first recording medium having further recorded thereon digest values of the subcontents, and a medium signature generated based on the digest values of all the subcontents permitted to be copied, the plurality of subcontents constituting one content, the recording device comprising: a subcontent acquisition unit operable to select one or more subcontents, from among one or more subcontents permitted to be copied in the plurality of subcontents recorded on the first recording medium, and acquire the selected one or more subcontents as one or more selected subcontents; an excluded digest value acquisition unit operable to acquire excluded digest values from the first recording medium, the excluded digest values being digest values of nonselected subcontents, each of which is a subcontent permitted to be copied and is other than the one or more selected subcontents; a signature acquisition unit operable to acquire the medium signature from the first recording medium; and a write unit operable to write, onto the second recording medium, (i) the one or more selected subcontents, (ii) the excluded digest values of the nonselected subcontents, and (iii) the medium signature.

Here, the subcontent acquisition unit may be able to select the one or more subcontents, from among a plurality of subcontents constituting a related content that is related to the content and that is stored in a server device, the server device may have stored therein (i) the plurality of subcontents constituting the related content, (ii) digest values of the plurality of subcontents constituting the related content, (iii) a server signature generated based on the digest values of all the subcontents permitted to be copied, among the digest values of the plurality of subcontents constituting the content and the digest values of the plurality of subcontents constituting the related content, the recording device may further include: an excluded digest value reception unit operable to receive, from the server device, excluded digest values that are digest values of nonselected subcontents, each of which is a subcontent permitted to be copied and is other than the one or more selected subcontents that have been selected from the server device, in a case where the one or more selected subcontents are selected from the server device; and a signature information reception unit operable to receive the server signature from the server device, in the case where the one or more selected subcontents are selected from the server device, and the write unit may write, onto the second recording medium, (i) the one or more selected subcontents that have been acquired, (ii) the excluded digest values acquired from the first recording medium, and (iii) the medium signature, in a case where the one or more selected subcontents are selected only from the first recording medium, and may write, onto the second recording medium, (i) the one or more selected subcontents that have been acquired, (ii) the excluded digest values acquired from the first recording medium, (iii) the excluded digest values received from the server device, and (iv) the server signature, in a case where the one or more selected subcontents are selected from the first recording medium and the server device.

Also, the present invention provides a recording device for recording a part of a plurality of subcontents constituting a first content recorded on a first recording medium, onto a second recording medium, and a plurality of subcontents constituting a second content stored in a server device, the second content being related to the first content, wherein the first recording medium has recorded thereon (i) the plurality of subcontents constituting the first content, and (ii) digest values of the subcontents constituting the first content, the server device has stored therein (i) the plurality of subcontents constituting the second content, (ii) digest values of the plurality of subcontents constituting the second content, and (iii) a server signature generated based on digest values of all subcontents permitted to be copied, among the digest values of the plurality of subcontents constituting the first content and the plurality of subcontents constituting the second content, the recording device includes: a subcontent acquisition unit operable to select one or more subcontents from among one or more subcontents permitted to be copied in each group of the subcontents recorded on the first recording medium and the subcontents stored in the server device, and acquire the selected one or more subcontents as one or more selected subcontents; an excluded digest value acquisition unit operable to acquire, from the first recording medium, excluded digest values that are digest values of nonselected subcontents, each of which is a subcontent other than the one or more selected subcontents that are permitted to be copied and that have been selected from the first recording medium; an excluded digest value reception unit operable to receive, from the server device, excluded digest values that are digest values of nonselected subcontents, each of which is a subcontent other than the one or more selected subcontents that are permitted to be copied and that have been selected from the server device; a signature reception unit operable to receive the server signature from the server device; and a write unit operable to write, onto the second recording medium, (i) the one or more selected subcontents that have been acquired, (ii) the excluded digest values acquired from the first recording medium, (iii) the excluded digest values received from the server device, and (iv) the server signature.

(9) Specifically, each of the above-described devices is a computer system comprising a microprocessor, a ROM, a RAM, a hard disk unit, a display unit, a keyboard, a mouse and the like. A computer program is stored either in the RAM or in the hard disk unit. Each of the devices achieves its functions by the microprocessor operating in accordance with the computer program. Here, the computer program is a combination of a plurality of instruction codes that give instructions to a computer, so that the computer can perform predetermined functions.

(11) All or part of the components constituting each of the above described devices may be one system LSI (Large Scale Integration circuit). A system LSI is a super multifunctional LSI manufactured by integrating multiple structural units onto a single chip. Specifically, it is a computer system including a microprocessor, ROM, RAM and the like. The RAM has stored therein the computer program. The system LSI achieves its functions when the microprocessor operates in accordance with the computer program.

Also, each of the components of the above described devices may be made into one chip individually, or may also be made into one chip so as to include part or all of the components.

Note that the system LSI may be referred to as an IC, an LSI, a super LSI or an ultra LSI in accordance with the degree of integration. In addition, a method for integrating circuits is not limited to an LSI, and may be realized by an application specific integrated circuit or a versatile processing unit. It is possible to use an FPGA (Field Programmable Gate Array) that is programmable after the LSI is produced, or a reconfigurable processor that can restructure the connection and setting of circuit cells in the LSI.

In addition, if a technology of integration that can substitute for the LSI appears by a progress of semiconductor technology or another derivational technology, it is possible to integrate the function blocks by using the technique. A possible field for integrating the function blocks can be an adaptation of biotechniques.

(12) Part or all of the components of the above described devices may be structured as a removable IC card or a stand-alone module. Each of the IC card and the module is a computer system including a microprocessor, ROM, RAM and the like. Each of the IC card and the module may also include the above super multifunctional LSI. The IC card and the module achieve their functions by the microprocessor operating in accordance with the computer program. The IC card and module may be tamper resistant.

(13) The present invention may be the methods mentioned above. Also, the present invention may be computer programs for causing computers to realize the methods, or may be digital signals representing the computer programs.

Also, the present invention may be a computer-readable recording medium on which the computer programs or the digital signals are recorded, such as a flexible disk, a hard disk, a CD-ROM, an MO, a DVD, a DVD-ROM, a DVD-RAM, a BD (Blu-ray Disc), and a semiconductor memory. The present invention may be the digital signals which are recorded on the above described recording media.

Also, the present invention may be the computer programs or digital signals which are transmitted via an electronic communication circuit, a wireless or fixed-line communication circuit, a network such as the Internet, a data broadcast and the like.

Also, the present invention may be a computer system including a microprocessor and a memory, whereby the memory has stored therein the computer program, and the microprocessor operates in accordance with the computer program.

Also, the present invention may be carried out by another independent computer system by transferring the program or the digital signals which have been recorded on the recording media, or by transferring the program or the digital signals via the network and the like.

(14) The above embodiments and the above modifications may be combined.

The present invention can be utilized in an industry that markets, to users, recording mediums having recorded thereon digital contents, and is useful as a mechanism for permitting legal content copying.

The invention claimed is:

1. A recording device for recording, onto a second recording medium, one or more subcontents among a plurality of subcontents recorded on a first recording medium, the plurality of subcontents recorded on the first recording medium constituting a content, and the recording device being connectable to a server device via a network, wherein the first recording medium has recorded thereon the plurality of subcontents constituting the content, digest values of the plurality of subcontents, and a medium signature generated based on a digest value of each subcontent constituting the content, the server device has stored therein a plurality of subcontents constituting a related content that is related to the content, digest values of the plurality of subcontents constituting the related content, and a server signature generated based on a digest value of each subcontent of the related content, and the recording device comprises:

a non-transitory memory storing a program which when executed by a processor causes the recording device to perform the following:

determine whether to select, as one or more selected subcontents, one or more subcontents permitted to be copied from among the plurality of subcontents stored in the server device, and either (i) select and acquire one or more subcontents permitted to be copied as the one or more selected subcontents, only from among the plurality of subcontents recorded on the first recording medium or (ii) select and acquire one or more subcontents permitted to be copied as the one or more selected subcontents, from among each of the plurality of subcontents recorded on the first recording medium and the plurality of subcontents stored in the server device, acquire excluded digest values from the first recording medium, the excluded digest values being the digest values of nonselected subcontents that are other than the one or more selected subcontents selected from among the one or more subcontents on the first recording medium, in a case where the one or more selected subcontents are acquired from both the first recording medium and the server device, receive excluded digest values from the server device, the excluded digest values being of nonselected subcontents that are other than the one or more selected subcontents selected from the server device;

acquire the medium signature from the first recording medium, in a case where the one or more selected subcontents are acquired only from the first recording medium;

receive the server signature from the server device, in the case where the one or more selected subcontents are acquired from both the first recording medium and the server device, and (a) in the case where the one or more selected subcontents are acquired only from the first recording medium, write, onto the second recording medium, the one or more selected subcontents that have been acquired, the excluded digest values acquired from the first recording medium, and the medium signature, and (b) in the case where the one or more selected subcontents are acquired from both the first recording medium and the server device, write, onto the second recording medium, the one or more selected subcontents that have been acquired, the excluded digest values acquired from the first recording medium, the excluded digest values received from the server device, and the server signature.

2. A recording method used in a recording device for recording, onto a second recording medium, one or more subcontents among a plurality of subcontents recorded on a first recording medium, the plurality of subcontents recorded on the first recording medium constituting a content, and the recording device being connectable to a server device via a network, wherein the first recording medium has recorded thereon the plurality of subcontents constituting the content, digest values of the plurality of subcontents, and a medium signature generated based on a digest value of each subcontent constituting the content, the server device has stored therein a plurality of subcontents constituting a related content that is related to the content, the digest values of the plurality of subcontents constituting the related content, and a server signature generated based on a digest value of each subcontent of the content and the related content, and the recording method comprises the steps of:

determining whether to select, as one or more selected subcontents, one or more subcontents permitted to be copied from among the plurality of subcontents stored in the server device, and selecting and acquiring one or more subcontents permitted to be copied as the one or more selected subcontents, from among each of the plurality of subcontents recorded on the first recording medium and the plurality of subcontents stored in the server device, acquiring excluded digest values from the first recording medium, the excluded digest values being the digest values of nonselected subcontents that are other than the one or more selected subcontents selected from among the plurality of subcontents recorded on the first recording medium, in a case where the one or more selected subcontents are acquired from both the first recording medium and the server device, receiving excluded digest values from the server device, the excluded digest values being of nonselected subcontents that are other than the one or more selected subcontents selected from the server device;

receiving the server signature from the server device, in the case where the one or more selected subcontents are acquired from both the first recording medium and the server device, and in the case where the one or more selected subcontents are acquired from both the first recording medium and the server device, writing, onto the second recording medium, the one or more selected subcontents that have been acquired, the excluded digest values acquired from the first recording medium, the excluded digest values received from the server device, and the server signature.

3. A non-transitory computer-readable recording medium having recorded thereon a computer program used in a recording device for recording, onto a second recording medium, one or more subcontents among a plurality of subcontents recorded on a first recording medium, the plurality of subcontents recorded on the first recording medium constituting a content, and the recording device being connectable to a server device via a network, wherein the first recording medium has recorded thereon the plurality of subcontents constituting the content, digest values of the plurality of subcontents, and a medium signature generated based on a digest value of each subcontent constituting the content, the server device has stored therein a plurality of subcontents constituting a related content that is related to the content, the digest values of the plurality of subcontents constituting the related content, and a server signature generated based on a digest value of each subcontent of the content and the related content, and the computer program when executed by a processor causes the recording device to perform recording steps comprising:

determining whether to select, as one or more selected subcontents, one or more subcontents permitted to be copied from among the plurality of subcontents stored in the server device, and either (i) selecting and acquiring one or more subcontents permitted to be copied as the one or more selected subcontents, only from among the plurality of subcontents recorded on the first recording medium or (ii) selecting and acquiring one or more subcontents permitted to be copied as the one or more selected subcontents, from among each of the plurality of subcontents recorded on the first recording medium and the plurality of subcontents stored in the server device, acquiring excluded digest values from the first recording medium, the excluded digest values being the digest values of nonselected subcontents that are other than the one or more selected subcontents selected from among the plurality of subcontents recorded on the first recording medium, in a case where the one or more selected subcontents are acquired from both the first recording medium and the server device, receiving excluded digest values from the server device, the excluded digest values being of nonselected subcontents that are other than the one or more selected subcontents selected from the server device;

acquiring the medium signature from the first recording medium, in a case where the one or more selected subcontents are acquired only from the first recording medium;

receiving the server signature from the server device, in the case where the one or more selected subcontents are acquired from both the first recording medium and the server device, and (a) in the case where the one or more selected subcontents are acquired only from the first recording medium, writing, onto the second recording medium, the one or more selected subcontents that have been acquired, the excluded digest values acquired from the first recording medium, and the medium signature, and (b) in the case where the one or more selected subcontents are acquired from both the first recording medium and the server device, writing, onto the second recording medium, the one or more selected subcontents that have been acquired, the excluded digest values acquired from the first recording medium, the excluded digest values received from the server device, and the server signature.

4. An integrated circuit for recording, onto a second recording medium, one or more subcontents among a plurality of subcontents recorded on a first recording medium, the plurality of subcontents recorded on the first recording medium constituting a content, and the recording device being connectable to a server device via a network, wherein the first recording medium has recorded thereon the plurality of subcontents constituting the content, digest values of the plurality of subcontents, and a medium signature generated based on a digest value of each subcontent constituting the content, the server device has stored therein a plurality of subcontents constituting a related content that is related to the content, digest values of the plurality of subcontents constituting the related content, and a server signature generated based on a digest value of each subcontent of the content and the related content, and the integrated circuit comprises:

a non-transitory memory storing a program which when executed by a processor causes the recording device to perform the following:

determine whether to select, as one or more selected subcontents, one or more subcontents permitted to be copied from among the plurality of subcontents stored in the server device, and either (i) select and acquire one or more subcontents permitted to be copied as the one or more selected subcontents, only from among the plurality of subcontents recorded on the first recording medium or (ii) select and acquire one or more subcontents permitted to be copied as the one or more selected subcontents, from among each of the plurality of subcontents recorded on the first recording medium and the plurality of subcontents stored in the server device, acquire excluded digest values from the first recording medium, the excluded digest values being the digest values of nonselected subcontents that are other than the one or more selected subcontents selected from among the one or more subcontents on the first recording medium, in a case where the one or more selected subcontents are acquired from both the first recording medium and the server device, receive excluded digest values from the server device, the excluded digest values being of non-selected subcontents that are other than the one or more selected subcontents selected from the server device;

acquire the medium signature from the first recording medium, in a case where the one or more selected subcontents are acquired only from the first recording medium;

receive the server signature from the server device, in the case where the one or more selected subcontents are acquired from both the first recording medium and the server device, and (a) in the case where the one or more selected subcontents are acquired only from the first recording medium, write, onto the second recording medium, the one or more selected subcontents that have been acquired, the excluded digest values acquired from the first recording medium, and the medium signature, and (b) in the case where the one or more selected subcontents are acquired from both the first recording medium and the server device, write, onto the second recording medium, the one or more selected subcontents that have been acquired, the excluded digest values acquired from the first recording medium, the excluded digest values received from the server device, and the server signature.

* * * * *